United States Patent
Miyazawa et al.

[11] Patent Number: 6,029,017
[45] Date of Patent: Feb. 22, 2000

[54] LENS-EXCHANGEABLE CAMERA

[75] Inventors: Masayuki Miyazawa, Kawachinagano; Akihiko Fujino, Sakai, both of Japan; Sadanobu Ueda, Glen Rock, N.J.

[73] Assignee: Minolta Co., Ltd., Osaka, Japan

[21] Appl. No.: 09/115,182

[22] Filed: Jul. 14, 1998

Related U.S. Application Data

[63] Continuation of application No. 08/791,526, Jan. 30, 1997, Pat. No. 5,809,354.

[30] Foreign Application Priority Data

Jan. 31, 1996 [JP] Japan ..................... 8-015795

[51] Int. Cl.⁷ .................... G03B 17/00
[52] U.S. Cl. ................. 396/532; 396/301
[58] Field of Search .............. 396/89, 301, 302, 396/529, 532, 531

[56] References Cited

U.S. PATENT DOCUMENTS

| | | | |
|---|---|---|---|
| 4,560,267 | 12/1985 | Nakai et al. | 354/412 |
| 4,671,640 | 6/1987 | Akada et al. | 354/402 |
| 4,737,812 | 4/1988 | Hasegawa et al. | 354/400 |
| 4,739,356 | 4/1988 | Ogura et al. | 354/286 |
| 4,782,355 | 11/1988 | Sakai et al. | 354/400 |
| 4,841,322 | 6/1989 | Kawasaki et al. | 354/400 |
| 4,841,327 | 6/1989 | Yamamoto et al. | 354/412 |
| 4,896,181 | 1/1990 | Saegusa | 354/286 |
| 4,912,493 | 3/1990 | Tanaka | 354/400 |
| 4,924,249 | 5/1990 | Aihara et al. | 396/532 |
| 5,038,163 | 8/1991 | Hirasawa | 354/400 |
| 5,065,175 | 11/1991 | Suzuki et al. | 354/400 |
| 5,113,210 | 5/1992 | Kashiyama et al. | 396/301 |
| 5,255,046 | 10/1993 | Kawasaki et al. | 396/301 |
| 5,287,138 | 2/1994 | Shiokama et al. | 396/532 |
| 5,479,056 | 12/1995 | Mabuchi | 396/529 |
| 5,664,245 | 9/1997 | Kurihara et a. | 396/532 |
| 5,809,354 | 9/1998 | Miyazawa et al. | 396/532 |
| 5,822,632 | 10/1998 | Miyazawa et al. | 396/532 |

*Primary Examiner*—Russell Adams
*Attorney, Agent, or Firm*—McDermott, Will & Emery

[57] ABSTRACT

First, a lens is supplied with a power supply LVDD. Then the state of a chip select signal CSL is input, and the processing waits until chip select signal CSL changes from HIGH→LOW→HIGH, that is, until communication preparation on the lens side is completed. When a microcomputer on the lens side is reset and started, the lens side outputs a communication enable signal and thus the time from mounting of the lens to starting of a communication can be reduced. Thus, a lens-exchangeable camera can be provided capable of starting a BL communication in the shortest time depending on the lens.

9 Claims, 51 Drawing Sheets

LARGER APERTURE DIAMETER (FULL OPEN)

SMALLER APERTURE DIAMETER

FIG. 9

COMMUNICATION HEADER (Body)
HEB DETECTION OF COMMUNICATION NORMALITY/ABNORMALITY
 DETECTION OF MOUNTING OF DEDICATED CONVERTER
 DETECTION OF MOUNTING OF GENERAL-PURPOSE Acc
 IDENTIFYING TYPE OF DEDICATED CONVERTER COMMUNICATION HEADER (Lens)
HEL COMMUNICATION NORMALITY/ABNORMALITY
 RELEASE ENABLE/DISABLE
 INDICATION OF RESET AND START

BODY → LENS

| | |
|---|---|
| ICPB | |
| MCP | |
| EXTRNG | |
| CNVID | |

LENS → BODY

| | |
|---|---|
| ICPL | |
| REN | |
| RRST | |

---

IDENTIFYING BODY/LENS (00H)
 IDENTIFYING BODY
 BL COMMUNICATION VERSION (BODY)

| GETTYP | |
|---|---|
| BIDC | |
| VERB | |

| | |
|---|---|
| EXTRNG | |
| CNVID | |
| LIDC | IDENTIFYING LENS |
| VERL | BL COMMUNICATION VERSION (LENS) |
| RT | LENS TIME LAG |
| NOTINF | DVP REFERENCE = OPTICAL INFINITY |
| PFLENZ | POWER FOCUS LENS |
| AVUNIT | APERTURE RESOLUTION |

OBTAINING BL REQUEST (01H)

| GETREQ | |
|---|---|
| AFM | AF/M |
| RAFEN | AF RETURN ENABLE/DISABLE |
| FDEN | FOCUS DRIVE ENABLE/DISABLE |
| LMFSW | DIRECT PF PROHIBITION |
| ISCMPT | STORED STATE/NON STORED STATE |
| REQPWR | REQUESTING POWER SUPPLY |
| USEPWR | POWER SUPPLY USED |
| REQBUS | REQUEST TO USE SERIAL BUS |
| REQRES | MECHANISM INITIALIZATION REQUEST |
| AFLEN | LED AUXILIARY LIGHT PROHIBITION/PERMISSION |
| REQFH | FOCUS HOLD OPERATION REQUEST |
| REQPF | PF OPERATION REQUEST |
| MACRO | MACRO SWITCH |

FIG. 10

LENS STORE INSTRUCTION (02H)

| COMPACT | |
|---|---|

LENS MECHANISM INITIALIZATION INSTRUCTION (03H)

| RESETL | |
|---|---|

LOW ELECTRIC CONSUMPTION MODE SHIFT INSTRUCTION (04H)

| STANDBY | |
|---|---|
| PFWEN | STBYEN |
| SRANK | |

PF OPERATION PERMISSION/PROHIBITION
ACTIVATION FACTOR PERMISSION RANK
STBYEN: LOW ELECTRIC CONSUMPTION SHIFT ENABLE/DISABLE

PERMISSION TO USE SERIAL BUS (05H)

| BUSFREE | |
|---|---|

OBTAINING BRIGHTNESS MEASURING DATA (06H)

| GETED | |
|---|---|
| TEMP | ENVIRONMENT TEMPERATURE |
| AVMAX | PHOTOGRAPHING MAXIMUM F-No. |
| AVO | PHOTOGRAPHING FULL OPEN F-No. |
| AVE | BRIGHTNESS MEASURING, FULL OPEN F-No. |
| AVM | MECHANISM FULL OPEN F-No. |
| ΔAV | EFFECTIVE F-No. DEVIATION |
| β | PHOTOGRAPHING MAGNIFICATION |
| DV | PHOTOGRAPHING DISTANCE |
| FV | FOCAL LENGTH |
| PZ1 | EXIT PUPIL POSITION 1 |
| PZ2 | EXIT PUPIL POSITION 2 |
| PLO1 | AMOUNT OF BIGNETTING 1 |
| PLO2 | AMOUNT OF BIGNETTING 2 |
| ΔPRE | PERIPHERAL ILLUMINANCE VARIATION RATIO |
| MEOK | FULL APERTURE METERING ENABLE/DISABLE |
| SAMEN | MULTIDIVISIONAL/SPOT BRIGHTNESS MEASURING ENABLE/DISABLE |
| DVEN | DV, β AVAILABILITY |
| FMEN | FM CONTROL ENABLE/DISABLE |
| AVSHIFT | FULL OPEN ADJUSTMENT CAM USED |

FIG. 11

OBTAINING CURRENT APERTURE VALUE (07H)

| GETAV | | |
|---|---|---|
| | AVNOW | CURRENT APERTURE VALUE |
| | AVMV | APERTURE BEING DRIVEN/STOPPED |
| | AVHLD | ELECTRICITY CONDUCTION FOR APERTURE HELD/NON-CONDUCTION OF ELECTRICITY |
| | FINMVA | APERTURE DRIVE INSTRUCTION ACKNOWLEDGMENT COMPLETED/NOT COMPLETED |
| | AVERR | APERTURE NORMALITY/ABNORMALITY |

APERTURE DRIVE INSTRUCTION (08H)

| MOVAV | | |
|---|---|---|
| | AVT | TARGET APERTURE VALUE |

APERTURE STOP INSTRUCTION (09H)

| STOPAV | |
|---|---|

OBTAINING DISTANCE MEASURING DATA (0AH)

| GETAD | | |
|---|---|---|
| | KP | COEFFICIENT TO EXCHANGE AMOUNT OF DEFOCUS TO REVOLUTION OF MOTOR |
| | FVLAT | FOCAL LENGTH DURING DISTANCE MEASURING |
| | DVPLAT | FOCUS LENS POSITION DURING DISTANCE MEASURING |
| | FADIR | DIRECTION OF DISTANCE MEASURING OPERATION RING |
| | LSTAB1 | SPEED STABILITY DURING DISTANCE MEASURING (RESULT) |

DISTANCE MEASURING SYNCHRONIZATION (0BH)
DISTANCE MEASURING ACCUMULATION TIME LAG

| LAT | | |
|---|---|---|
| | DELAY | |
| | LSTAB0 | LENS SPEED STABILITY (SPEED STABLE/UNSTABLE) |

OBTAINING FOCUS LENS DRIVE STATE (0CH)

| GETLST | | |
|---|---|---|
| | DVP | FOCUS LENS POSITION |
| | FLDIR | FOCUS LENS DRIVE DIRECTION |
| | LSPEED | FOCUS LENS DRIVE SPEED |
| | FLEND | FOCUS LENS TERMINAL/NON-TERMINAL |
| | FLMV | FOCUS LENS BEING DRIVEN/STOPPED |
| | FINMVL | FOCUS LENS DRIVE INSTRUCTION ACKNOWLEDGMENT COMPLETED/NOT COMPLETED |

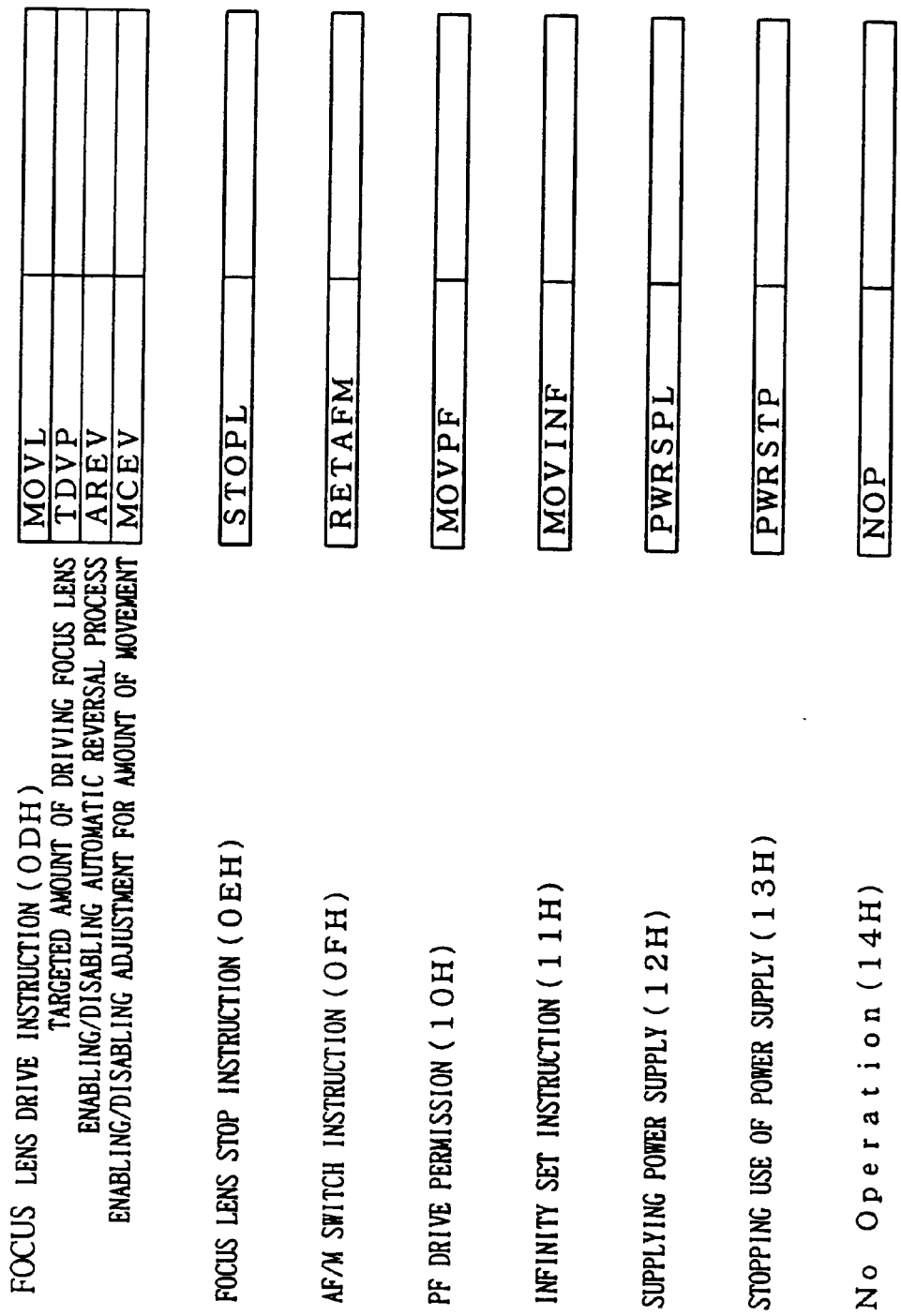

| bit | NAME OF SIGNAL | HEB | DEDICATED ACC | GENERAL-PURPOSE ACC | DECISION BY LENS |
|---|---|---|---|---|---|
| b7,6 | ICPB | 10 | + 00 | OR 00 | 10: NORMAL, ABNORMAL OTHERWISE |
| b5 | MCP | 0 | + 1 | OR 0 | Don't care |
| b4 | EXTRNG | 0 | + 0 | OR 1 | 1: GENERAL-PURPOSE ACC AMOUNTED |
| b3-0 | CONVID | 0000 | + 0000 | OR 0000 | VALUE OTHER THAN 0000: DEDICATED ACC MOUNTED |

~1111

LENS-EXCHANGEABLE CAMERA

This is a continuation of application Ser. No. 08/791,526, filed Jan. 30, 1997, now U.S. Pat. No. 5,809,354.

BACKGROUND OF THE INVENTION

1. Field of the Invention

The present invention relates to a lens-exchangeable camera and in particular to a lens-exchangeable camera in which a communication start signal is sent from the body side to the lens side.

2. Description of the Related Art

A camera system has been proposed in which a lens is mounted with a microcomputer and a microcomputer on the body side communicates with the microcomputer of the lens side to control the operation of the camera. Such a camera includes a camera in which the lens side has the initiative in various communications between the body and the lens (referred to as BL communications hereinafter) and a camera in which the body side has the initiative in BL communications.

Generally, no battery is incorporated within the lens. When the lens is mounted on the body, the microcomputer on the lens side receives power supply from the body side and starts to operate. In starting to operate, the microcomputer on the lens side requires some time after the power supply, since it waits for stabilization in signaling the signaling side, prepares for communication with the body or the like.

A camera which performs a conventional BL communication is configured as described above. In the camera system in which the lens side has the initiative in BL communication, communication with the body can be started as soon as the time described above elapses. In the camera system in which the body side has the initiative in the communication, however, preparation for communication on the lens side must be completed first and communication is then started. However, since the time described above varies depending on the performance of the microcomputer for the lens side, the temperature of the environment and the like, the microcomputer on the body side need start communication depending on the lens of a plurality of lenses used in combination which consumes the longest preparation time, and thus it takes a long time until communication is started.

SUMMARY OF THE INVENTION

Therefore, an object of the present invention is to provide a lens-exchangeable camera capable of communication between the body and the lens in the shortest time depending on the lens.

Another object of the present invention is to provide a lens used in a lens-exchangeable camera system, capable of communication between the body and the lens in the shortest time depending on the lens.

Still another object of the present invention to provide a method of communicating signals between a lens and a camera body in a lens-exchangeable camera system, to achieve communication between the body and the lens in the shortest time depending on the lens.

The above objects of the present invention are achieved by a lens-exchangeable camera system including the following components. That is, a lens-exchangeable camera system according to the present invention includes a body removably mounted with a lens and a lens mounted on the body. The body includes a power supply, a power supply supplying terminal for supplying power from the power supply to a lens mounted, and a communication circuit for communicating with a lens mounted. The lens includes a power supply input terminal electrically connected to the power supply supplying terminal for receiving power from the power supply via the power supply supplying terminal, a communication circuit of the lens side operated by power input from the power supply input terminal, for communicating with the communication circuit of the body side, initializer responsive to starting of power supplying from the power supply of the body for performing a predetermined initialization operation, and an inform unit for informing the body of completion of an initialization operation by the initializer.

In response to the informing by the inform unit, signal communication between the communication circuit of the body side and the communication circuit of the lens side is performed.

When the lens is mounted on the body and an initialization operation of the body side is completed, the lens side transmits to the body side a signal for informing the body side that a communication depending on the lens can be performed. The body side received the signal to start to communicate with the lens side. Thus a lens-exchangeable camera system capable of starting a communication with the body side in the shortest time period depending on the lens can be provided.

According to another aspect of the present invention, a lens used in a lens-exchangeable camera system includes: a power supply input terminal electrically connected to a power supply supplying terminal of a camera body for receiving power from a power supply provided at the camera body while the lens is mounted on the camera body; a communication circuit operated by power input from the power supply input terminal for communicating with the camera body; an initializer responsive to starting of power supplying from the camera body by mounting of the lens on the camera body for performing a predetermined initialization operation; and an inform unit for informing the camera body of completion of an initialization operation by the initializer. In response to the informing by the inform unit, the camera body and the communication unit start communication.

According to another aspect of the present invention, a method of communicating signals between a lens and a camera body in a lens-exchangeable camera system includes the steps of: supplying power from a power supply within the camera body to the lens when the lens is mounted on the camera body; performing a predetermined initialization operation in the lens in response to power supplying by the supplying step; informing the camera body from the lens of completion of an initialization operation by the initializing step; and transmitting a signal from the camera body to the lens in response to the informing by the informing step of completion of an initialization operation.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 9 illustrates signals communicated between the body side and the lens side.

FIG. 10 illustrates signals communicated between the lens side and the body side.

FIG. 11 illustrates signals communicated between the lens side and the body side.

FIG. 12 illustrates signals communicated between the lens side and the body side.

STRUCTURE OF CAMERA BODY AND LENS

DESCRIPTION OF THE PREFERRED EMBODIMENTS

In a camera to which the present invention is applied, a plurality of types of lenses can be used for the camera body and any one of the lenses can be mounted on the camera body.

Figure 1:
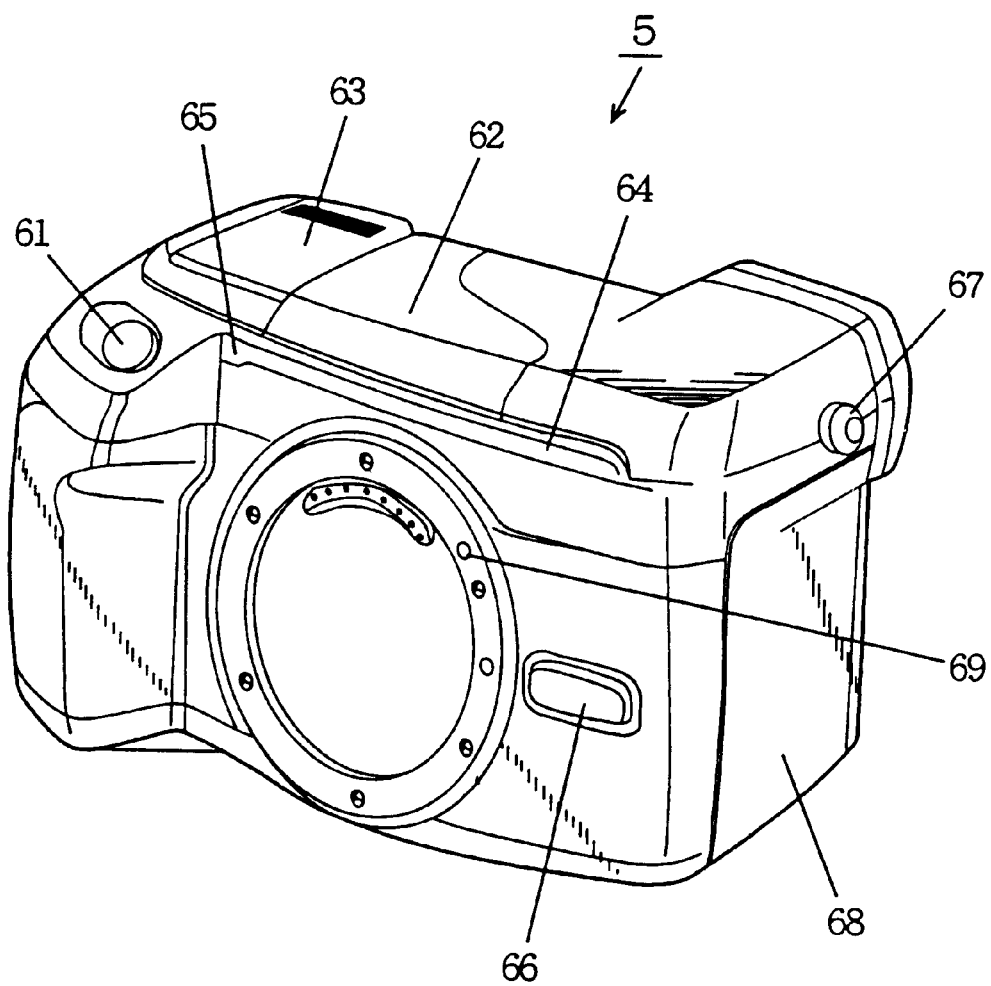
FIG. 1 shows the main portion of the body side.

FIG. 1 is a perspective view of the appearance of the camera body. Referring to FIG. 1, a body 5 includes a release button 61 provided at an upper portion of body 5, a built-in flash 15, and an accessory shoe 63 for mounting an accessory. Provided at the front side of the body 5 are a self timer/remote control operation display lamp 64, a remote control receiving portion 65 which receives a remote control signal, a lens release button 66 for releasing a lens (not shown), and a lens index 69 for mounting a lens (not shown) at a predetermined position. Provided on the side portion of body 5 are dioptor adjustment dial 67 for adjusting dioptor of the finder, and film chamber 68 for mounting a film.

Figure 2:
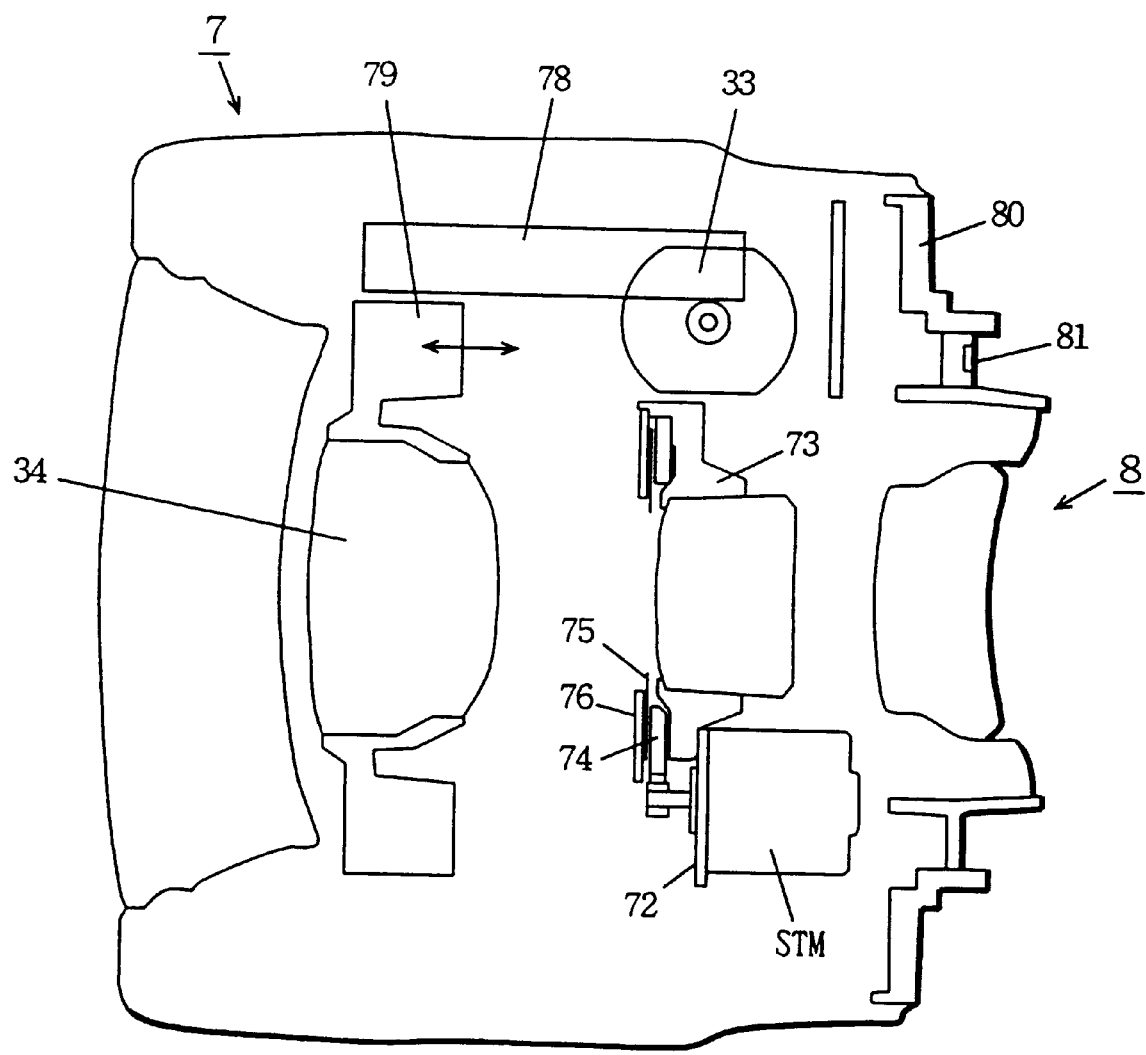
FIG. 2 is a cross sectional view of the lens.

FIG. 2 is a cross sectional view of a lens 7 mounted on camera body 5. Referring to FIG. 2, lens 7, mounted on body 5, is electrically connected to body 5 via a plurality of signal contacts 81 provided at a lens mount 80. In lens 7, focus lens 34 is moved in the direction designated by the arrow in the figure along an optical axis. Focus lens 34 engages via a focus lens frame 79 with a focus driving force transfer mechanism 78 which is driven by a focus drive motor 33. In lens 7, an aperture 8 is provided between focus lens 34 and the body. Aperture 8 is configured of a plurality of parts mounted on a housing 73, which will be described later. A stepping motor STM is provided for driving aperture 89. An aperture driving plate 74 is driven via motor base plate 72 for stepping motor STM. An aperture diapraghm 75 is provided between aperture driving plate 74 and a cam plate 76.

Figure 3:
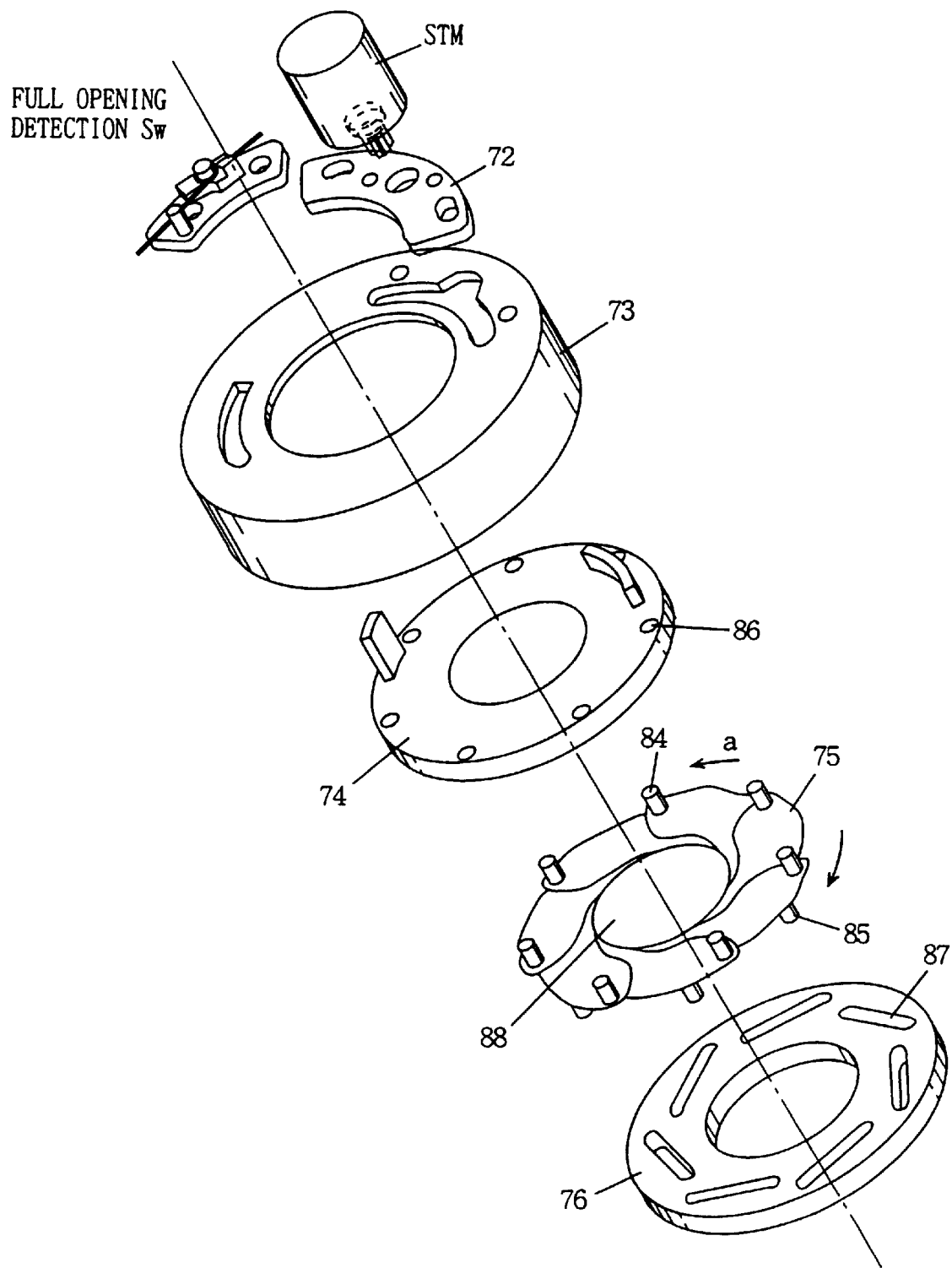
FIG. 3 schematically shows a structure of an aperture.

FIG. 3 shows a configuration of aperture 8. Referring to FIG. 3, various parts are mounted on housing 73 to form aperture 8, as described above. Pins 84 and 85 project on diaphragm 75 in the upper and lower directions. Pin 84 engages with a hole 86 of aperture driving plate 74, and pin 85 engages with a gap 87 of cam plate 76. When stepping motor STM is driven, aperture driving plate 74 is rotated. The rotation causes aperture diaphragm 75 to be moved via hole 86 and pin 84 in the direction designated by the arrow a and pin 85 on the other side to be moved along gap 87 provided in cam plate 76. The area of an opening 88 is thus controlled.

Figure 4A:
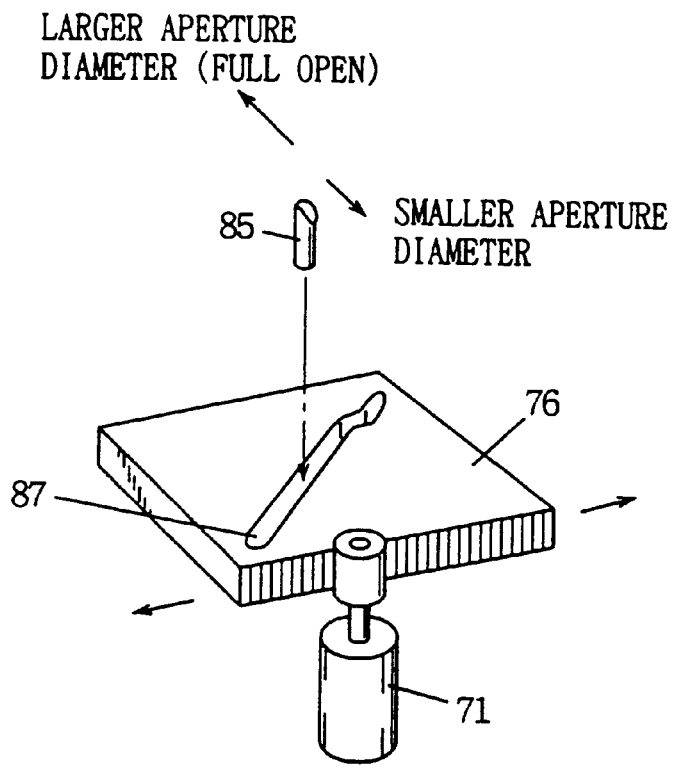
FIGS. 4A and 4B show a full open adjustment cam.

A plurality of lenses which can be mounted on camera body 5 include a lens with a full open adjustment cam 83 as cam plate 76. FIG. 4A is an enlarged partial view thereof with full open adjustment cam 83 as cam plate 76 shown in FIG. 3, and FIG. 4B is an enlarged view of gap 87 of full open adjustment cam 83.

Figure 4B:
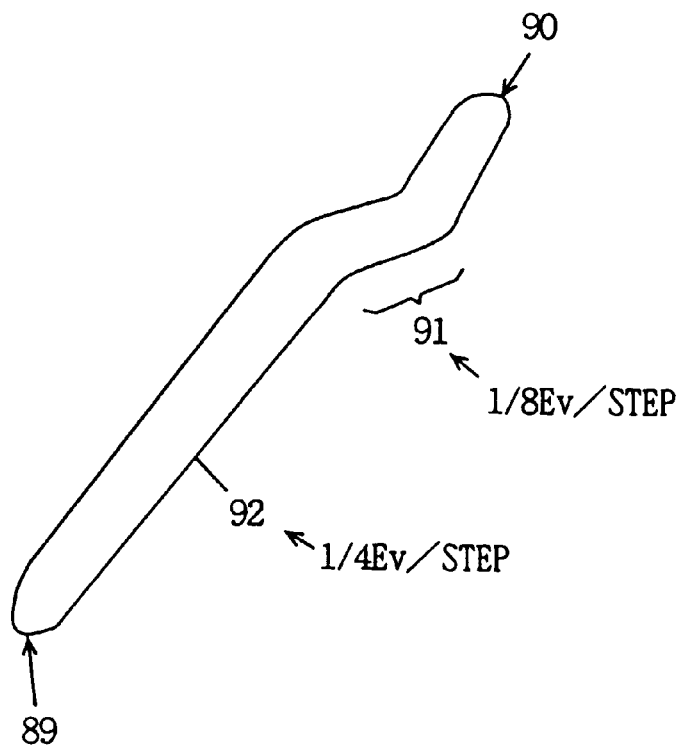

Referring to FIGS. 4A and 4B, in gap 87, stop-down position 89 is provided opposite to mechanism full open position 90. Provided near mechanism full open position 90 is an adjustment region 91 which allows the aperture to be controlled more precisely. More specifically, an aperture value changes by ¼ Ev per step of stepping motor STM in the normal region, whereas controlling by ⅛ Ev can be achieved in adjustment region 91. A general cam plate 76 other than full open adjustment cam 83 does not have adjustment region 91 and the aperture value changes at a constant pitch.

Figure 5:
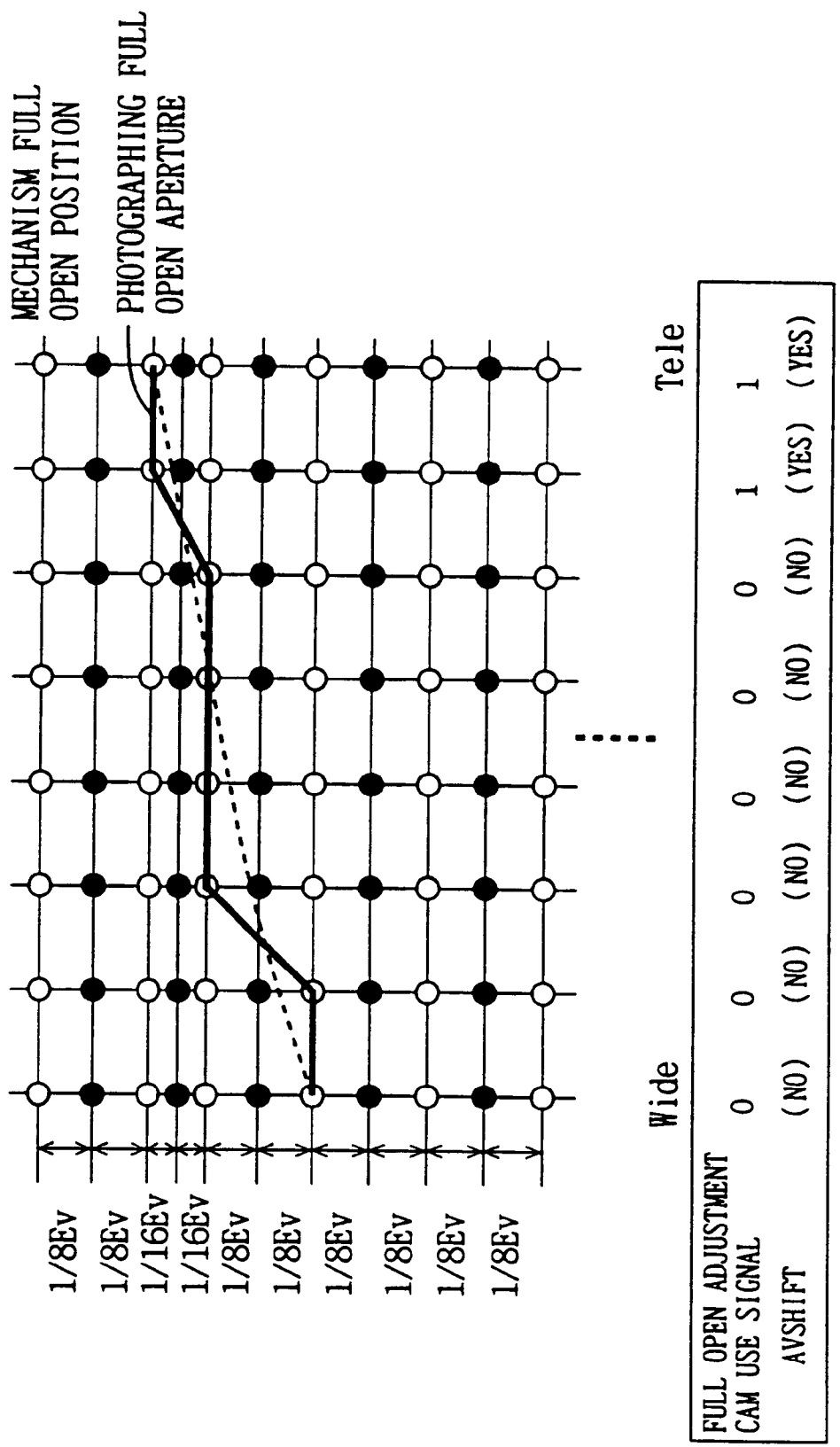
FIG. 5 shows a relation between the AVSHIFT signal and an aperture value.

FIG. 5 shows the state of a full open adjustment cam used signal AVSHIFT and the state of the aperture when full open adjustment cam 83 is used. The full open adjustment cam used signal AVSHIFT indicates whether adjustment region 91 of full open adjustment cam 83 is being used, which will be described later. Referring to FIG. 5, the wide end and the tele end are shown in the figure on the left side and the right side, respectively. The resolution at which stepping motor STM can be stopped in a stable state when stepping motor STM is conducting electricity is different from that when stepping motor STM is not conducting electricity. More specifically, stepping motor STM can stop by ½ step of stepping motor STM (i.e., by ⅛ Ev) when stepping motor STM is conducting electricity, and by one step of stepping motor STM when the stepping motor STM is not conducting electricity. When the shutter speed exceeds four seconds, camera body 5 determines the aperture value such that stepping motor STM stops at the point at which stepping motor STM is put into a stable state when it is not conducting electricity.

For a typical lens to which full open adjustment cam 83 is not applied, whether an aperture value is at the stabilization point when stepping motor STM is not conducting can be determined by whether the difference between a set aperture value and a photographing full open aperture value sent from the lens is a multiple number of the resolution when stepping motor STM is not conducting electricity. The use of full open adjustment cam 83 allows an aperture value to become a stabilization point in adjustment region 91, even when the difference between an aperture value and a photographing full open aperture value is not a multiple number of the resolution when stepping motor STM is not conducting electricity.

In FIG. 5, the white points indicate the stabilization points when stepping motor STM is not conducting electricity, and the black points added as the stabilization points when stepping motor STM is conducting. The use of full open adjustment cam 83 allows a stabilization point normally taken at an interval of ¼ Ev to be taken at an internal of ⅛ Ev, as shown with the solid line in the figure.

CONTROL CIRCUIT

Figure 6:
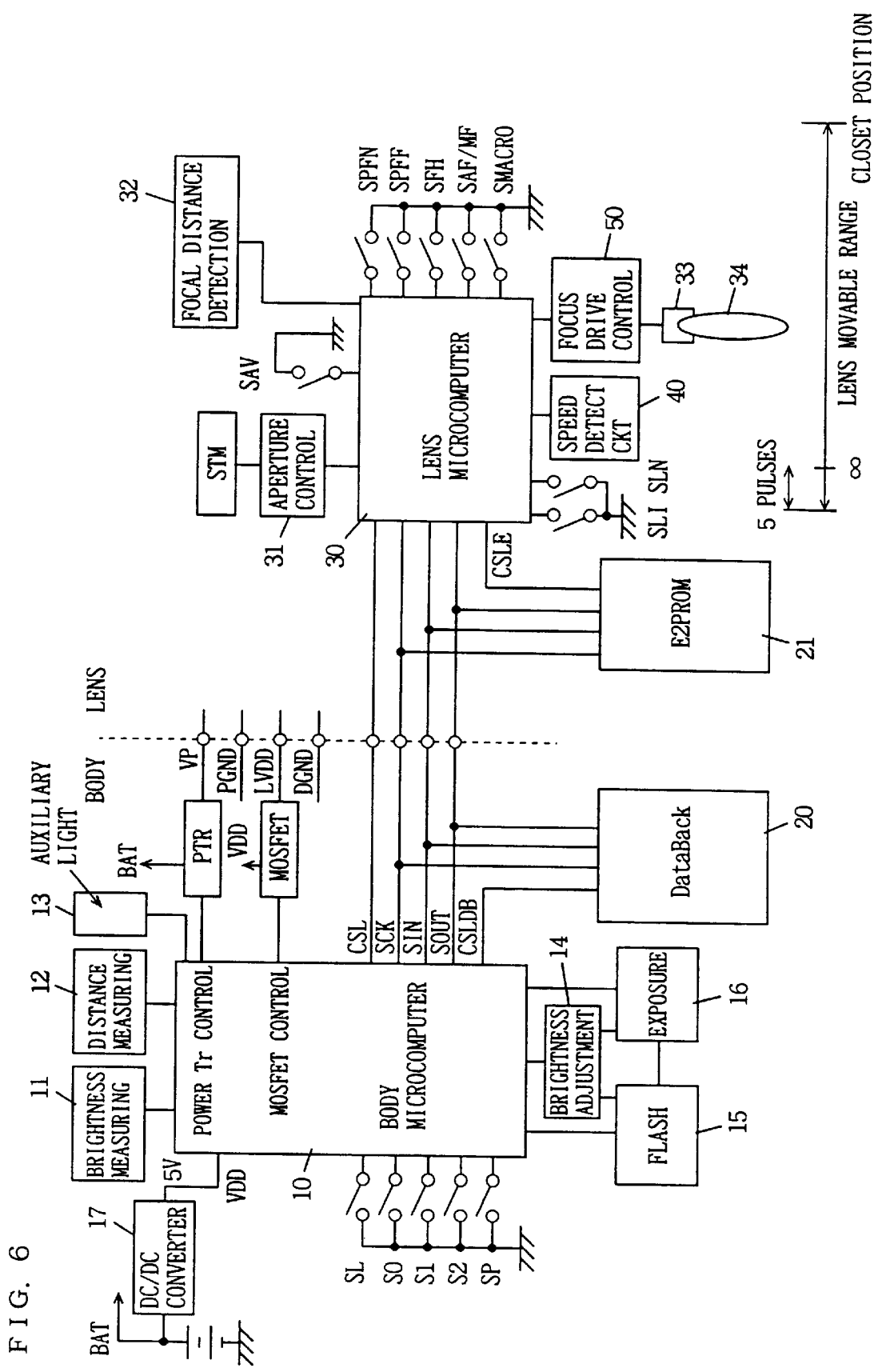
FIG. 6 is a block diagram showing the main portion of a control portion of a camera to which the present invention is applied.

FIG. 6 is a block diagram showing the main portion of a camera with camera body 5 mounted with lens 7. Referring to FIG. 6, body 5 and lens 7 are controlled by a microcomputer 10 of the body side and a microcomputer 30 of the lens side, respectively.

Body microcomputer 10 is connected to a brightness measuring circuit 11, a distance measuring circuit 12, an auxiliary light output circuit 13, a brightness adjustment circuit 14, a flash 15, and an exposure circuit 16.

Brightness measuring circuit 11 is selectively capable of multidivisional brightness measuring and averaged brightness measuring, and performs averaged brightness measuring when a signal indicating that full aperture metering is not applicable comes from the lens side.

Distance measuring circuit 12 measures the distance from an object. Auxiliary light output circuit 13 emits auxiliary light for auto focusing by an LED. Light having contrast is projected to an object with low contrast or low light. When an object is positioned at a close distance within the auto focus area, the object is not exposed to auxiliary light due to parallax.

Flash 15 is typically flashmatic (FM)-controlled based on subject distance. However, when an FM-inapplicable signal comes from the lens, TTL brightness adjustment control is performed.

Exposure circuit 16 controls exposure according to the operation of a shutter release switch described later.

Body microcomputer 10 receives a power supply voltage VDD from a battery BAT via DC/DC converter.

Body microcomputer 10 includes a lens mount switch SL which is turned on by mounting of a lens and is turned off by non-mounting of a lens, a lens switch S0, a brightness measuring and distance measuring switch S1 which is turn on at a first stroke of the shutter release switch 61 to drive brightness measuring circuit 11 and distance measuring circuit 12, a release switch S2 which is turned on at a second stroke of the shutter release button 61, and a program reset switch SP which initializes the operation mode of the camera when it is turned on.

Body microcomputer 10 is provided with a power transistor PTR, and a voltage driving an actuator for a lens is supplied to the lens side via a power supply terminal VP and a ground terminal PGND. This power supply is referred to as a power supply VP hereinafter.

Body microcomputer 10 is further connected to an MOSFET control terminal of an MOS electric field effect transistor MOSFET from which a voltage for the microcomputer and a logic circuit is supplied via a power supply terminal LVDD and a ground terminal DGND to the lens side. This power supply is referred to as a power supply LVDD hereinafter.

Body microcomputer 10 and lens microcomputer 30 are connected to each other by a chip select signal line CSL, a serial clock line SCK, a serial in line SIN and a serial out line SOUT, and body microcomputer 10 and lens microcomputer 30 communicate with each other via each serial signal line. Specifically, when body microcomputer 10 transmits a signal to lens microcomputer 30, chip select signal line CSL is set at low level, a clock pulse for communication is output on serial clock line SCK, and a serial signal is output in synchronization with the pulse on serial out line SOUT. On the other hand, when lens microcomputer 30 transmits a signal to body microcomputer 10, chip select signal line CSL is set at low level, a clock pulse for communication is output on serial clock line SCK, and a serial signal is output in synchronization with the pulse on serial in line SIN.

Body microcomputer 10 is connected on the body side to databack 20 via signal lines SCK, SIN and SOUT and a signal line CSLDB from body microcomputer 10.

Lens microcomputer 30 will now be described. Lens microcomputer 30 is provided with a stepping motor STM connected via aperture control circuit 31, a focal length detection circuit 32 for detecting a focal length of the lens, a full open aperture switch SAV which sets the origin at a full open aperture position, a speed detection circuit 40 for feedback so that the lens is properly positioned, as described later, and a focus drive control circuit 50. A motor 33 for a focus lens and a focus lens 34 are connected to lens microcomputer 30 via focus drive control circuit 50.

Speed detection circuit 40 inputs a pulse generated in response to movement of the lens and measures pulse interval. When a measurement result is the same as the previous measurement result, circuit 40 outputs HIGH. When a measurement result is different from the previous measurement result, circuit 40 outputs LOW. It also can output speed stability result during any period. It outputs HIGH when an indication that a measurement period begins is given. Then speed detection circuit 40 measures pulse interval, as described above, repeatedly, and outputs LOW when a measured time period differs from the previous measured time period. Thereafter, speed detection circuit 40 does not output HIGH until an instruction to start measuring is again given, even if a measured time is the same as the previous measured time. Furthermore, data related to pulse interval (corresponding to the driving speed) also can be output, which will be described in detail later.

Lens microcomputer 30 is provided with power focus switches SPFN and SPFF which perform power focusing toward the tele end and the wide end, respectively, a focus hold switch SFH which holds a lens position when it is turned on, a mode select switch SAF/MF which selects a mode of auto focus mode/manual focus mode (AF/MF), and a microswitch SMACRO which is turned on when a mode is switched to macromode. These switches are operated so that lens microcomputer 30 performs a desired operation.

Furthermore, lens microcomputer 30 is provided with lens terminal switches SLI and SLM which detect both end portions of the lens movable range so that the lens does not physically come into contact with end portions of body 5 in focus detection. Switch SLN turns on for the wide terminal and switch SLI turns on for the teleterminal.

Lens microcomputer 30 is connected on the lens side to an E2PROM 21 within the lens via signal lines SCK, SIN and SOUT and a signal line CSLE connected to lens microcomputer 30. E2PROM 21 within the lens stores data for lens adjustment.

DataBack 20 of the camera stores data for providing data such as date on a film.

Referring to signal lines SCK, SIN and SOUT between body microcomputer 10 and lens microcomputer 30, these lines are connected to perform communication between body microcomputer 10 and lens microcomputer 30, communication on the body side between body microcomputer 10 and DataBack 20, and communication on the lens side between lens microcomputer 30 and E2PROM 21. Thus a chip select signal CSL is used to determine which portion communicates with which portion via these signal lines. These signals are all active low signals.

Figure 7:
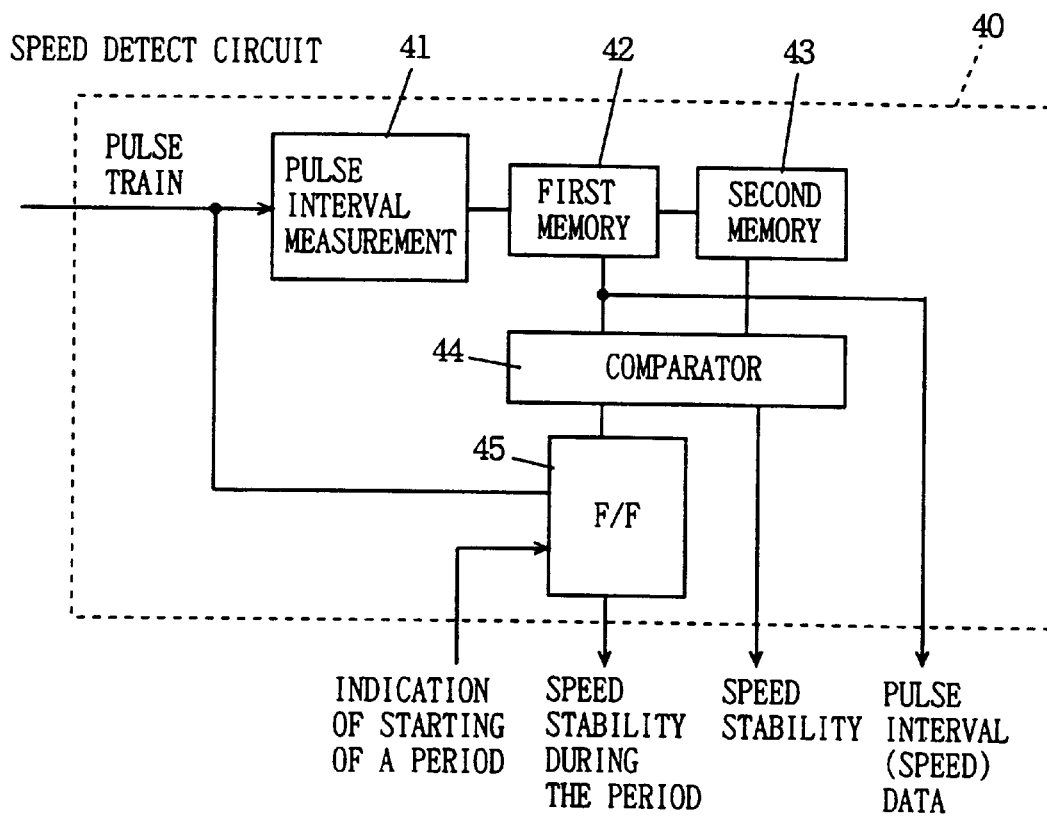
FIG. 7 is a block diagram showing the detail of a speed detect circuit.

FIG. 7 shows an internal configuration of speed detection circuit 40 shown in FIG. 6. Referring to FIG. 7, speed detection circuit 40 includes a pulse interval measuring portion 41 which receives a pulse train input from lens microcomputer 30 to measure pulse interval, a first memory 42 connected to pulse interval measuring portion 41 for storing a latest pulse interval measured, a second memory 43 connected to the first memory 42 for storing the previous pulse interval measured, a comparator 44 connected to the first memory 42 and to the second memory 43 for comparing pulses stored in memories 42 and 43, and a flipflop circuit 45 connected to a pulse train input and to comparator 44. The pulse train input is an output from a photo interrupter (not shown) which detects movement of focus lens 34.

Comparator 44 checks whether the lens is driven at constant speed or driven acceleratedly based on data stored in the first memory 42 and the second memory 43.

Flipflop circuit 45 receives from lens microcomputer 30 a period beginning time signal which determines a predetermined time for the speed detection, and responsively a signal which indicates whether the speed during the period is stable is output. Comparator 44 compares the pulse interval of the first memory 42 with that of the second memory 43 to output a signal which indicates whether the speed is stable. The first memory 42 outputs pulse interval data which indicates lens movement (speed).

Figure 8:
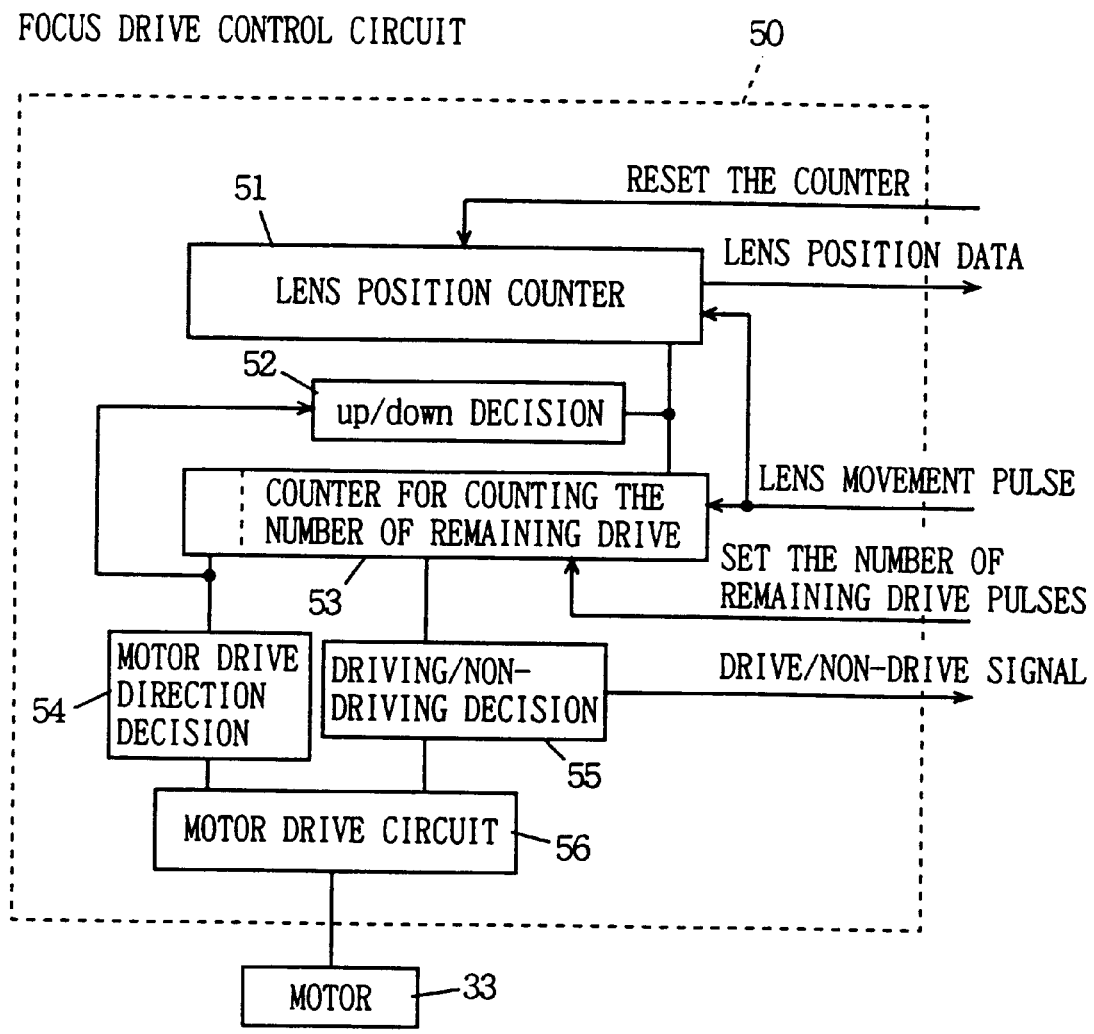
FIG. 8 is a block diagram showing the detail of focus drive control circuit.

FIG. 8 is a block diagram showing an internal configuration of a focus drive control circuit 50 shown in FIG. 6. Referring to FIG. 8, focus drive control circuit 50 includes a lens position counter 51 which receives an external counter reset signal and a lens movement pulse, an up/down decision circuit 52 connected to lens position counter 51, a counter 53 for counting the number of remaining drive pulses, connected to lens position counter 51 and to up/down decision circuit 52 and receiving a lens movement pulse and a signal setting the number of remaining pulses which indicates how much more distance the lens can be moved, a motor drive direction decision circuit 54 and a driving/non-driving decision circuit 55 both connected to counter 53 for counting the number of remaining drive pulses, and a motor drive circuit 56 connected to motor drive direction decision circuit 54 and to driving/non-driving decision circuit 55. An output of motor drive circuit 56 is input to motor 33.

The number of remaining drive pulses has the MSB representing the drive direction and the less significant bits representing the number of remaining drive pulses, and approaches zero by driving focus lens 34. The MSB of data input to count 53 for counting the number of remaining drive pulses is set at 1 when focus lens 34 is driven toward the wide side and at 0 when it is driven toward the teleside. This is exploited by motor drive direction decision circuit 54 to decide the motor drive direction. Furthermore, the bits other than the MSB are connected to driving/non-driving decision circuit 55 to drive motor 33 when the counter value is not 0. Driving/non-driving decision circuit 55 refers to the value of counter 53 for counting the number of remaining drive pulses to output a driving/non-driving signal deciding whether or not to drive motor 33. The output of count 53 for counting the number of remaining drive pulses is also fed back to up/down decision circuit 52. Position counter 51 is reset when the position of focus lens 34 is initialized or set at infinity. Thus, when the lens is set at optical infinity, the counter value is set at 0. To move the lens in a predetermined direction without targetting any particular position due to power focusing, low contrast/low light scanning or the like, the amount of remaining driving is set at the maximum value. To stop the lens, the amount of remaining driving is set at 0.

COMMUNICATION BETWEEN THE BODY AND THE LENS

A communication between body 5 and lens 7 mounted (referred to as a BL communication hereinafter) will now be described. FIGS. 9–12 illustrate each signals transmitted in a BL communication. Signals transmitted from body microcomputer 10 to lens microcomputer 30 are shown on the left hand, and signals transmitted from lens microcomputer 30 to body microcomputer 10 are shown on the right side.

Communication Header HEB/Communication Header HEL

In performing a BL communication, body microcomputer 10 transmits the communication header HEB described later to lens microcomputer 30, and the lens side returns a communication header HEL to body microcomputer 10. Then, body microcomputer 10 transmits a communication mode signal depending on the state of the camera, and a signal according to the communication mode is communicated between the body and the lens. Hereinafter, a content of each communication signal will be described. The contents of the communications will be specifically described later with reference to the flow charts.

Communication header HEB is a signal including the four types of signals described later and is transmitted from the body to the lens when a BL communication is started.

A detection signal ICPB which detects communication normality/abnormality of communication header HEB checks whether serial signal lines SCK, SIN and SOUT are normally connected. When detection signal ICPB indicates a value other than 10, the lens assumes that an abnormality is found in a signal line, and transmits a signal which prohibits release to the body, which will be described later.

A dedicated converter mounted detection signal MCP of communication header HEB detects whether a dedicated intermediate accessory (a teleconverter, for example) has been mounted. A dedicated intermediate accessory adds 1 to dedicated converter mounted detection signal MCP. When intermediate accessories are successively mounted in a multiple way, an overflow from bit 5 is caused and the detection signal ICPB is changed to a value other than 10 and thus release is prohibited, as described above, which will be described in detail later.

A general-purpose accessory mounted detection signal EXTRNG of communication header HEB detects whether a general-purpose intermediate accessory (a bellows, for example) has been mounted. A general-purpose intermediate accessory adds 1 to general-purpose accessory mounted detection signal EXTRNG. When lens microcomputer 30 detects the bit and hence that a general-purpose accessory has been mounted, a function such as brightness measuring is restricted, which will be described in detail later.

A dedicated converter type identify signal CNVID of communication head HEB detects the type of a dedicated intermediate accessory. The signal is rewritten at a value specific to a dedicated intermediate accessory within the accessory. This signal allows the lens to identify the type of the accessory and perform a signal processing depending on the accessory. When general-purpose accessory mounted detection signal EXTRNG is 1 and dedicated converter type identify signal CNVID is not 000, the lens assumes that a general-purpose intermediate accessory and a dedicated accessory are mixed and successively mounted and transmits to the body a signal to prohibit release, which will be described later.

Communication header HEL of the lens side is transmitted from the lens to the body in response to communication header HEB of the body side when a BL communication is started. A communication normality/abnormality signal ICPL checks whether serial signal lines SCK, SIN and SOUT are normally connected. When the detect signal ICPL is a value other than 10, the body assume that an error is found in a signal line (i.e., no lens) and performs the subsequent operation.

A release enable/disable signal REN indicates whether the lens side is ready for photographing. When release enable/disable signal REN received at body microcomputer 10 is 0, release is prohibited. This is ignored, however, when communication normality/abnormality signal ICPL does not indicate an abnormality (i.e., ≠10).

A reset start indication signal RRST indicates that lens microcomputer 30 has been reset and started. The signal is set at 1 in the communication after lens microcomputer 30 is reset and started, and at 0 in the communication since the body/lens identification communication described later is performed.

Boy/Lens Identify Signal GETTYP

A body/lens identify signal GETTYP will now be described. This signal indicates a communication mode. By transmitting the various signals described later after this signal, body microcomputer 10 and lens microcomputer 30 identify each other. This signal is represented by 00H. Communications of the various signals described below are generally referred to as body/lens identify signal GETTYP communication.

A body identify signal BIDC identifies body type (i.e., model code).

A BL communication version (body) signal VERB indicates the version of a BL communication in which body microcomputer 10 is.

A signal EXTRNG detects mounting of a general-purpose intermediate accessory (a bellows, for example), as described above. Lens microcomputer 30 transparently outputs a signal EXTRNG received. Body microcomputer 10 uses this signal to detect that a general-purpose intermediate accessory has been mounted.

A dedicated converter type identify signal CNVID detects the type of a dedicated intermediate accessory. Lens microcomputer 30 transparently outputs a signal CNVID received. Body microcomputer 10 uses this signal to detect that a dedicated intermediate accessory has been mounted and the type of the intermediate accessory.

A lens identify signal LIDC identifies lens type (i.e., model code).

A BL communication version (lens) signal VERL indicates the version of BL communication in which lens microcomputer 30 is.

A signal NOTINF indicates whether the reference for a position of focus lens 34 matches with optical infinity. This signal is set at 0 when the reference matches with optical infinity position, and at 1 otherwise.

A power focus lens signal PFLENZ indicates whether a lens has power focus function.

A signal AVUNIT indicates the resolution of aperture of a lens (⅛ Ev, ¼ Ev, ½ Ev, two values variable).

BL Request Obtain Signal GETREQ

A BL request obtain signal GETREQ will now be described. This signal, represented by 01H, indicates a communication mode. After transmission of this signal, the various signals described below are transmitted from lens microcomputer 30 to body microcomputer 10 to transmit various requests and states of the lens. Communications of the various signals described below are generally referred to as BL request obtain signal GETREQ communication.

An AF/MF signal AFM informs the body of a state of a mode select switch SAF/MF for selection of auto focusing/manual focusing (AF/MF) of the lens. If this switch is a push switch, AF/MF is switched every time the switch is turned on. If the lens is switchable between zoom state and macro state, MF is applied.

AF return enable/disable signal RAFEN informs the body of the type of a mode select switch SAF/MF of the lens. If mode select switch SAF/MF is a push switch, AF return enable/disable signal RAFEN=1.

A focus drive enable/disable signal FDEN indicates whether an actuator for focus lens 34 can be driven.

A direct PF prohibit signal LMFSW informs the body of a state of a switch for prohibiting direct power focusing. In the present embodiment, mode select switch SAF/MF also serves as this switch. When a main switch S0 is turned on and mode select switch SAF/MF is turned on, the body switches prohibition/permission of direct power focusing. The direct power focusing is an operation which enables power focusing without switching to the manual focus mode when brightness measuring and distance measuring switch S1 is turned on to perform auto focusing and an in-focus state is achieved.

A power supply request signal REQPWR requests the body to supply the power supply. It is a signal by which the lens side requests power supply when a function (compensation for camera-shake, for example) which is not currently used is mounted on the lens in the future.

A power-power supply used signal USEPWR indicates that the power supply is being used.

Request signal REQBUS for using a serial bus requests that the body release a serial signal line within the lens when the serial bus is to be used. The signal is used, for example, in communication between the lens microcomputers 30 and E2PROM 21 within the lens.

A mechanism initialization request signal REQRES requests to initialize the mechanical portion within the lens. When the lens mechanism initialization instruction RESETL described later is transmitted from the body computer 10, mechanism initialization request signal REQRES is held at 1 until the initialization is completed.

An LED auxiliary light prohibition/permission signal AFLEN prohibits/permits auxiliary light projection from an LED when distance measuring cannot be performed due to low contrast, low luminance or the like. For a lens exclusively used for macrophotographing, an object within the auto focus area is not exposed to auxiliary light due to parallax and thus auxiliary light projection is prohibited.

A focus hold request signal REQFH informs body microcomputer 10 that a focus hold button has been operated and that a focus hold switch SFH has been turned on.

A PF operation request signal REQPF informs body microcomputer 10 that power focus switches SPFN and SPFF are being operated.

Macro switch signal MACRO informs body microcomputer 10 that the lens side has been switched and set in macro state.

Lens Store Instruction COMPACT

A lens store instruction COMPACT for positioning focus lens 34 at a predetermined shortest distance from the body will now be described. When lens microcomputer 30 receives this signal, focus driving, zoom driving (for a power zoom lens) and collapsing (for a lens collapsible by electric driving) are performed so that focus lens 34 is positioned at the shortest distance. This signal is represented by 02H.

Lens Mechanism Initialization Instruction RESETL

A lens mechanism initialization instruction RESETL for performing initialization of the mechanical portion on the lens side will now be described. This signal is represented by 03H. When lens microcomputer 30 receives this instruction, lens microcomputer 30 performs initialization of focus lens 34 and the aperture.

Low Electric Consumption Mode Shift Instruction STANDBY

A low electric consumption mode shift instruction STANDBY indicating an activation condition from lens microcomputer 30 when body microcomputer 10 sleeps, will now be described. This signal, represented by 04H, indicates a communication mode. After transmission of this signal, the various signals described later are communicated between body microcomputer 10 and lens microcomputer 30. Communications by the various signals described below are generally referred to as low electric consumption mode shift instruction STANDBY communication.

A PF operation permission/prohibition signal PFWEN permits/prohibits activation of body microcomputer 10 by lens microcomputer 30 due to power focus operation. Lens microcomputer 30 need not to respond to power focus operation and thus electric consumption can be reduced.

An activation factor permission rank signal SRANK is data for permitting/prohibiting an activation factor from lens microcomputer 30 to body microcomputer 10 when body microcomputer 10 is in sleep state. This signal is divided into three ranks determined depending on the operation state of the body side. Rank 1 corresponds to the time when the flash is being charged with brightness measuring and distance measuring switch S1 turned on. Basically the activation by the lens side cannot be performed, and the activation is performed only when an abnornality is found in the lens. Rank 2 corresponds to the time when the flash is being charged with brightness measuring and distance measuring switch S1 turned off. The activation is permitted by switching the mode select switch SAF/MF. Rank 3 correspond to the sleep state other than the above. It responds to all of the operation switches.

A low electric consumption shift enable/disable signal STBYZEN indicates whether it is possible to shift to the low electric consumption mode. After this communication, the body enters a sleep state.

Permission Signal BUSFREE to Use a Serial Bus

A permission signal BUSFREE to use a serial bus which permits using a serial signal line on the lens side, will now be described. This signal is represented by 05H. When this communication is completed, body microcomputer 10 releases a serial signal line. When lens microcomputer 30 receives this signal, lens microcomputer 30 communicates with a local device (E2PROM 21, for example) within the lens. When the communication is completed, lens microcomputer 30 sets signal CSLNS at 1 to inform body microcomputer 10 that the communication is completed.

Brightness Measuring Data Obtain Signal GETED

A brightness measuring data obtain signal GETED will now be described. This signal, represented by 06H, indicates a communication mode. After transmission of this signal, the various signals described later are communicated between body microcomputer 10 and lens microcomputer 30 to transmit data on brightness measuring. Communications of the various signals described below are generally referred to as brightness measuring-data obtain signal GETED communication.

An environment temperature signal TEMP indicates data on temperature measured on the body side.

A photographing maximum F number signal AVMAX indicates the maximum F number of a lens.

A photographing full open F number signal AVO indicates a full open F number according to the optical design manual of a lens.

A brightness measuring full open F number signal AVE indicates an optically maximum F number determined depending on the light beam passing through a lens with the aperture set at the maximum aperture diameter position.

A mechanism full open F number AVM, is a maximum F number determined by the position of diaphragms (i.e., the diameter) when the aperture is set at the maximum aperture diameter position.

An effective F number deviation signal $\Delta AV$ is data in variation of an effective F number when focus lens 34 is moved forward.

A photographing magnification signal $\beta$ is photographing magnification data. It is obtained from focal length of the lens and forward movement position of focus lens 34.

A photographing distance DV provides photographing distance data. It is obtained from forward movement position of focus lens 34.

A focal length signal FV provides focal length data.

An exit pupil position 1 signal PZ1 and an exit pupil position 2 signal PZ2 provide the exit pupil position data for image heights of 5 mm and 14 mm with the aperture set at the full open position, respectively.

A signal RL01 for the amount of vignetting 1 and a signal RL02 for the amount of vignetting 2 provide data on the amount of variation illuminance at image heights of 5 mm and 14 mm when compared with that at an image height of 0 mm with the aperture set at the full open position, respectively.

A peripheral illuminance variation ratio signal $\Delta PRE$ provides data on the difference between a reduced amount of illuminance at an image height of 14 mm compared with that at an image height of 0 mm with the aperture set at the full open position, and a reduced amount of illuminance at an image height of 14 mm compared with that at an image height of 0 mm when the aperture is stopped down at 1 Ev. Generally a lens has an improved peripheral illuminance by stepping down of aperture. Body side microcomputer 10 uses this information and the signals PZ1, PZ2, RL01 and RL02 to calculate a reduced amount of illuminance of the edge of image field at an arbitrary aperture.

A full aperture metering enable/disable signal MEOK provides data indicating whether full aperture metering can be performed. When the aperture is not full open, full aperture metering is prohibited.

Multidivisional/SPOT brightness measuring enable/disable signal SAMEN provides data on whether multidivisional brightness measuring/SPOT brightness measuring can be performed. When a general-purpose intermediate accessory is mounted, multidivisional/SPOT brightness measuring is prohibited and the body performs averaged brightness measuring.

A DV and $\beta$ availability signal DVEN is data on whether photographing magnification signal $\beta$ and photographing distance signal DV are available.

An FM control enable/disable signal FMEN is data indicating whether flashmatic control can be performed.

A full open adjustment cam used signal AVSHIFT is data indicating whether a full open adjustment cam is being used. When a full open adjustment cam is not used, the aperture can be set by the aperture resolution with reference to the mechanism full open F number described above. When an adjustment cam is used, aperture resolution is doubled only for one step from mechanism full open F number AVM, which will be described in detail later.

Current Aperture Value Obtain Signal GETAV

A current aperture value obtain signal GETAV will now be described. This signal, represented by 07H, indicates a communication mode. After transmission of this signal, the various signals described later are transmitted from lens microcomputer 30 to body microcomputer 10 to transmit data on a current aperture value to the body side. Communications of the various signals described below are generally referred to as current aperture value obtain signal GETAV communication.

A current aperture value signal AVNOW provides data on a current position of the aperture.

An aperture drive/stop signal AVMV is data indicating whether the aperture is being driven. Although generally aperture driving is completed within lens time lag, the signal is provided for detecting incompletion of aperture driving due to some abnormality, or the like.

An aperture electricity conduction hold/non-conduction signal AVHLD is data indicating whether electricity conduction of the aperture is being held.

An aperture drive instruction acknowledgement completion/incompletion signal FINMVA is data indicating whether the aperture drive instruction MOVAV and aperture stop instruction STOPAV described later are acknowledged by the processing on the lens side. The signal is set at 0 when the instructions are output, and at 1 when an acknowledgement by the processing is completed.

An aperture abnormality/normality signal AVERR is data indicating that an error has occurred in aperture driving.

Aperture Drive Instruction MOVAV

An aperture drive instruction MOVAV which causes the lens to drive the aperture will now be described. The signal, represented by 08H, indicates a communication mode. A target aperture value signal AVT is transmitted after aperture drive instruction MOVAV. Communications of these signals are generally referred to as aperture drive instruction MOVAV communication.

Target aperture value signal AVT is data indicating an F number targeted.

Aperture Stop Instruction Signal STOPAV

A communication to cancel holding electricity conduction for the aperture motor is performed with an aperture stop instruction signal STOPAV, which is represented by 09H.

Distance Measuring Data Obtain Signal GETAD

A distance measuring data obtain signal GETAD for performing a communication for obtaining data related to distance measuring, will now be described. This signal, represented by 0AH, indicates a communication mode. The transmission of the various signals described below which are transmitted after signal GETAD is generally referred to as distance measuring data obtain signal GETAD communication.

A coefficient KP to exchange the amount of defocus to revolution of the motor is data representing a relation between the amount of defocus and the amount of forward movement.

A focal length signal FVLAT during distance measuring represents information on focal length in distance measuring integration specified by distance measuring integration time lag.

A focus lens position signal DVPLAT during distance measuring represents positional information of focus lens 34 in distance measuring integration specified by distance measuring integration time lag.

A distance operation ring direction signal FADIR is data representing a relation between rotation direction of a distance operation ring and movement direction of a focal point. Typically, for a focus operation ring and a lens switchable between zoom state and macro state, operation direction of a zoom operating ring is associated with movement direction of a focal point.

A speed stability (result) signal LSTAB1 during distance measuring is data representing whether focus lens 34 driving speed is stable in a distance measuring component. It signals that the driving speed is unstable when there is any change in the driving speed from a distance measuring synchronization signal LAT communication through this communication.

Distance Measuring Synchronization Signal LAT

A distance measuring synchronization signal LAT which informs the lens side of distance measuring timing will now be described. This signal, represented by 0BH, indicates a communication mode. After distance measuring synchronization signal LAT, a distance measuring integration time lag signal DELAY and a lens speed stability (the speed is stable/unstable) signal LSTAO are transmitted. Communications of these signals are generally referred to as distance measuring synchronization signal LAT communication.

Distance measuring integration time lag DELAY represents time lag information from the completion of this communication until the central time of integration for the next distance measuring. The lens side stores the lens position when a specified time elapses.

Lens speed stability (the speed is stable/unstable) signal LSTABO is information representing whether focus lens 34 driving speed is changing (unstable) or stable (including a stop state).

Focus Lens Drive State Obtain Signal GETLST

A focus lens drive state obtain signal GETLST performing a communication for obtaining each state of focus lens 34, will now be described. This signal, represented by 0CH, indicates a communication mode. The transmission of the various signals described below which are transmitted after signal GETLST is generally referred to as focus lens drive state obtain signal GETLST communication.

A focus lens position signal DVP represents information on a current position of focus lens 34. Based on optical infinity, the closer side is positive and the overside is negative.

A focus lens drive direction signal FLDIR represents information on drive direction of focus lens 34.

A focus lens drive speed signal LSPEED represents information on focus lens 34 driving speed.

A focus lens terminal/non-terminal signal FLEND represents information on whether focus lens 34 is positioned at a terminal position.

A focus lens drive/stop signal FLMV represents information on whether focus lens 34 is being driven.

A focus lens drive instruction acknowledgement completion/incompletion signal FINMVL represents information on whether an acknowledgement to a focus lens 34 driving instruction has been completed. The signal is set at 0 when the focus lens drive information MOVL described below is received, and at 1 when an acknowledgement by the processing is completed.

Focus Lens Driving Instruction MOVL

A focus lens driving instruction MOVL which causes driving of the focus lens will now be described. This signal, represented by 0DH, indicates a communication mode. The communication of various signals transmitted thereafter is generally referred to as focus lens drive instruction MOVL communication.

A signal TDVP for the targeted amount of focus lens driving represents information on the amount of focus lens 34 driving. The rotation direction is specified depending on whether the data is positive or negative.

An automatic reversal process enable/disable signal AREV indicates whether automatic reversal process is to be performed.

A signal MCEV for enabling/disabling adjustment for the amount of movement indicates whether adjustment for the amount of movement is to be performed.

Focus Lens Stop Instruction STOPL

A focus lens stop instruction STOPL is used to stop the driving of focus lens 34. This signal is represented by 0EH.

AF/FM Switch Instruction RETAFM

For a AF/FM switchable lens, AF/FM switching is instructed using an AF/FM switch instruction RETAFM represented by 0FH.

PF Drive Permission Signal MOVPF

A PF drive permission signal MOVPF is used to permit the lens to perform power focus drive. The signal is represented by 10H.

Infinity Set Instruction MOVINF

An infinite set instruction MOVINF is used to drive the lens to the optical infinity. The signal is represented by 11H.

Power Power Supply Signal PWRSP

A power supply signal is used to inform lens microcomputer 30 that supplying power supply is started. The signal is represented by 12H.

Signal PWRSTP for Prohibiting Using Power Supply

A signal PWRSTP for prohibiting using the power supply is used to stop using power supply VP. The signal is represented by 13H.

No Operation Signal NOP

A dummy communication in which nothing is performed is indicated by a no operation signal NOP. This signal is represented by 14H.

CONTROL FLOW CHART OF BODY MICROCOMPUTER

A content of BL communication will now be described more specifically with reference to the flow charts. First, a control procedure carried out by body microcomputer 10 will be described with reference to the flow charts.

BL Communication

Figure 13:
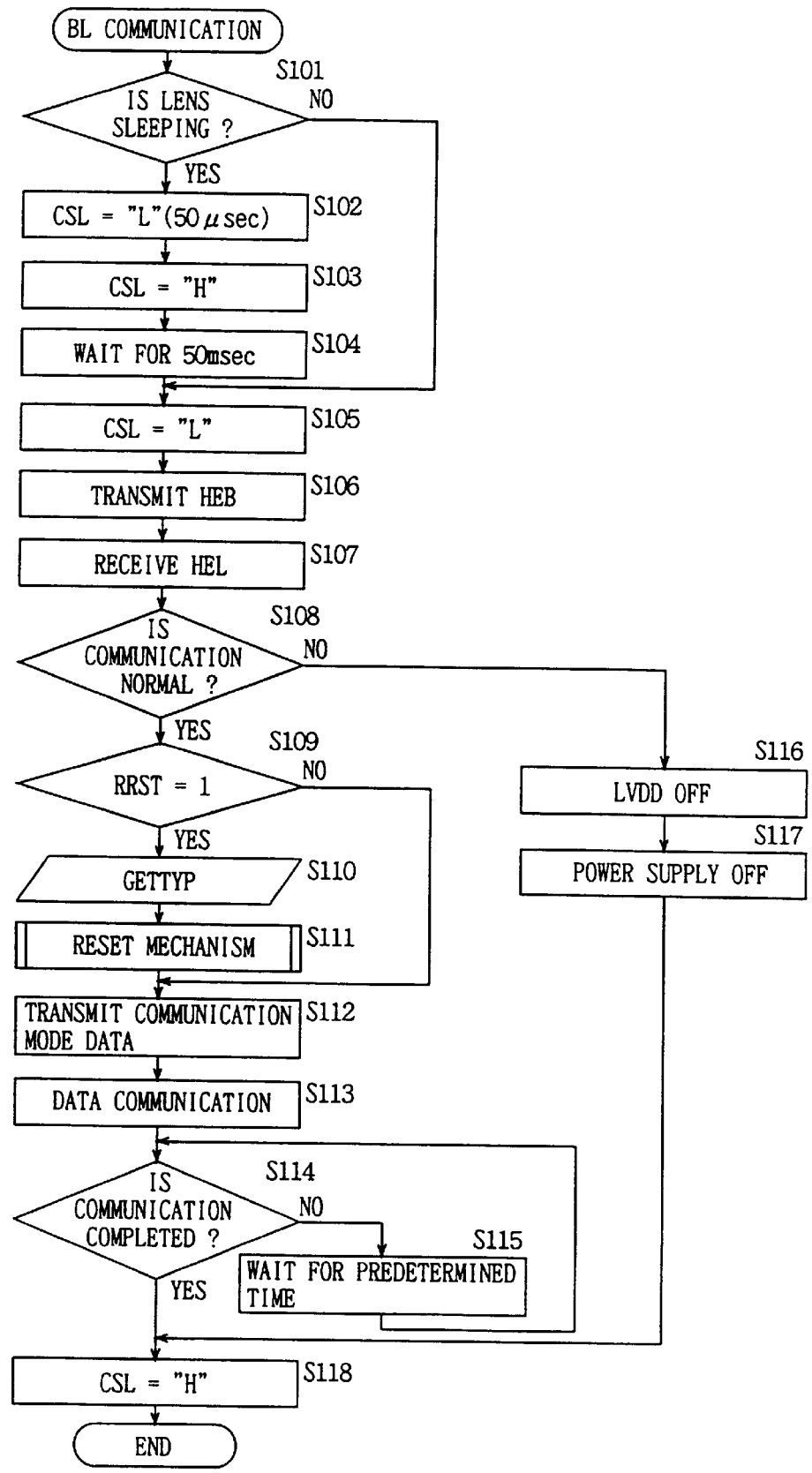
FIG. 13 is a flow chart of a content of a BL communication.

FIG. 13 is a flow chart of various signal communications (BL communications) between body microcomputer 10 and lens microcomputer 30 in a processing procedure of body microcomputer 10. FIG. 13 shows a processing procedure performed in various signal communications indicated inside the symbol of parallelogram in FIG. 14. During the processings of steps S112 and S113 described later, the signals indicated within the symbol of parallelogram are transmitted. Prior to describing the flow charts from FIG. 14 onward, a general procedure of various signal communications in the present embodiment will be described with reference to FIG. 13, and only the names of the signals are indicated in describing the flow charts from FIG. 14 on, and specific communication procedures thereof follow the processing shown in FIG. 13.

Referring to FIG. 13, when the lens is sleeping (that is, after the low electric consumption mode shift instruction STANDBY is output to the lens and when the body is activated from a sleep state not by the lens), chip select signal CSL falls to LOW for 50 μSEC arid then rises to activate the lens. It is necessary to wait until the lens can communicate (50 m SEC), and then communication is started (steps S101–S104, the term "step" is not repeated hereinafter).

Chip select signal CSL is set at LOW (S105), communication header HEB is output (S106) and then communication header HEL is input from the lens (S107). When communication header HEL is checked to :Eind that any communication header HEL has not been input, a decision that a lens is not mounted is made and a power supply to the lens, more specifically, power supply LVDD and power supply VP are turned off (NO in S108, S116, S117).

When communication header HEL is input (YES in S108), reset start detection signal RRST of communication header HEL is checked and if the lens has been reset and started, body/lens identify signal GETTYP is communicated to exchange identify signals of each other and the like and a mechanism reset subroutine is carried out (S109–S111). When lens microcomputer 30 is reset with a lens mounted, lens microcomputer 30 can transmit to body microcomputer 10 reset start detect signal RRST indicating that lens microcomputer 30 has been reset, so that body microcomputer 10 can transmit identification data to lens microcomputer 30 and the mechanism within the lens also can be reset. Thus, malfunction of the lens can be prevented.

Then, a BL communication mode signal is transmitted (S112) and a communication of data is performed according to the communication mode (S113, S114). In performing data communication in a plurality of types of modes, chip select signal CSL waits at LOW for a predetermined time period (1 mSEC) and then the next communication is performed (S115). In the flow charts from FIG. 14 onward, when communications are successively performed, the processings of S111–S115 described above are repeatedly performed. When the communication(s) are completed, chip select signal CSL is set at HIGH to terminate the communication(s) (S118).

Main Flow Chart

Figure 14:
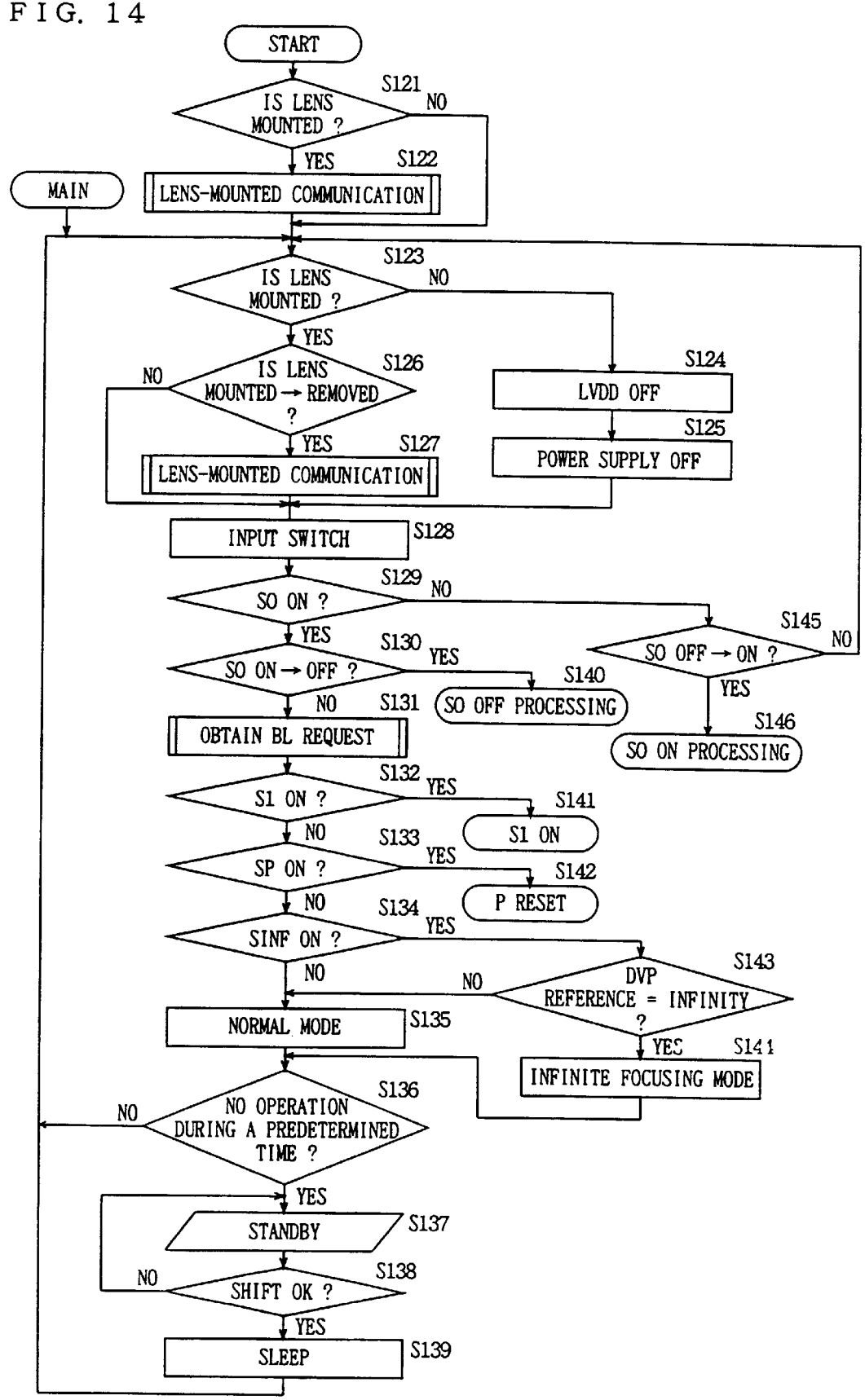
FIG. 14 is a flow chart illustrating a processing on the side of the body.

FIG. 14 is a flow chart illustrating a processing after a battery is mounted.

Referring to FIG. 14, when a battery is mounted, an operation is started. First, lens mount switch SL is used to check whether a lens has been mounted (S121). If a lens has been mounted, a lens mount communication subroutine, which will be described later, is performed (S122). The flow thereafter is that in the normal mode of operation.

When a lens is not mounted (No in S123), supplying of lens power supply LVDD and power supply VD is stopped (S124, S125).

When the lens is released (YES in S126), the lens mount communication subroutine described later is performed (S127).

Then, the state of each switch is input (S128). When main switch S0 is changed from an off state to an on state (NO in S129, YES in S145), a S0 ON processing subroutine, which will be described later, is performed (S146).

A main switch S0 is changed from an on state to an off state (YES in S129, YES in S130), the S0 OFF processing subroutine described later is performed (S140). When main switch S0 is held in an on state, the PL request obtain subroutine described later is performed (S131).

When brightness measuring and distance measuring switch S1 is in an on state (YES in S132), the S1 ON subroutine described later is performed (S141). When program reset switch SP is in an on state (YES in S113), the P reset subroutine described later is performed (S142).

When switch SINF is in an on state (YES in S134), whether the DVP reference described later is at infinity is determined (S143). If the DVP reference is at infinity, the infinite focusing mode (i.e., the manual focus mode and infinite focusing fixed) is set (S144). If the DVP reference is not at infinity (NO in S143), setting at the infinite focusing mode is prohibited. When switch SINF is in an off state (NO in S134), the normal mode (auto focus mode or manual mode) is applied (S135).

When any switch operation in body 5 and lens 7 mounted is not performed for a predetermined time (one minute) (YES in S136), lens microcomputer 30 is put into a sleep state by transmitting to the lens a low electric consumption mode shift instruction STANDBY (S137). When a low electric consumption shift enable/disable signal STBYEN returned from the lens indicates that the shifting is allowed (YES in S138), the body enters a sleep state (S139). Activation from the sleep state is carried out by changing of the states of the switches described above and an activation signal from the lens (chip select signal CSL=LOW).

Lens Mount Communication Subroutine

Figure 15:
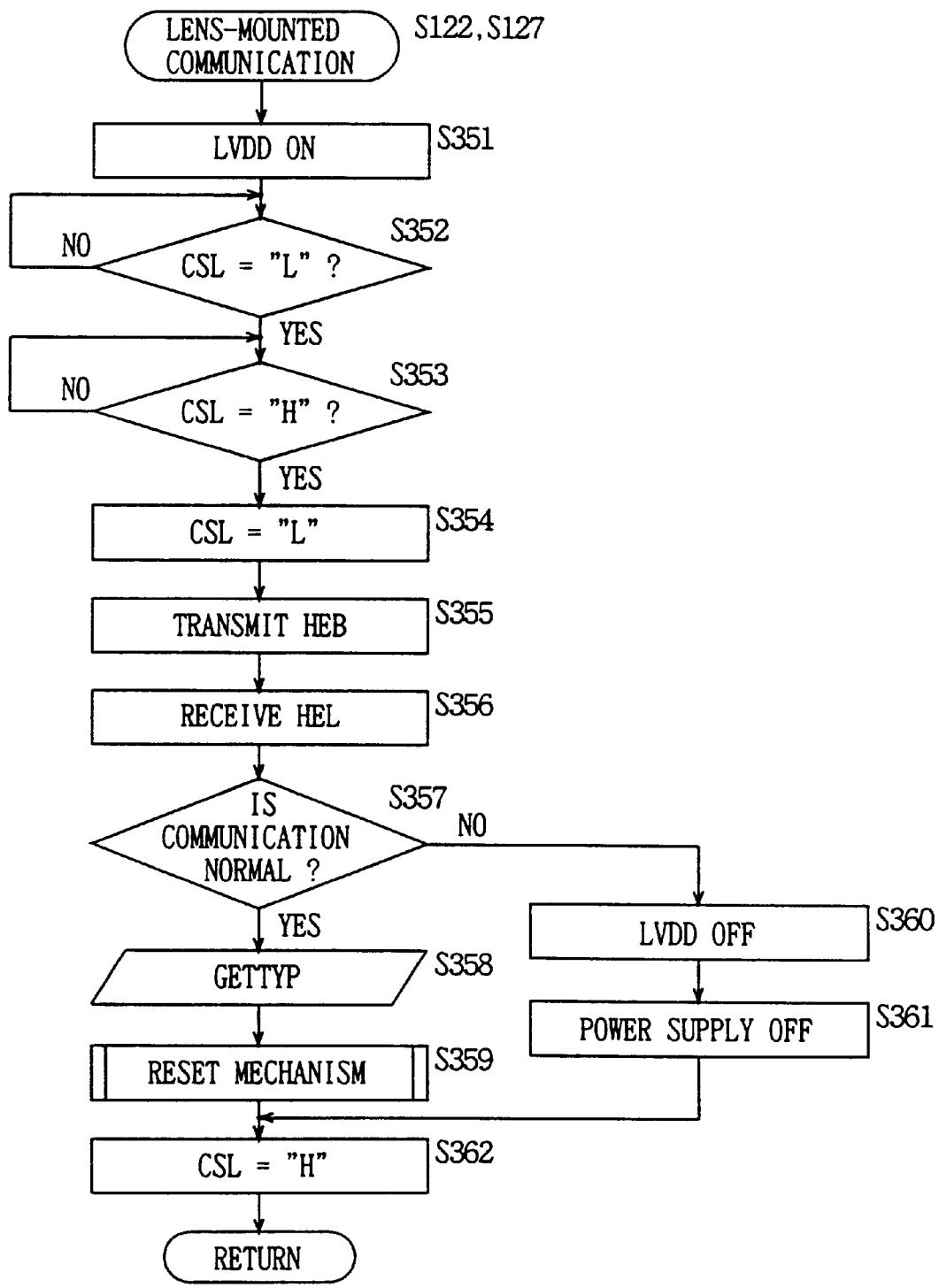
FIG. 15 is a flow chart illustrating a content of the lens-mounted communication.

The lens mount communication subroutine in S122 and S127 in FIG. 14 will now be described with reference to FIG. 15.

First, power supply LVDD is supplied to the lens (S351). Then the state of chip select signal CSL is input (S352) and the flow waits until chip select signal CSL is changed from HIGH→LOW→HIGH, that is, until lens microcomputer 30 completes its preparation for communication (YES in S352, YES in S353). After lens microcomputer 30 is reset and started, lens microcomputer 30 can output a communication enable signal to reduce the time from mounting a lens through starting a communication. Chip select signal SCL is then set at LOW to start the communication (S354). Communication header HEB first is transmitted (S355). Then communication header HEL is input (S356) to determine whether a communication is normally performed (S357). If any abnormality is found, a decision that no lens is mounted is made and power supply VLDD and power supply VP are turned off (S360, S361) and chip select signal CSL is set at HIGH to terminate the communication (S362). When a normal communication is performed (YES in S357), a body/lens identify signal GETTYP communication is performed (S358) to communicate identify signals of each other or the like. Then, the mechanism reset subroutine described above is performed (S359) and chip select signal CSL is set at HIGH to terminate the communication (S362).

S0 OFF Processing Subroutine

Figure 16:
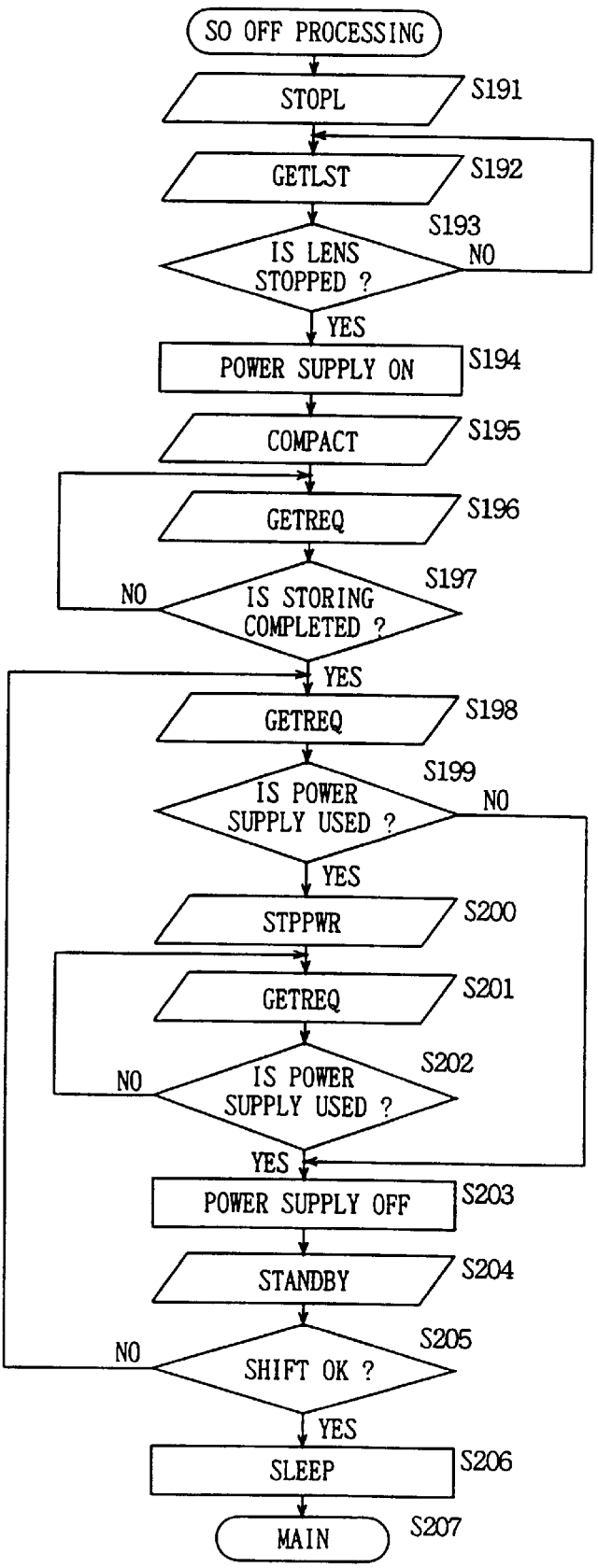
FIG. 16 is a flow chart illustrating a content of the S0 off processing.

FIG. 16 shows a flow chart illustrating a content of the S0 OFF processing subroutine in S140 of FIG. 14.

Referring to FIG. 16, a focus lens stop instruction STOPL is transmitted (S191) since the lens may be moving. A focus lens drive state obtain signal GETLST is communicated to confirm that the lens is stopped (S192, S193). Power supply VP is turned on (S194) and a lens storing instruction COMPACT is transmitted to set the lens at the shortest distance (S195). A BL request obtain signal GETREQ communication is performed to confirm that the lens has been completely stored (S196, S197) and power supply VP is turned off (S203). Then, to put lens microcomputer 30 into a sleep state, a low electric consumption mode shift instruction STANDBY is transmitted to the lens (S204) and when lens 7 returns a low electric consumption shift enable/disable signal STBYEN indicating that the shifting is enabled (YES in S205), the body enters a sleep state (S206). Activation from the sleep state is carried out by change in state of the switches described above and an activation signal from the lens (i.e., chip select signal CSL=LOW).

S0 ON Processing Subroutine

Figure 17:
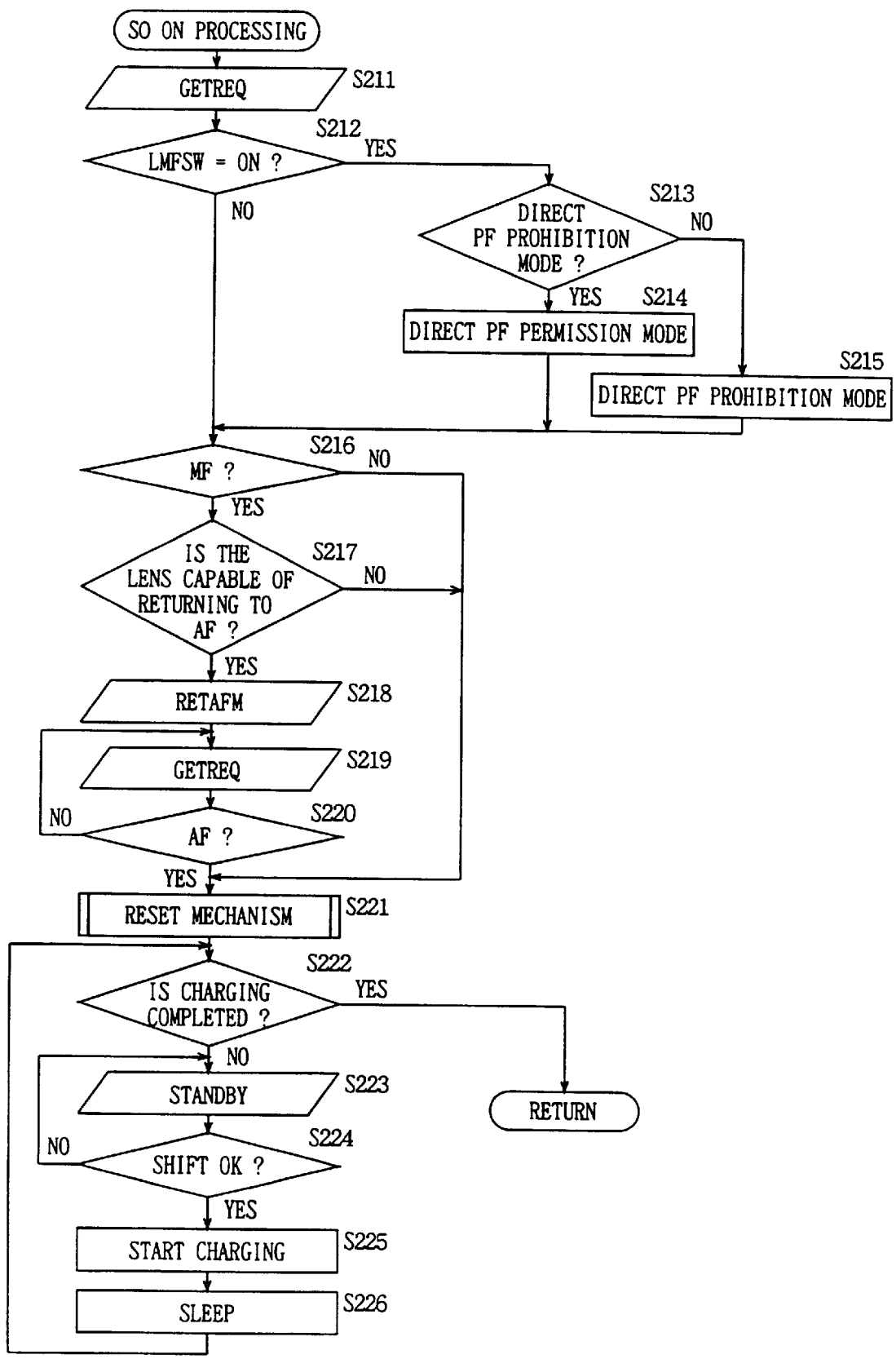
FIG. 17 is a flow chart illustrating a content of the S0 on processing.

FIG. 17 shows a flow chart illustrating a content of the S0 ON processing subroutine in S146 of FIG. 14.

Referring to FIG. 17, a BL request obtain signal GETREQ communication is first performed (S211). In the BF request obtain signal GETREQ communication, when direct PF prohibit signal LMFSW is 1 (YES in S212), switching between a direct PF prohibition mode and a direct PF permission mode is performed (S213–S215). In the present embodiment, setting/resetting of the direct PF permission signal LMFSW is associated on the lens side with an on/off state of mode select switch SAF/MF. When main switch S0 on the body side is turned on and mode select switch SAF/MF is turned on, the modes described above are switched. A switch for switching the above modes may be provided separately from mode select switch SAF/MF.

When the current mode is the manual focus mode (YES in S216) and the lens mounted is a lens capable of returning to the auto focus mode (YES in S217), an AF/M switch instruction RETAFM is transmitted to lens microcomputer 30 to switch the current mode to the auto focus mode (S218). When a BL request obtain signal GETREQ communication is performed to confirm that the mode has been switched to the auto focus mode (S219, YES in S220), the mechanism reset subroutine described later is carried out (S221).

Then flash charging is performed. First, whether or not charging has been completed is determined (S222) and if it has not been completed, a low electric consumption mode shift instruction STANDBY is transmitted to put the lens into a sleep state (S223). Meanwhile, PF operation permission/prohibition signal PFWEN and activation factor permission rank signal SRANK are transmitted to prohibit power focusing and set the activation factor permission rank at 2, that is, activation by the lens is permitted only when mode select switch SAF/MF is operated. Then the charging is started (S225) and the body side itself enters a sleep state (S226). The activation from the sleep state is carried out by changes in the states of the switches of the body side and an activation signal from the lens (chip select signal CSL= LOW).

Mechanism Reset Subroutine

Figure 18:
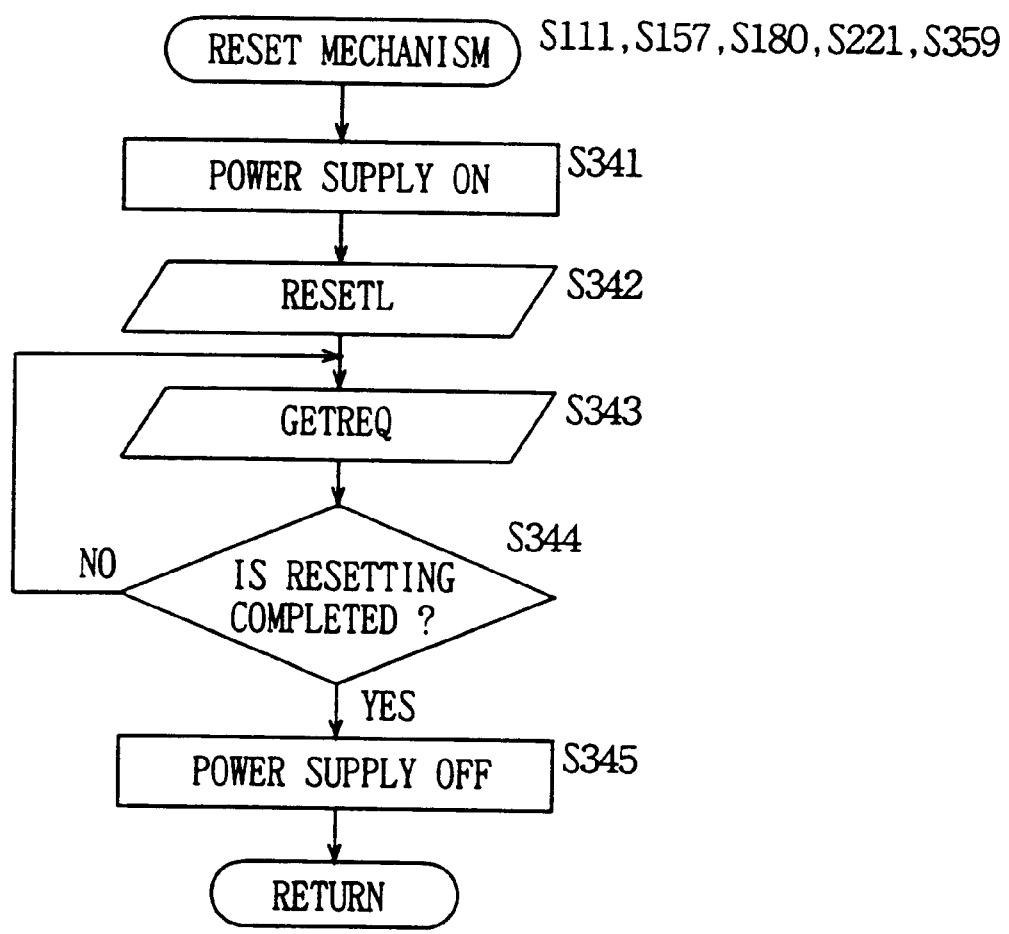
FIG. 18 is a flow chart illustrating a content of the mechanism reset processing.

The mechanism reset subroutine in S111 of FIG. 13, S221 of FIG. 17, the S157 described later of FIG. 19 and the S180 described later of FIG. 22 will now be described with reference to FIG. 18.

Power power supply VP is turned on (S341) and a lens mechanism initialization instruction RESETL is transmitted (S342). When a BL request obtain signal GETREQ communication is performed to confirm the resetting has been completed (S343, S344), power supply VP is turned off and the processing returns (S345).

BL Request Obtain Subroutine

Figure 19:
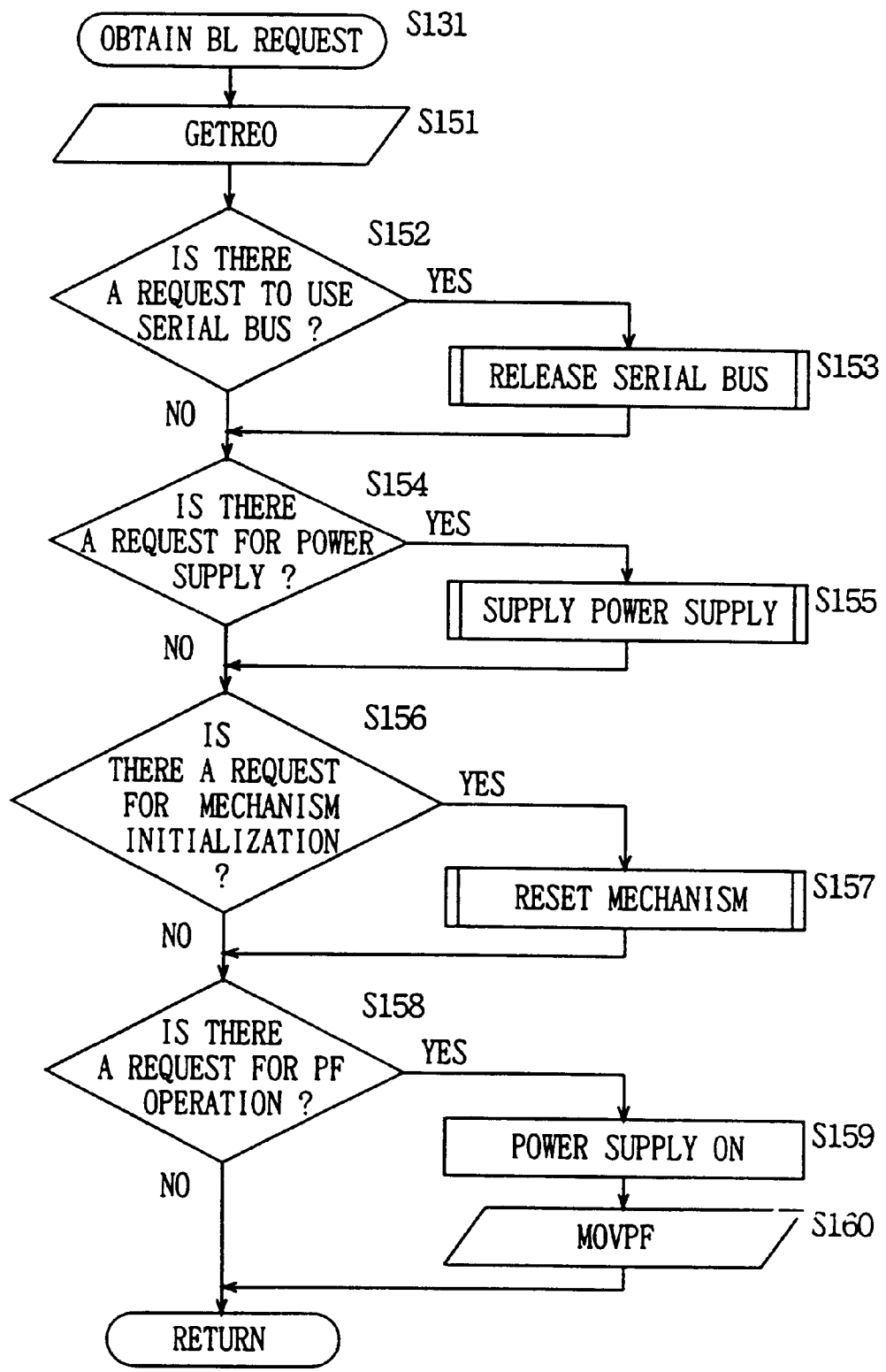
FIG. 19 is a flow chart of a BL request obtain routine.

FIG. 19 is a flow chart illustrating the BL request obtain subroutine in S131 of FIG. 14.

Referring to FIG. 19, a BL request obtain signal GETREQ communication is performed to input various information of the lens side (S151). When there is a request through serial bus use request signal REQBUS from lens microcomputer 30 for using a serial bus (YES in S152), the serial bus release subroutine described later is performed (S153). When there is a request through power supply request signal REQPWR from lens microcomputer 30 for power supply (YES in S154), the power supply supplying subroutine described later is carried out (S155). When there is a request through mechanism initialization request signal REQRES from the from the lens side to initialize the mechanism (YES in S156), the mechanism reset subroutine described in FIG. 18 is carried out (S157). When lens microcomputer 30 informs through PF operation request signal REQPF that power focus switch SPFN or SPFF is being operated (YES in S158), power supply VP is supplied to the lens side (S159), and PF drive permission signal MOVPF is transmitted to lens microcomputer 30 (S160).

Serial Bus Release Subroutine

Figure 20:
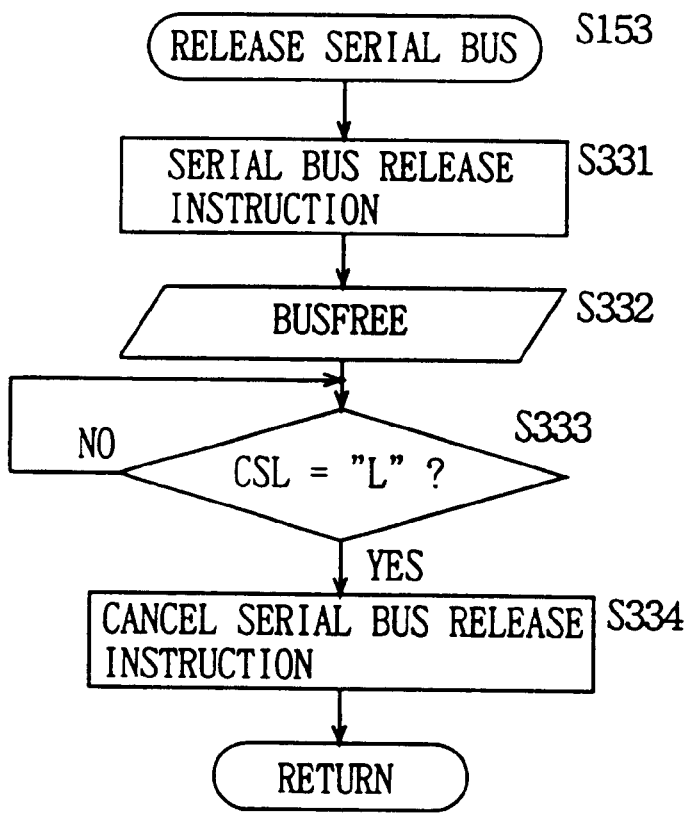
FIG. 20 is a flow chart illustrating a content of the serial bus release processing.

The serial bus release subroutine in S153 of FIG. 19 will now be described with reference to FIG. 20.

First, the processing causes databack 20 to release a serial bus (S331). More specifically, the processing instructs not to perform any serial bus communication until body microcomputer 10 transmits a serial communication request (chip select signal CSL=LOW). Then, a serial bus use permission signal BUSFREE is transmitted to the lens (S332), and the processing waits until chip select signal CSL=LOW, that is, until a local communication of the lens is completed (S333). When chip select signal CSL is set at LOW, databack 20 is informed of canceling the serial bus release instruction and then the processing returns (S334).

When lens microcomputer 30 performs data communication with another circuit within the lens, body microcomputer 10 which shares the signal line involved is prohibited from communicating data within the body. Thus, even when lens microcomputer 30 and body microcomputer 10 share a signal line, a gate circuit is not required and cost reduction can be achieved.

Power Source Supplying Subroutine

Figure 21:
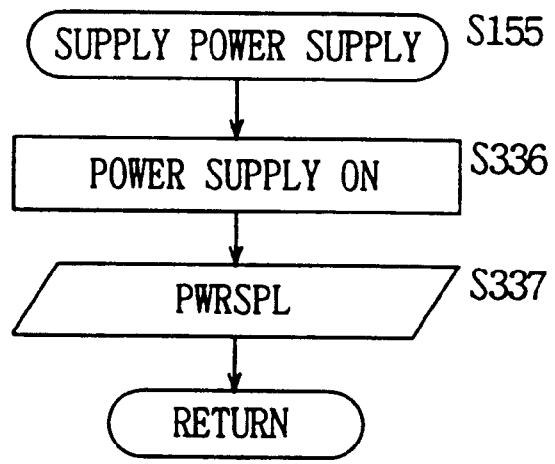
FIG. 21 is a flow chart illustrating a content of the power supply processing.

The power source supplying subroutine in S155 of FIG. 19 will now be described with reference to FIG. 21.

A power source supplying signal PWRSPL is communicated (S336) and then power supply VP is turned on (S337).

P Reset Subroutine

Figure 22:
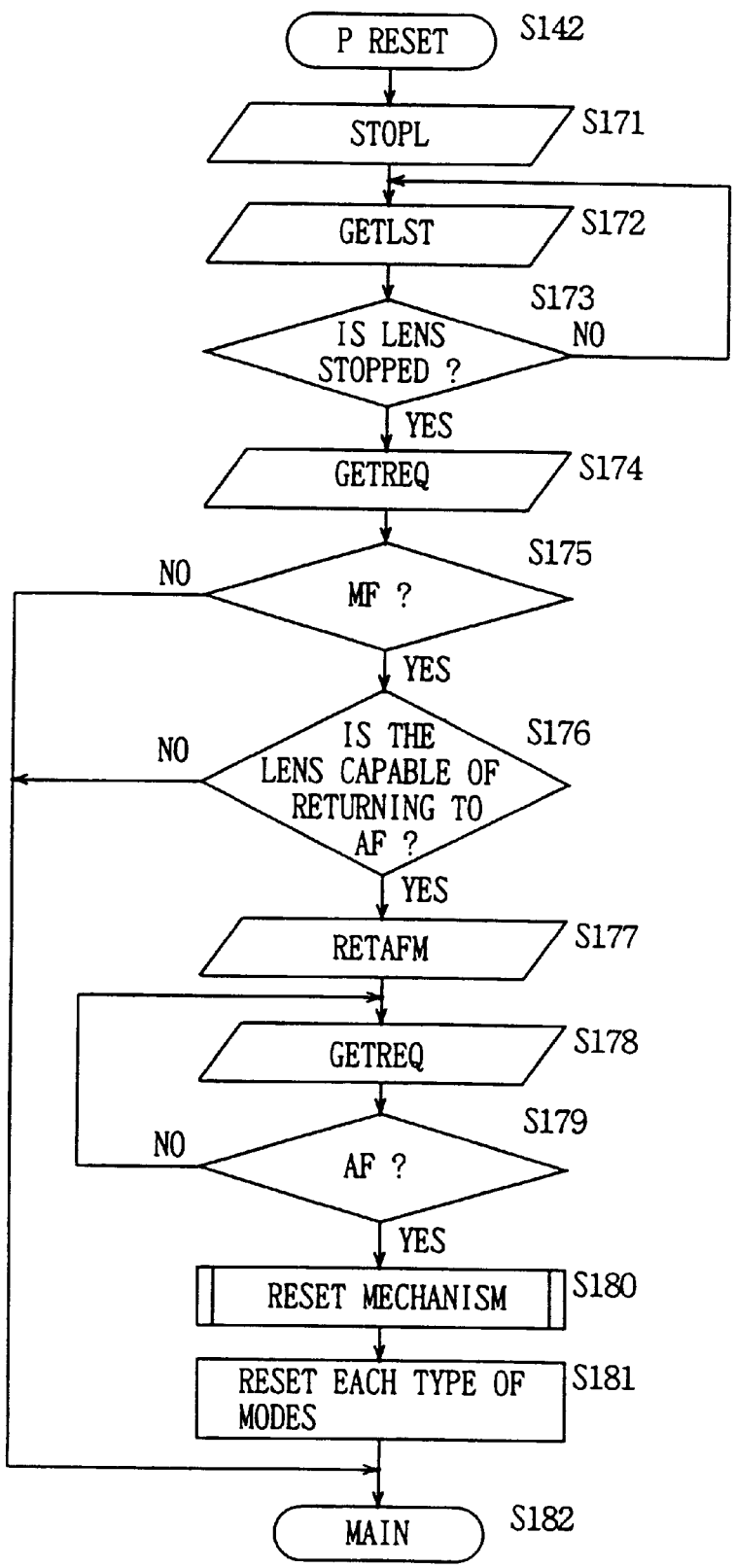
FIG. 22 is a flow chart illustrating a content of the P reset routine.

FIG. 22 is a flow chart illustrating a processing of the P reset subroutine in S142 of FIG. 14.

Referring to FIG. 22, a focus lens stop instruction STOPL is transmitted (S171), since the lens may be moving. Then, a focus lens drive state obtain signal GETLST communication is performed to confirm that the lens is stopped (S172, S173).

A BL request obtain signal GETREQ communication is performed (S174) and if the lens mounted is capable of being set in the auto focus mode and is currently set in the manual focus mode, an AF/M switch instruction RETAFM is transmitted (S175-S176). When a BL request obtain signal GETREQ communication is performed (S178) to confirm that the mode has been changed to the auto focus mode, the mechanism reset subroutine described in FIG. 18 is performed (S179, S180). Then, various set positions (exposure mode, exposure compensation and the like) set on the body side are set at predetermined positions and then the processing returns to "MAIN" of FIG. 14 (S181, S182).

In response to a request of the body side, lens microcomputer 30 transmits to the body microcomputer 10 data on whether it is capable of switching focus modes. Thus, for a lens capable of switching focus modes, the body side can return the lens to auto focus mode in a predetermined sequence. For a lens incapable of switching focus modes, instruction to change focus modes is adapted not to be issued and thus a focus mode in body 5 will never be inconsistent with that in the lens. Thus, a lens-exchangeable camera which can be readily used can be provided.

S1 ON Subroutine

Figure 23:
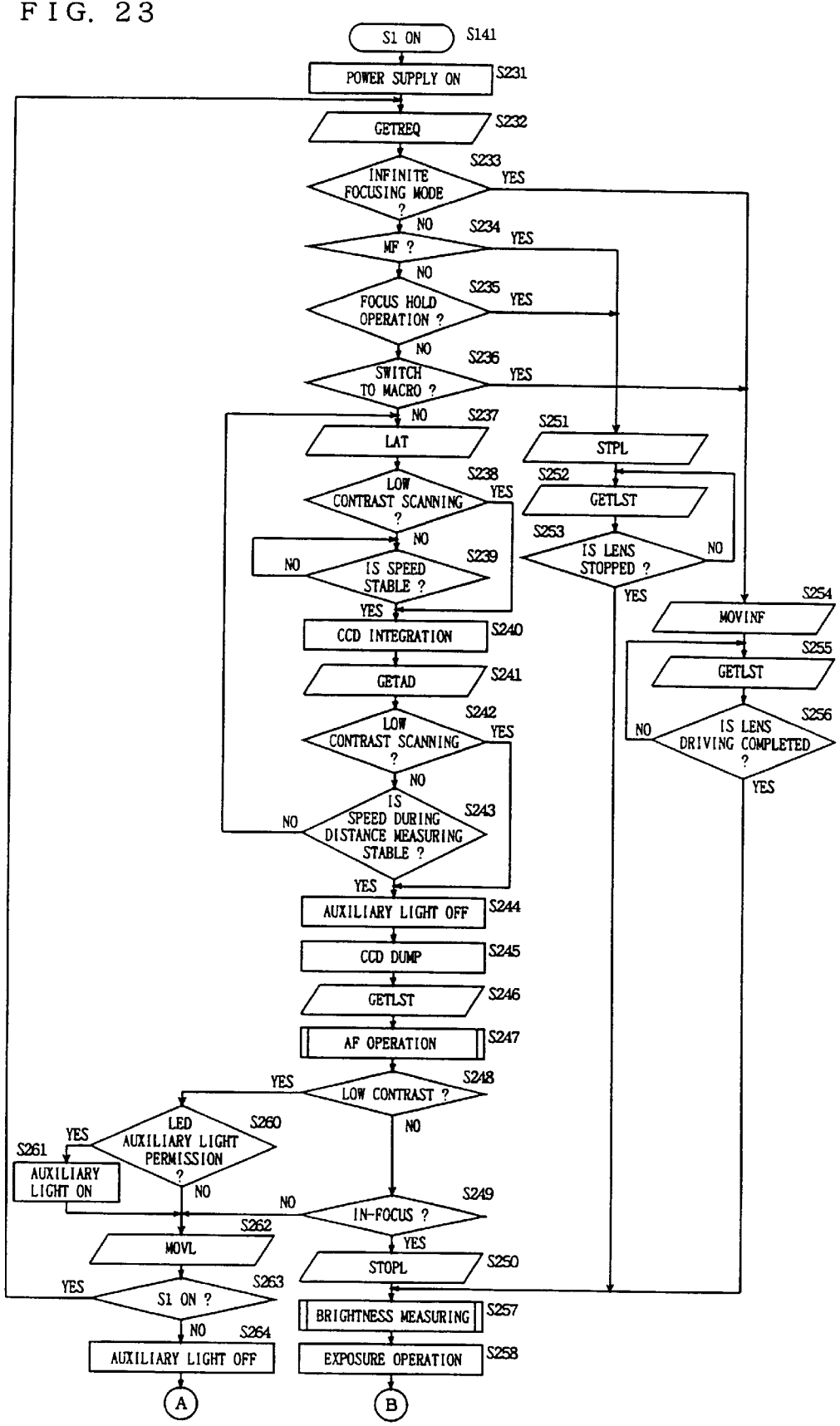
FIG. 23 is a flow chart illustrating a content of the S1 on processing.
Figure 24:
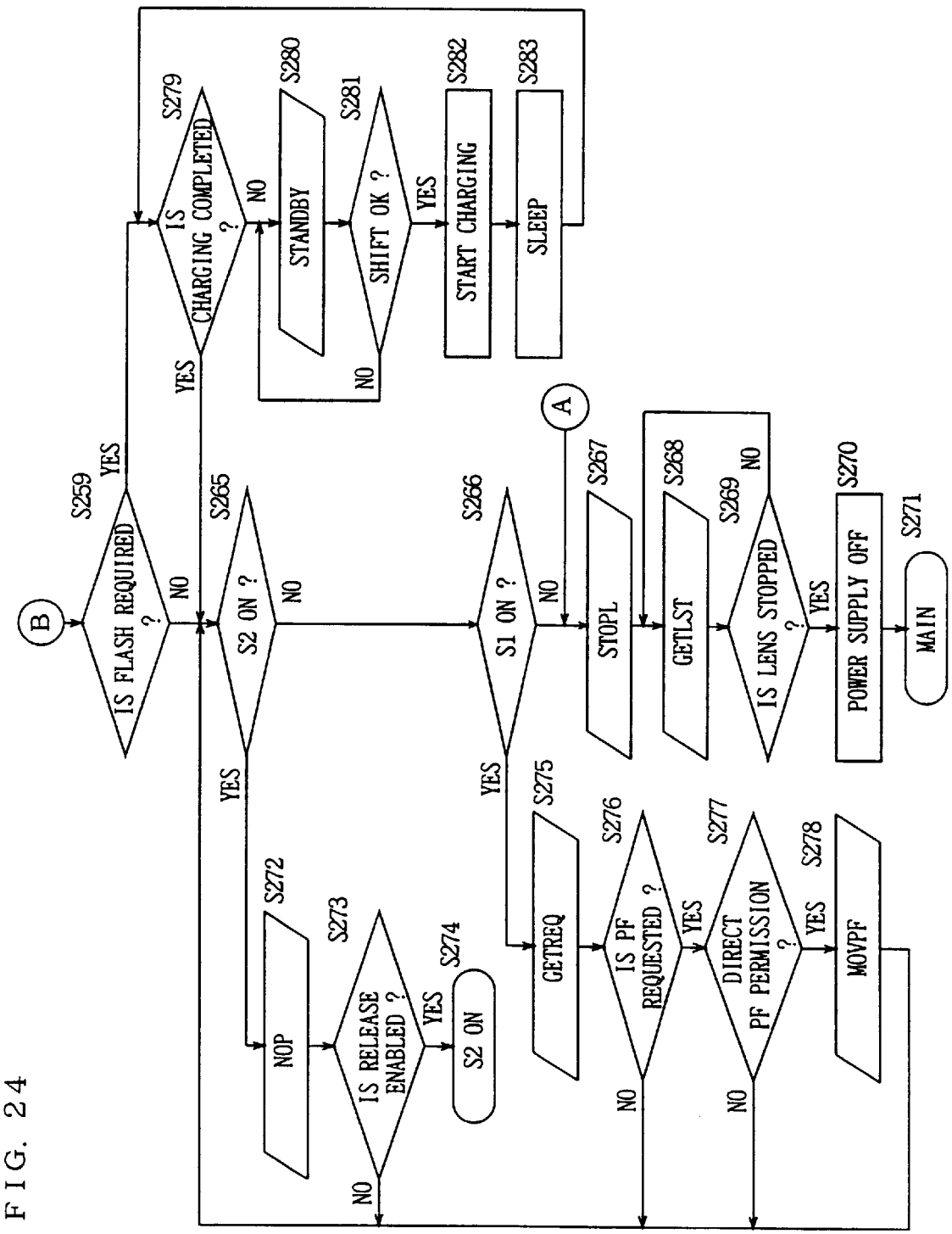
FIG. 24 is a flow chart illustrating a content of the S1 on processing.

FIGS. 23 and 24 are flow charts illustrating a processing of the S1 ON subroutine in S141 of FIG. 14.

Referring to FIGS. 23 and 24, power supply VP first is turn on (S231). If the mode is infinite focusing mode (YES in S233), an infinity set instruction MOVINF is transmitted to the lens (S254). Then, a focus lens drive state obtain signal GETLST communication is performed (S255) to confirm completion of driving the lens to the infinite focusing position (YES in S256) and the brightness measuring subroutine described later is performed (S257).

When the mode is manual mode (YES in S234), a focus lens stop instruction STOPL is transmitted (S251), since the lens may be moving by power focusing. Then, a focus lens drive state obtain signal GETLST communication is performed (S252) to confirm that the lens has been stopped (YES in S253) and the brightness measuring subroutine is performed (S257).

Furthermore, when focus hold switch SFH is being operated also (YES in S235), the lens need be stopped and thus the operations of S251–S257 described above are performed. Furthermore, when an information that the lens is to be switched and set in a macro state is obtained from the lens (YES in S236), the operations of S254–S257 are performed, as is in the infinite focusing mode mentioned above.

For a lens with macro switching mechanism, lens microcomputer 30 transmits to body microcomputer 10 data on whether the lens is switched to a macro state, so that body microcomputer 10 can be informed that the lens is switched to a macro state. Thus, when a lens is swtiched to a switch macro state, auto focusing operation can be prohibited and thus unnecessary electric consumption can be prevented. Furthermore, focus lens 34 can be fixed at optical infinity to provide photographing depending on good optical characteristics.

A brightness measuring synchronization signal LAT communication is otherwise performed first (S237), and an integration time lag signal DELAY is output and data indicating whether lens speed is stable (the speed is stable while the lens is stopped) is also input (S238, S239). When lens speed is stable, CCD integration is performed (S240). Then, a distance measuring data obtain signal GETAD communication is performed to input data necessary for distance measuring (S241) and data on whether lens speed was kept stable during the CCD integration is also input and if the speed is found to have been unstable, the measured distance data is not reliable and thus the distance measured distance operation described above is repeated (NO in S243). Since data on whether movement speed of focus lens 34 is stable from the starting of the integration until the completion of the integration is transmitted from lens microcomputer 30 to body microcomputer 10, body microcomputer 10 can discard measured distance data from the integration when lens speed is unstabilized during the integration period, and the next distance measuring can be started immediately, so that an accurate measured distance value is always obtained. Thus, a lens exchangeable camera in which errors in distance measuring are not caused can be provided.

In low contrast or low light scanning, CCD integration is unconditionally performed (YES in S238, S240). Then, a distance measuring data obtain signal GETAD communication is performed to input data required for distance measuring (S241). In low contrast or low light scanning, the processing proceeds as follows independently of speed stability.

As mentioned above, lens speed is ignored in low contrast or low light scanning, since any amount of defocus obtained from distance measuring in low contrast or low light scanning is not expected to be reliable and thus the decision on whether an object with contrast is positioned within the distance measuring area is prioritized for comfortable use.

Then, if auxiliary light is being projected, the auxiliary light is turned off (S244) and CCD data is dumped (S245). Then, a focus lens drive state obtain signal GETLST communication is performed to input the state of the lens (S246), and the above measured distance data is used to perform an auto focus operation (S247).

When an in-focus state is achieved, a focus lens stop instruction STOPL is transmitted to stop the lens (NO in S248, YES in S249, S250). After the confirmation that the lens have been stopped, a brightness measuring subroutine is performed (S257).

When an appropriate amount of defocus is obtained (NO in S248, NO in S249), the amount of lens driving obtained from an operation result is set and a focus lens drive instruction MOVL is transmitted (S262). Meanwhile, an automatic reversal process enable/disable signal AREV and an enable/disable signal MCEV for adjustment for the amount of movement are both enabled.

When an appropriate amount of defocus cannot be obtained due to low contrast, low light or the like (YES in S248), whether the lens is an LED auxiliary light permission lens or an LED auxiliary light prohibition lens is determined by the result of a BL request obtain signal GETREQ communication (S260). When it is an LED auxiliary light permission lens, auxiliary light is turned on (S261). Then, to cause the lens to perform low contrast and low light scanning, a focus lens drive instruction MOVL is transmitted to set a targeted amount of drivirg at the maximum value and perform lens driving (S262) and the distance measuring operation described above is again performed (YES in S263). The lens determines whether auxiliary light may be projected depending on the type of the lens. If the projection is useless, data for prohibiting auxiliary light projection is transmitted to body microcomputer 10. Thus, unnecessary auxiliary light projection is not performed and hence electric consumption can be reduced. Furthermore, in distance measuring with visible rays, adjustment of the amount of defocus in distance measuring with infrared rays can be prevented.

Meanwhile, automatic reversal process enable/disable signal AREV and enable/disable signal MCEV for adjustment for the amount of movement are both disabled, since the measured distance data is not reliable. Scanning direction is appropriately determined depending on the relation between the current lens position and the lens terminal positions, the current lens movement direction or the like.

When turning off of brightness measuring and distance measuring switch S1 is detected after the transmission of the focus lens drive instruction MOVL described above (NO in S263), auxiliary light is turned off (S264), lens driving is stopped (S267), power supply VP is turned off (270) and the processing returns to "MAIN" of FIG. 14.

In brightness measuring, a brightness measuring data obtain signal GETED communication is first performed to input various brightness measuring data from the lens. Then brightness measuring is performed in brightness measuring apparatus 11 (S257), and the above data and the like are used to perform an exposure operation (S258). When a decision that flash emitting is required is made as a result of the exposure operation (YES in S259), whether the charging has been completed is determined (S279). If the charging is completed, a low electric consumption mode shift instruction STANDBY is transmitted to put the lens into a sleep state (S280-S281). Meanwhile, by PF operation permission/prohibition signal PFWEN and activation factor permission rank signal SRANK, power focusing is prohibited and the activation factor permission rank is set at 1, that is, the activation by the lens is prohibited. Then charging is started (S282) and the body itself enters a sleep state (S283). Activation from the sleep state is carried out by changes in state of the switches on the body side and an activation signal from the lens (chip select signal CSL=LOW).

When release switch S2 is in an on state (YES in S265), a no operation signal NOP communication is performed (S272) to determine whether release is enabled (S273). If release is enabled, the S2 ON subroutine described later is performed (S274). When brightness measuring and distance measuring switch S1 is in an off state (NO in S266), lens driving is stopped 1S267), power supply VP is turned off (S270), and the processing returns to "MAIN" of FIG. 14 (S271).

When brightness measuring and distance measuring switch S1 is in an on state (YES in S266), a BL request obtain signal GETREQ communication is performed (S275). When there is a power focus request and the mode is direct power focus permission mode (YES in S276, YES in S277), a PF drive permission signal MOVPF communication is performed (S278) and the processings of the above mentioned S265 et seq are repeated.

AF Operation Subroutine

Figure 25:
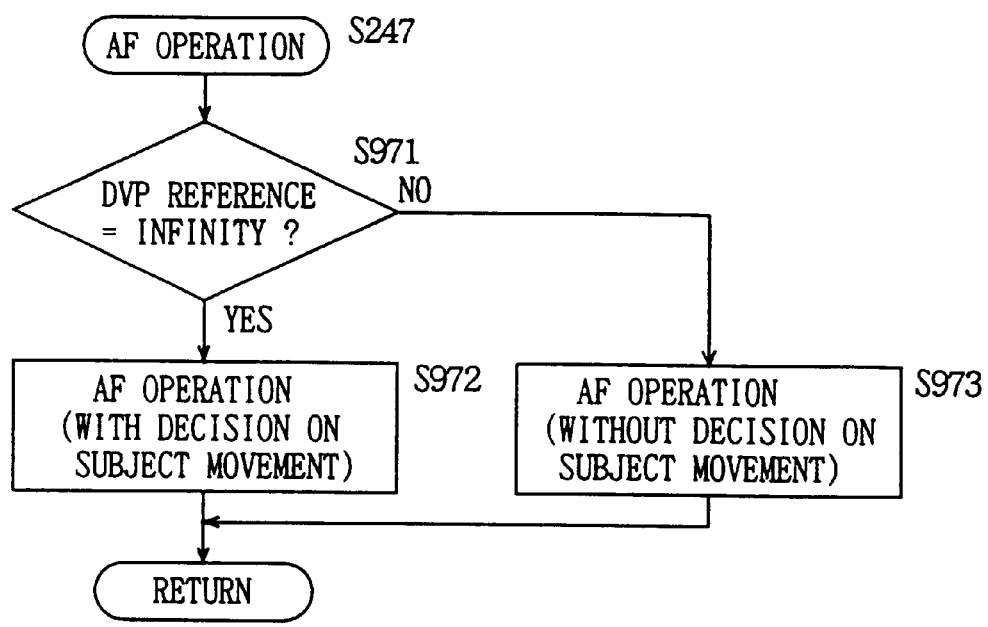
FIG. 25 is a flow chart illustrating a content of the AF operation processing.

The AF operation subroutine in S247 of FIG. 23 will now be described with reference to FIG. 25.

In performing an auto focus operation, whether the DVP reference for the lens mounted is optical infinity is determined (S971). If the reference is optical infinity, an auto focus operation is performed with decision on subject movement (S971). If the reference is not optical infinity, an auto focus operation is performed without decision on subject movement (S973).

The DVP reference is a point serving as a reference for forward movement of a lens. The DVP reference is typically set at optical infinity. For a lens exclusively used as a microlens, however, a specified distance serves as a forward movement reference, since the Lens does not have optical infinity. Body microcomputer 10 performs a predetermined operation based on the amount of forward movement of the focus lens from a DVP reference (optical infinity) to obtain a subject distance. However, this operation applies when a DVP reference is optical infinity, and thus a subject difference cannot be obtained from the above operation when a DVP reference is not optical infinity.

The decision on subject movement will now be described. It is to detect movement of the subject by change in subject distance between a distance measuring and the previous distance measuring. When a decision that the subject is moving is made, the previous distance, the current distance, the time period between the previous distance measuring and the current distance measuring and the time taken until exposure are used to estimate a subject distance at the time which an exposure is performed, and lens driving is performed toward the position.

Lens microcomputer 30 transmits to body microcomputer 10 data indicating whether a reference position for forward movement of the lens is optical infinity. Thus body microcomputer 10 prohibits making a decision on subject movement when the reference position is not optical infinity, so that photographing based on an inappropriately estimated distance can be prevented. Thus, malfunction due to a different reference position for forward movement of the lens can be prevented. Furthermore, for a lens exclusively used as a macrolens, the lens forward movement reference position of which is not optical infinity, most photographing objects are still objects. Thus, decision on subject movement is hardly required and hence it is not problematic if a decision on subject movement is not made.

Brightness Measuring Subroutine

Figure 26:
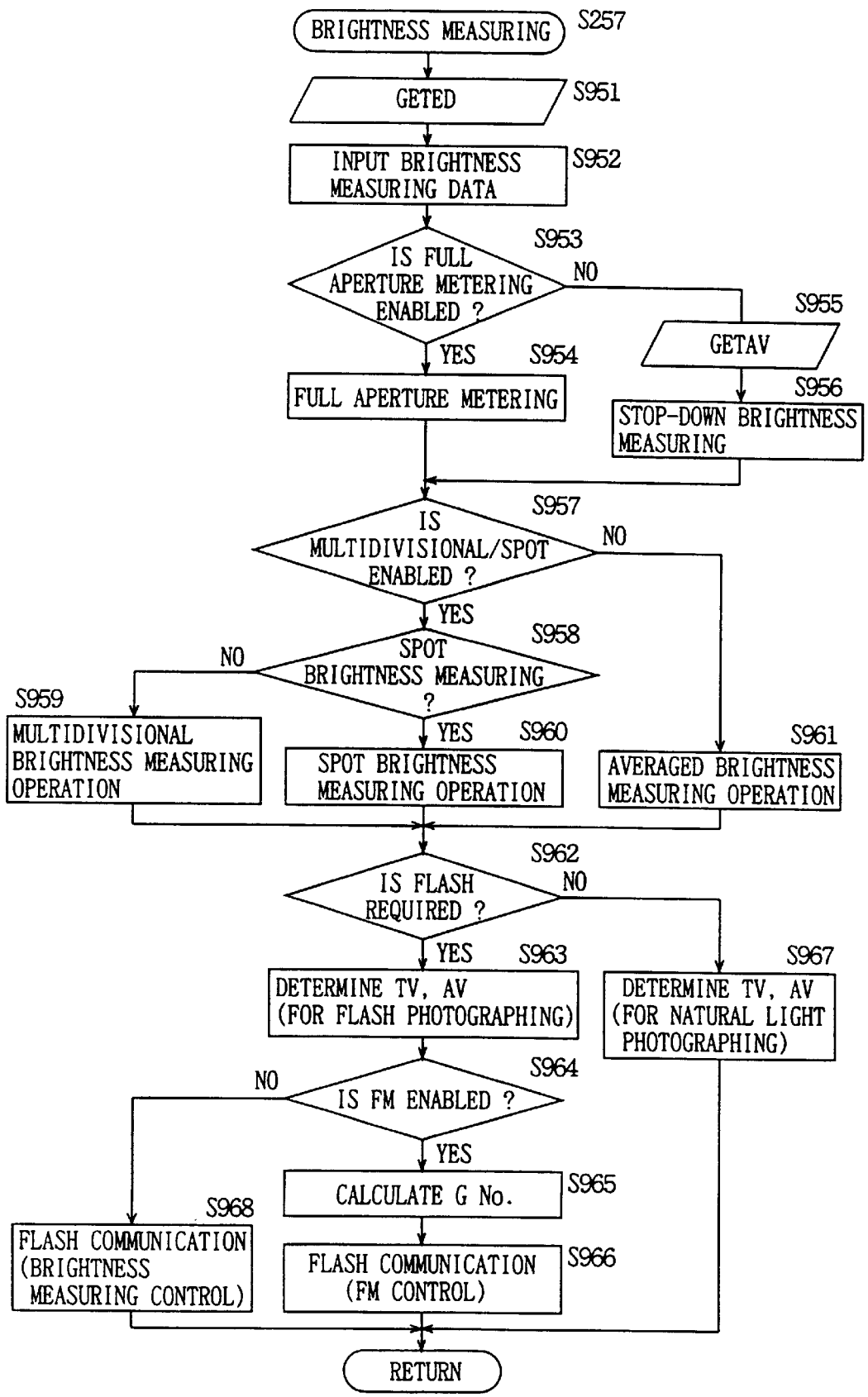
FIG. 26 is a flow chart illustrating a content of a brightness measuring processing.

The brightness measuring subroutine in S257 of FIG. 23 will now be described with reference to FIG. 26.

Figure 27:
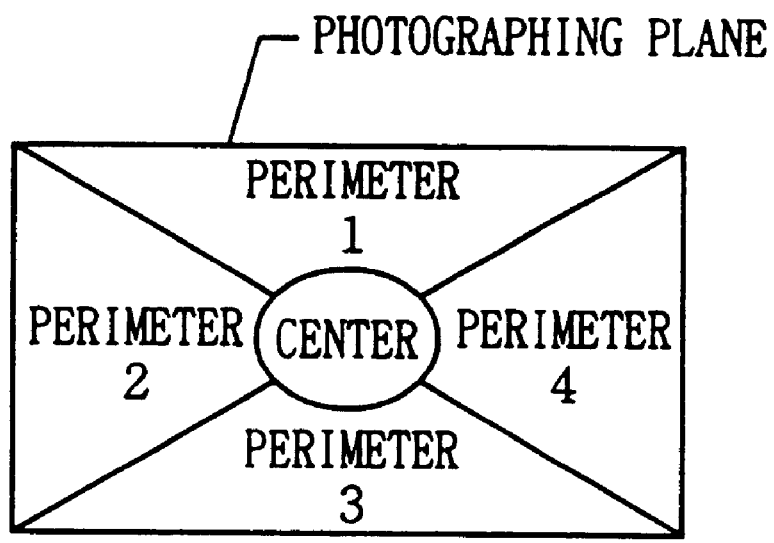
FIG. 27 shows an arrangement of each brightness measuring element on a photographing plane.

First, a brightness measuring data obtain signal GETED communication is performed (S951) to input various information for brightness measuring from the lens (S952). Thus, five measured brightness data (the center, peripheral portions 1–4, see FIG. 27) are obtained from the brightness measuring apparatus. The measured brightness data are the exact output data of a brightness measuring element. When full aperture metering is enabled (i.e., when the lens aperture is in the full open state), a full open aperture value input from lens microcomputer 30 is used to obtain luminance data for each of the five measured brightness data (S953-S954).

When full aperture metering cannot be enabled (i.e., when the lens aperture is stopped down due to preview, fault of the lens aperture or the like), a current aperture value obtain signal GETAV communication with the lens is performed to input the current aperture value information (S955). The input aperture value is used to obtain luminance data for each of the measured brightness data described above (S956).

Then, whether multidivisional/spot brightness measuring is enabled is determined (S957). If it is not enabled, addition and averaging according to weighting for each brightness data are performed to obtain controlled brightness data (i.e., averaged brightness measuring) (S961). When multidivisional/spot brightness measuring is enabled, brightness measuring mode select means (not shown) is used to determine whether the spot brightness measuring mode has been selected (S958). If the spot brightness measuring mode has been selected, the brightness data of the center serves as controlled brightness data (i.e., spot brightness measuring)(S960).

If the spot brightness measuring mode has not been selected, weighting for each luminance data is appropriately determined based on a value of each luminance data, luminance distribution and the like, and addition and averaging thereof are performed to obtain controlled luminance data (i.e., multidivisional brightness measuring)(S959).

When a general-purpose intermediate accessory is mounted, lens microcomputer 30 divides the photographing plane into a plurality of portions to perform brightness measuring and determines weighting of a measured brightness value of each portion depending on the photographing scene to prohibit photographing in a brightness measuring mode which calculates data concerning exposure in photographing. Thus, when a general-purpose intermediate accessory is mounted, exposure in a mode by spot brightness measuring and multidivisional brightness measuring having high brightness measuring error sensitivity to brightness measuring F-number and lens pupil position can be prohibited, and thus photographing with a significantly inappropriate exposure can be prevented.

Referring again to the flow chart, when the result of a brightness measuring operation results in a decision that flashing is required due to low brightness, a program line for flashing is used to determine TV and an aperture value AV (when flashing is not required, a program line for natural light is used to determine TV and an aperture value AV) (S962). Then, an FM control enable/disable signal FMEN obtained from a brightness measuring data obtain signal GETED is transmitted to determine whether flash control by flashmatic is enabled (S962, S964).

When flash control by flashmatic is enabled, an object distance and an aperture value AV are used to calculate a guide member GNo for the flash, and guide number data is transmitted to the flash portion (S965, S966). When the flash receives an emission signal in photographing, it flashes at the guide number GNo mentioned above.

When flash control by flashmatic is not enabled, data indicating that the amount of flashing is to be controlled by brightness adjustment is transmitted to the flash portion (S968). In photographing, the flash starts flashing when it receives a flash signal, and stops flashing when it receives a stop signal from a brightness adjustment circuit.

For example, when an accurate subject distance cannot be obtained due to mounting of a general-purpose intermediate accessory or the like and thus the lens determines that exposure by flashmatic cannot be normally performed, a flashmatic control disable signal can be transmitted to body microcomputer 10 to prevent an inappropriate exposure by flashmatic control.

S2 ON Subroutine

Figure 28:
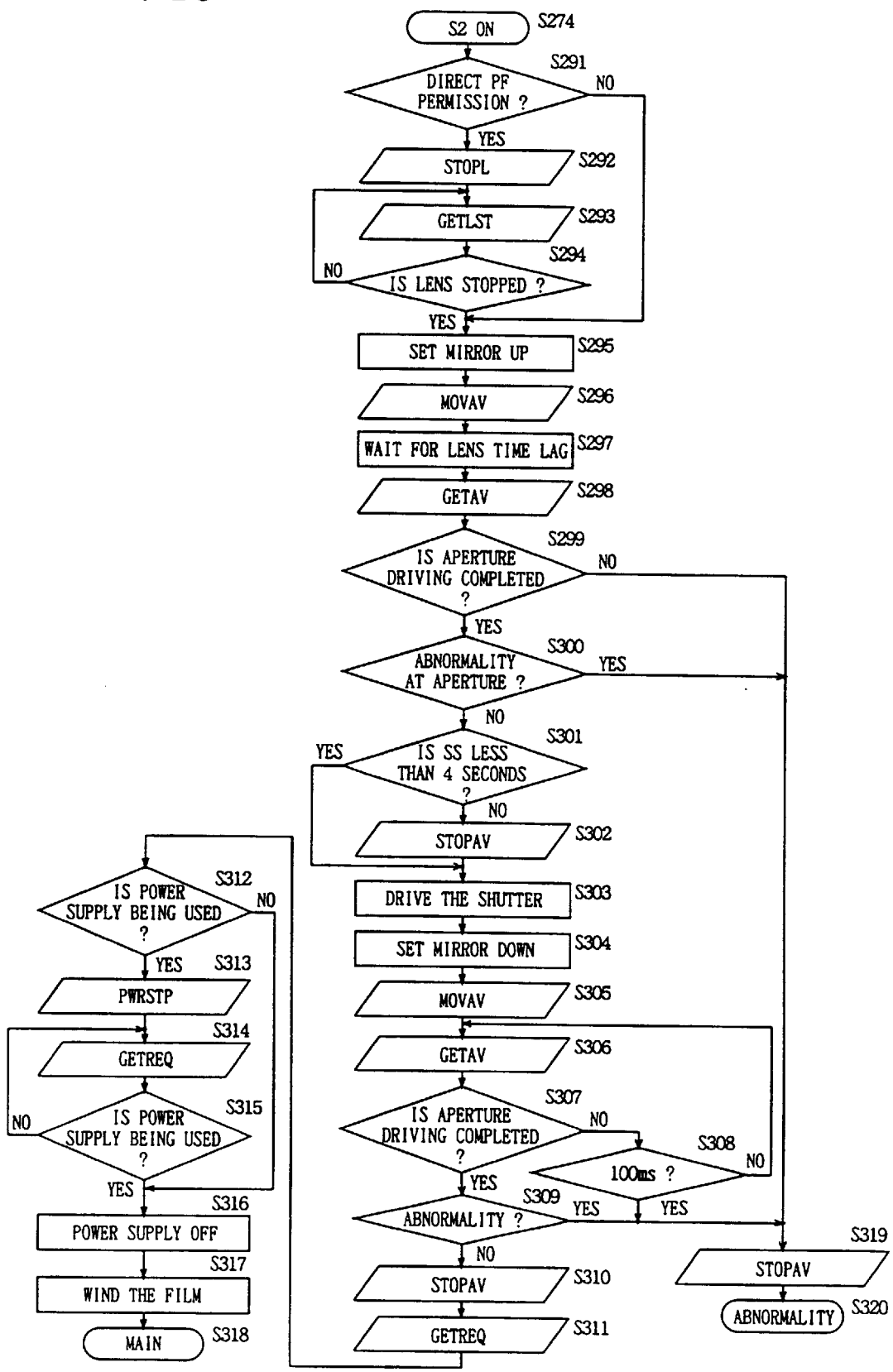
FIG. 28 is a flow chart illustrating a content of the S2 on processing.

A processing of the S2 ON Subroutine in S274 of FIG. 24 will now be described with reference to FIG. 28.

In direct power focus permission mode (YES in S291), a focus lens stop instruction STOPL is transmitted (S292) to stop the lens, since the lens may be moving. A focus lens drive state obtain signal GETLST communication is performed (S293) to confirm that the lens has been stopped (YES in S294) and the mirror is set at an up position (S295). Then, a target aperture value is transmitted by aperture drive instruction MOVAV (S296), and after a lens time lag RT time obtained from a body/lens identify signal GETTYP communication (S287), a current aperture value obtain signal GETAV communication is performed (S298). If aperture driving has not been completed (NO in S299), the flow assumes that some abnormality has occurred at the aperture, an aperture stop instruction STOPAV is transmitted to stop aperture driving (S319), and an abnormality processing (error display, stopping of operation and the like) is performed (S320). Furthermore, a similar processing is performed when aperture normality/abnormality signal AVERR indicates that an error has occurred in aperture driving (YES in S300).

When aperture driving is completed, whether shutter speed is not more than four seconds is determined (S301). When shutter speed exceeds four seconds, an aperture stop instruction STOPAV is transmitted to stop aperture driving (i.e., to stop the electricity conduction) (S302). Then the shutter is driven (S303), and after completion of exposure, the mirror is rendered down (S304). Then an aperture drive instruction MOVAV is transmitted to drive the aperture to a mechanism full open aperture value (S305) and a current aperture value obtain signal GETAV communication is performed to monitor the aperture value (S306), and when the mechanism aperture value is reached (YES in S307), an aperture stop instruction STOPAV is transmitted to stop the aperture driving (i.e, to stop the electricity conduction) (S310). Then, a BL request obtain signal GETREQ communication is performed (S311) to check whether the lens is using power supply VP (S312). If the lens is using it, a power supply used prohibit signal PWRSTP is transmitted to prohibit using the power supply (313). When the use of the power supply VP is stopped, supplying of the power supply is stopped (314–S316). Then the film is wound (S317) and the flow returns to "MAIN" (S318).

In driving the aperture to the full open position also, aperture abnormality/normality signal AVERR is used to check whether an error has occurred in aperture driving (S309) and when any error is found, aperture stop instruction STOPAV is transmitted to stop aperture driving (S319) and an abnormality processing is performed (S320). Furthermore, when aperture driving to the full open aperture value is not completed within a predetermined time period (100 mSEC) (YES in S309), the flow also assumes that some abnormality is caused at the lens, and the aperture driving is stopped to perform an abnormality processing (S319, S320).

FLOW CHART OF CONTROL BY LENS MICROCOMPUTER

A procedure of a control carried out by lens microcomputer 30 will now be described with reference to the flow charts.

Main Flow Chart

Figure 29:
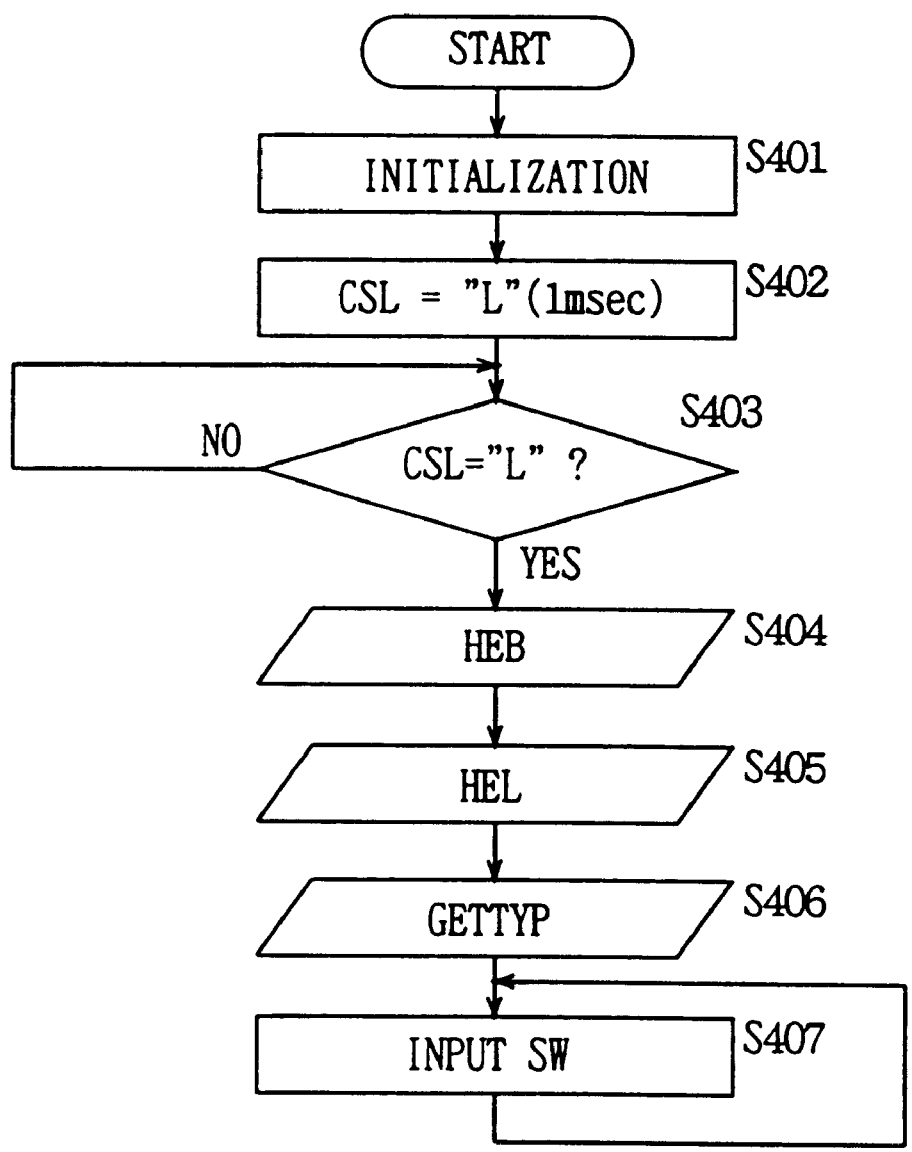
FIG. 29 is a flow chart illustrating a content of a processing on the side of the lens.

FIG. 29 is a main flow chart illustrating a processing at the time of power-on (when the lens is mounted).

Referring to FIG. 29, initialization such as RAM initialization is performed (S401) and then chip select signal CSL is set at LOW for 1 mSEC to inform body microcomputer 10 that communication can be performed (S402. Body microcomputer 10 waits until chip select signal CSL attains LOW (S403) and when chip select signal CSL attains LOW, body microcomputer 10 inputs communication header HEB (S404). Then, decision on communication normality/abnormality is made and the detection of mounting of an intermediate accessory is performed, and a result thereof is transmitted by communication header HBL to body microcomputer 10 (S405). Then, identification data of each other are exchanged through a body/lens identify signal GETTYP communication (S406). Thereafter, input of each switch SPF, SPN and SFH of the lens side is repeated (S407). Meanwhile, an interrupt by turning on mode select switch SAF/MF is permitted with chip select signal CSL=LOW.

Communication Header HEB Input Processing

Figure 30:
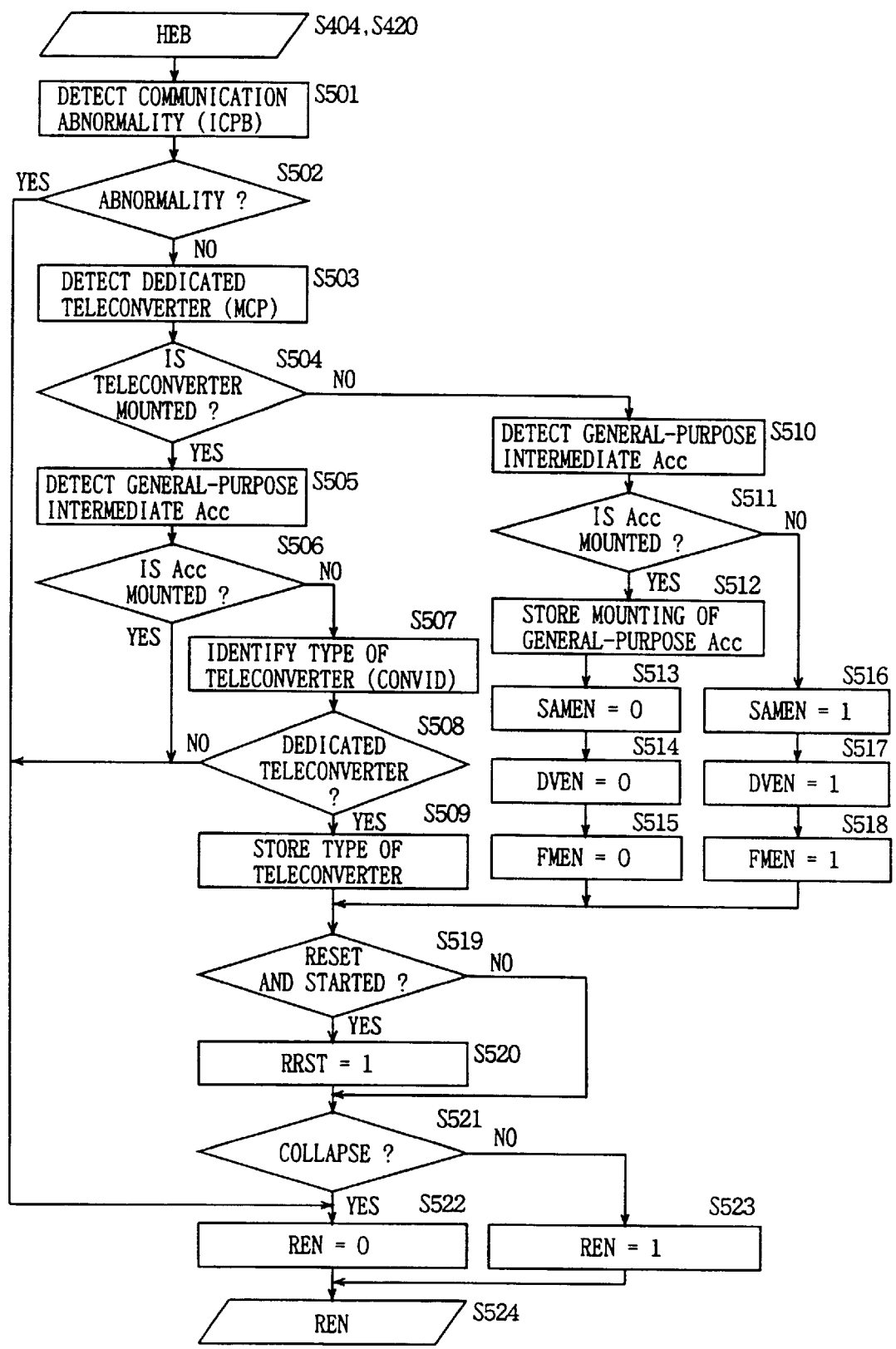
FIG. 30 is a flow chart illustrating a content of the HEB routine.

The communication header HEB input processing described in S404 of FIG. 29 will now be described more specifically with reference to FIG. 30. When communication header HEB is received, detect signal ICPB is checked to determine whether the communication is normally performed (S501, S502). When the communication is abnormal, release enable/disable signal REN is set at 0 to inform body microcomputer 10 that release cannot be performed due to the communication error (S522).

When the communication is normal (NO in S502), dedicated converter mounted detection signal MCP is used to determine whether a dedicated teleconverter (a dedicated teleconverter for any of a plurality of exchangeable lenses capable of being used for the camera) has been mounted (S503, S504). If a dedicated teleconverter has been mounted, whether a general-purpose accessory has been mounted is checked (S505, S506). If a general-purpose accessory has been mounted (YES in S506), release enable/disable signal REN is set at 0 (S522).

When a general-purpose accessory is not mounted (NO in S506), the type of the teleconverter is identified (S507) and whether the teleconverter is a dedicated teleconverter for the lens is determined (S508). If the teleconverter is not a dedicated teleconverter for the lens (NO in S508), release enable/disable signal REN is set at 0 (S522). If the teleconverter is a dedicated teleconverter for the lens (YES in S508), the type of the teleconverter is stored (S509). The body side prestores various data (open/close aperture value, for example) when only a lens is mounted, as well as various data when a dedicated teleconverter for the lens is mounted. Thus thereafter data such as aperture value, K value or the like depending on the type of the teleconverter stored is sent to the body.

When a dedicated teleconverter is not mounted (NO in S504), whether a general-purpose intermediate accessory has been mounted is determined (S510). If so, the fact that the general-purpose accessory has been mounted is stored (S512), and multidivisional/SPOT brightness measuring enable/disable signal SAMEN is set at 0 to prohibit multidivisional/SPOT brightness measuring (S513). Furthermore, DV, β availability signal DVEN is set at 0 and FM control enable/disable signal FMEN is set at 0 to inform body microcomputer 10 that photographing distance signal DV cannot be used and that flashmatic control cannot be performed (S514, S515).

When a general-purpose accessory is not mounted (NO in S511), multidivisional/SPOT brightness measuring enable/disable signal SAMEN, DV, β availability signal DVEN and FM control enable/disable signal FMEN are all set at 1 (S516–518). These data are sent to the body in a brightness measuring data obtain signal GETED communication. Following the above operations, whether the communication is the first communication since the lens side is reset and started is determined (S519). If it is the first communication, reset and start detect signal RRST is set at 1 to request body microcomputer 10 that a body/lens identify signal GETTYP communication be performed (S520). When the body/lens identify signal GETTYP communication is terminated, reset and start detect signal RRST is set at 0.

For a collapsible lens, whether the lens is in a collapse state is determined (S521). If the lens is in a collapse state, release enable/disable signal REN is set at 0 to prohibit releasing (S522). If the lens is not in a collapse state, release enable/disable signal REN is set at 1 (S523). Whether the lens is in a collapse state is detected by a zoom encoder (not shown). "Collapse" herein means that in using a lens, the lens length is rendered shorter than a distance typically applied, to reduce the entire length of the lens. In this state, photographing cannot be performed. Release enable/disable signal REN thus set is transmitted to body microcomputer 10 (S524).

After the above processing is performed, the processing returns to S405 in FIG. 29 and al communication header HEL communication with the body in synchronization with a serial clock from the body is performed (405).

Interrupt Processing

Figure 31:
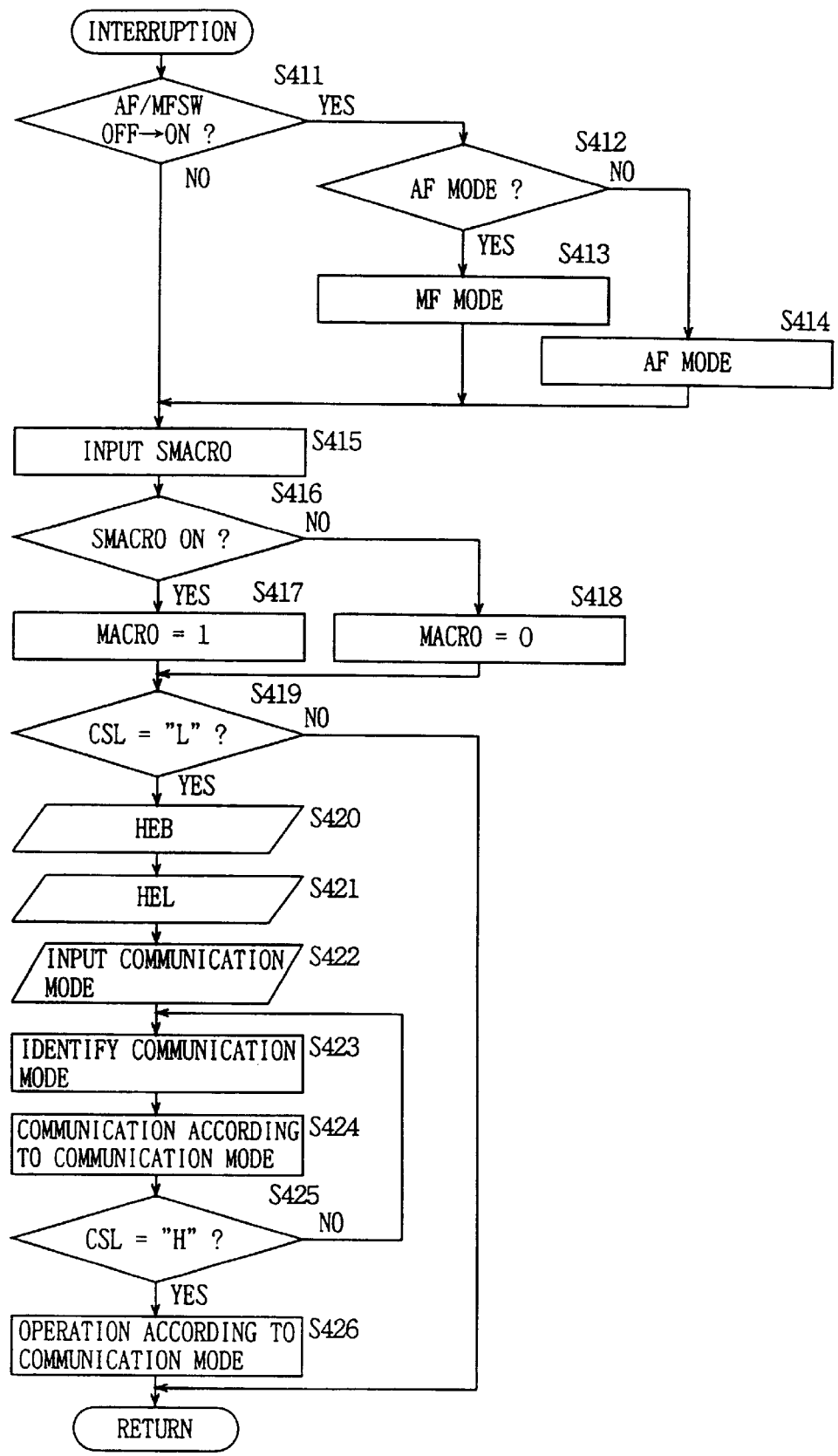
FIG. 31 is a flow chart illustrating a content of an interrupt processing.

Referring to the flow chart in FIG. 31, a processing of an interrupt activated while lens microcomputer 30 is carrying out the processings of FIGS. 29 and 30 when there are various signal communications from body microcomputer 10 or when mode select switch SAF/MF is turned on will now be described.

When the interruption is activated by switching of mode select switch SAF/MF from an off state to an on state, auto focus mode/manual focus mode switching is performed (S411–S414). The state of macroswitch SMACRO is input (S415). If the state is an on state, macroswitch signal MACRO is set at 1. If the state is an off state, macro switch signal MACRO is set at 0 (S416–S418). Then, when a communication request from the body is transmitted by chip select signal CSL=LOW, (YES in S419), communication header HEB is input from the body (S420), as is described herein before with reference to FIG. 30. Then, communication normality/abnormality is detected and whether an intermediate accessory has been mounted is detected, and the result thereof is returned to the body as communication header HEL (S421).

Then, a signal input from body microcomputer 10 is received (S422) and the communication mode is identified (S423) to perform communication according to a rule predetermined depending on the communication mode (S424). During select signal CSL=LOW, communication can be performed in a successive plurality of communication modes (S425). When a communication is completed, an operation according to a communication mode received is performed (S426). In performing communication in a plurality of modes, operations are performed in the order in which the modes are received.

A communication according to a communication mode in S424 and an operation according to a communication mode in S426 will be described below more specifically, as a communication processing for each communication mode. It should be noted that when there is no description with respect to an operation according to a communication mode, only a communication according to the communication mode is performed.

Body/Lens Identify Signal GETTYP Communication Processing

Figure 32:
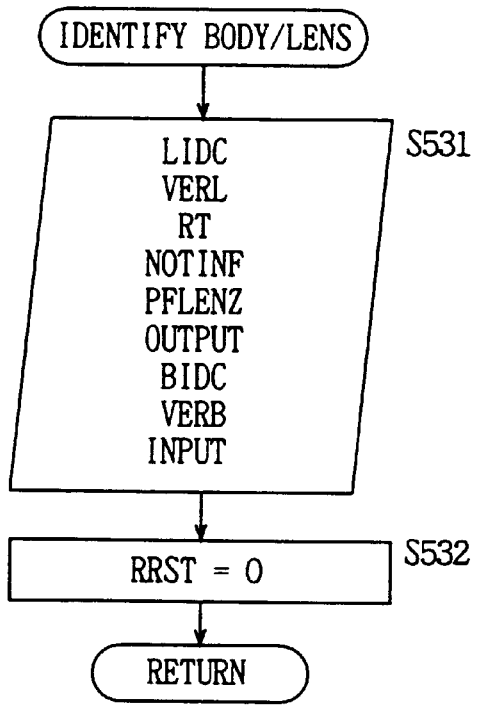
FIG. 32 is a flow chart illustrating a content of the body/lens identify processing.

FIG. 32 is a flow chart illustrating a content of a body/lens identify signal GETTYP communication.

Lens microcomputer 30 receives a body identify signal BIDC and a BL communication version (body) signal VERB from body microcomputer 10, and also transmits a lens identify signal LIDC, a BL communication version (lens) signal VERL, a lens time lag RT, a signal NOTINF and a power focus lens signal PFLENZ to body microcomputer 10 (S531). Then, reset and start detect signal RRST is set at 0 (S532).

BL Request Obtain Signal GETREQ Communication Processing

Figure 33:
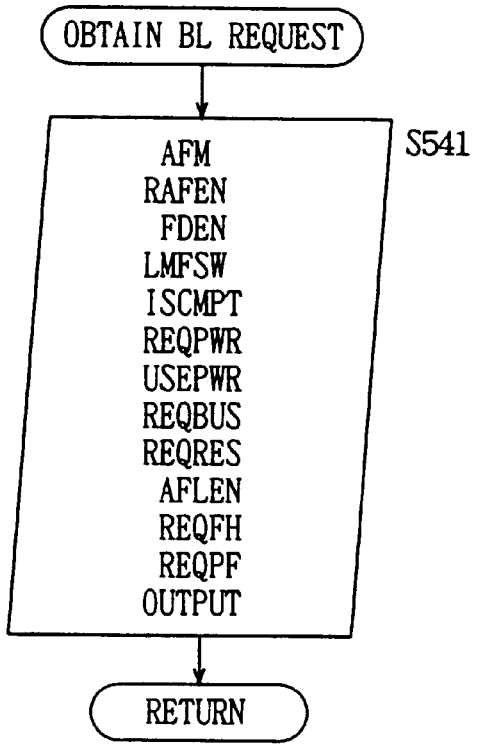
FIG. 33 is a flow chart illustrating a content of the BL request obtain processing.

FIG. 33 is a flow chart illustrating a content of a BL request obtain signal GETREQ communication.

Referring to FIG. 33, in a BL request obtain signal GETREQ communication processing, lens microcomputer 30 outputs an AF/MF signal AFM, an AF return enable/disable signal RAFEN and the like are output to body microcomputer 10 (S541).

Lens Store Instruction COMPACT Communication Processing

Figure 34A:
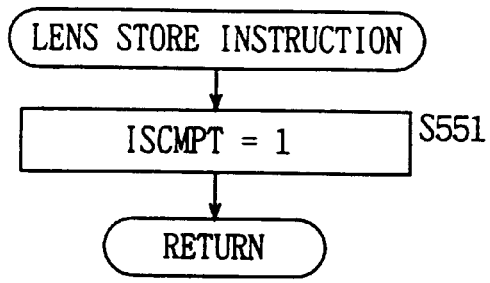
FIGS. 34A and 34B are flow charts illustrating a content of a processing of the lens store instruction.
Figure 34B:
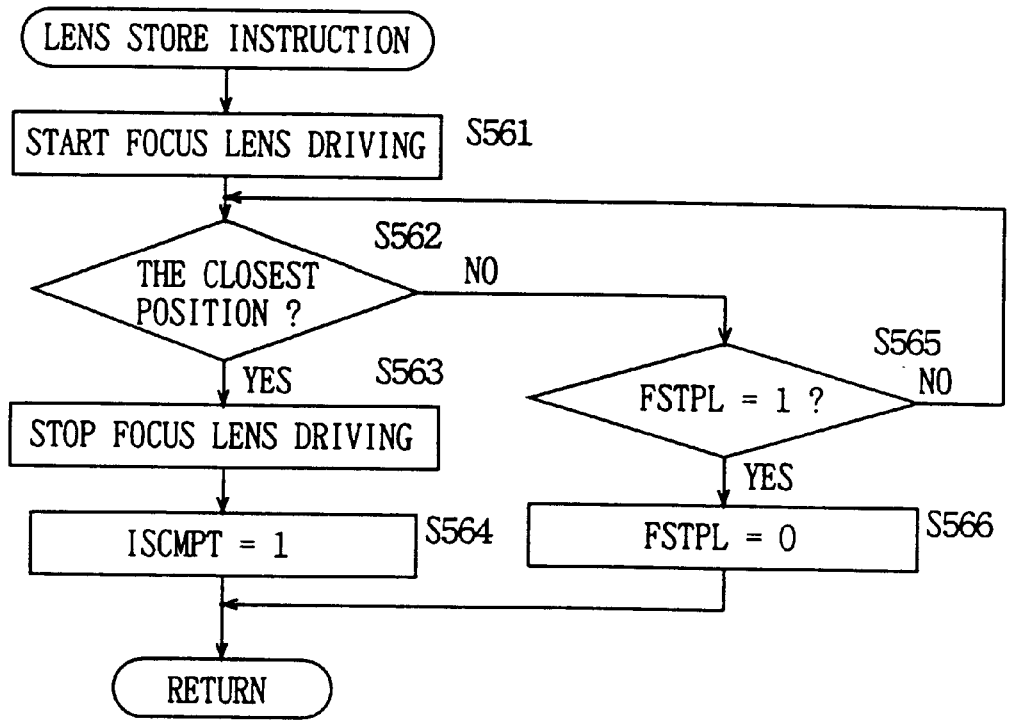

A lens store instruction COMPACT communication processing will now be described. FIGS. 34A and 34B illustrate a content of the communication and an operation associated therewith respectively.

Referring to FIG. 34A, when lens store instruction COMPACT is entered, a signal ISCMPT of BL request obtain signal GETREQ is set at 1 and the processing returns (S551).

Referring to FIG. 34B, an operation associated with lens store instruction COMPACT will now be described. Driving of focus lens 34 in the rearward direction is started (S561). When switch SLI is turned on and the lens reaches the closest position (YES in S562), lens driving is stopped (S563), signal ISCMPT is set at 1 and the processing returns (S564). When a memory FSTPL for storing the fact that a focus lens stop instruction STOPL has been input is set at 1 during a lens rearward movement operation (YES in S565), memory FSTPL is set at 0 and the processing returns (S566).

Lens Mechanism Initialization Instruction RESETL

Figure 35A:
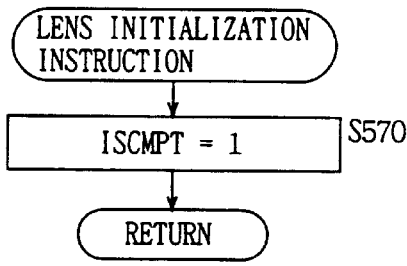
FIGS. 35A and 35B are flow charts illustrating a content of a processing of the lens mechanism initialization instruction.
Figure 35B:
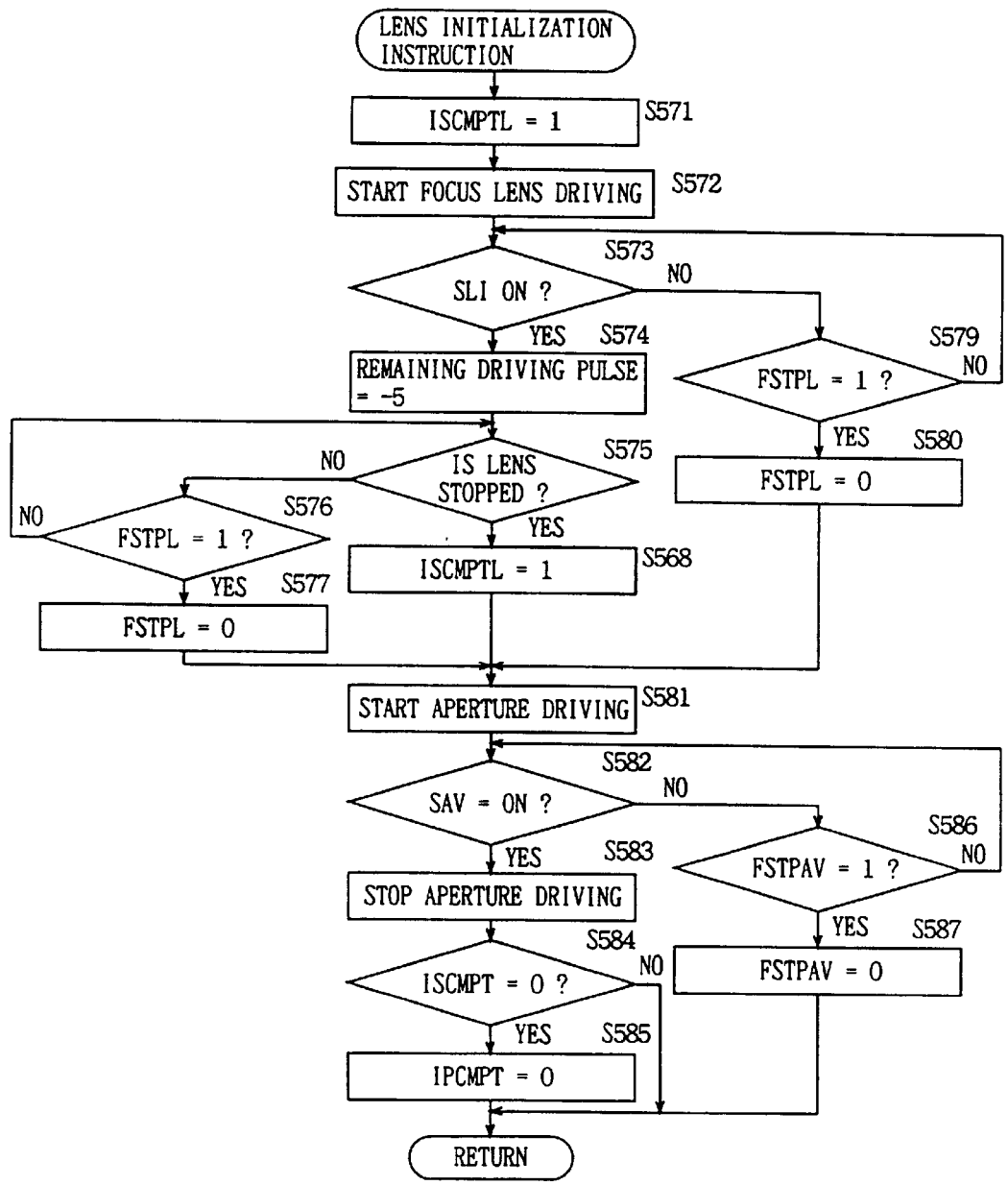

FIG. 35 is a flow chart illustrating a content of a lens mechanism initialization instruction RESETL communication processing. FIGS. 35A and 35B illustrate a content of the communication and an operation associated therewith, respectively.

Referring to FIG. 35A, in the communication, signal ISCMPT is set at 0 and the processing returns (S570).

Referring to FIG. 35B, the operation associated with lens mechanism initialization instruction RESETL will now be described. First, a memory ISCMPTL for storing the fact that the focus lens has been initialized is set at 0 (S571). Driving of focus lens 34 in the rearward direction is started (S572) and when switch SLI is turned on (YES in S573), −5 remaining driving pulses are set in focus drive control circuit 50 to perform a forward movement by five pulses (S574). When the lens is stopped (YES in S575), memory ISCMPTL is set at 1 (S578). The lens performs calculation of distance with reference to this position and based on the amount of forward movement of the lens. When memory FSTPL (a memory for storing the fact that a focus lens stop instruction STOPL has been input) is set at 1 during lens driving (NO in S575, YES in S576), further lens driving is not required so that memory FSTPL is set at 0 and the driving of focus lens 34 is stopped (S577).

Then the aperture is driven to a mechanism full open value (S581). When memory FSTPAV for storing the fact that an aperture stop instruction STOPAV has been input is set at 1 during aperture driving (YES in S586), further lens driving is not required so that memory FSTPAV is set at 0 and the aperture driving is stopped (S587). When an aperture drive completion path IPCMPT is 0, the IPCMPT is set at 1 and the initialization operation is completed (S584, S585).

Low Electric Consumption Mode Shift Instruction STANDBY

Figure 36A:
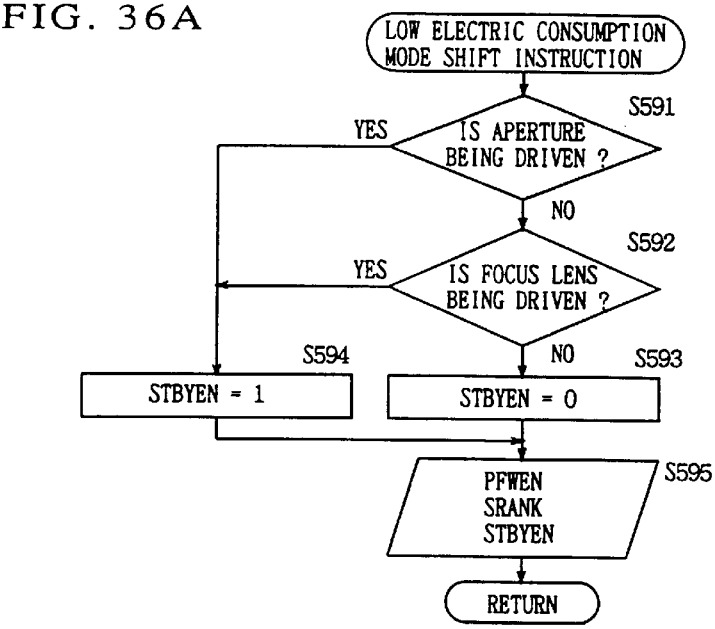
FIGS. 36A and 36B are flow charts illustrating a content of the low power consumption mode shift instruction.
Figure 36B:
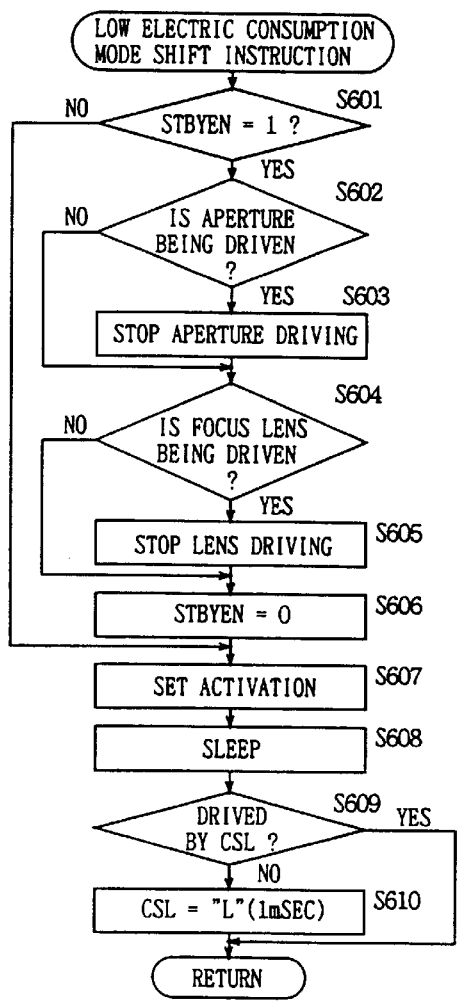

FIG. 36 is a flow chart illustrating a low electric consumption mode shift instruction STANDBY communication processing. FIGS. 36A and 36B illustrate a content of the communication and an operation associated with the communication, respectively.

Referring to FIG. 36A, when the aperture or the focus lens is being driven (YES in S591 or S592), a low electric consumption mode shift enable/disable signal STBYEN is set 1 (S594). When neither the aperture nor the focus lens are being driven (NO in S501, NO in S592, low electric consumption shift enable/disable signal STBYEN is set at 0 (S593). Then, PF operation permission/prohibition signal PFWEN, activation factor permission rank signal SRANK and low electric consumption shift enable/disable signal STBYEN are communicated and the processing returns (S595).

Referring to FIG. 36B, the operation associated with a low electric consumption mode shift instruction STANDBY communication will now be described. When low electric consumption shift enable/disable signal STBYEN is 1 (YES in S601), the aperture and focus lens 34 are stopped and low electric consumption shift enable/disable signal STBYEN is set at 0 (S602–S606). Then, in response to PF operation permission/prohibition signal PFWEN and activation factor permission rank signal SRANK from the body, conditions for being activated from and interrupting a sleep state are set and the lens enters into a sleep state (S607-S608). If the lens is actuated now, it exits the sleep state. When an interruption is performed now, it exits the sleep state and the interruption is caused to perform an interruption processing routine.

When an interruption is caused by chip select signal CSL=LOW and the lens is actuated (YES in S609), the body is not required to be activated and thus the processing returns. When an interruption is caused or the lens is actuated under other conditions (NO in S609), the body is required to be actuated. Thus, chip select signal CSL is set at LOW for 1 mSEC (S610) and then the processing returns and waits for a communication request from the body in the normal routine.

Interruption rank will now be described. Rank 1 indicates that brightness measuring and distance measuring switch S1 of the body is turned on, the body is being charged and that main switch S0 is turned off. Interruption is caused only by chip select signal CSL. Thus, basically the lens does not activate the body except for the case in which the lens is reset and started due to some abnormality.

Rank 2 indicates that brightness measuring and distance measuring switch S1 is not turned on and that the body is being charged. Interruption is caused by chip select signal CSL and mode select switch SAF/MF.

Rank 3 corresponds to the state in which the body is sleeping excluding the states described above. Interruption is caused by chip select signal CSL and mode select switch SAF/MF, and the activation is caused by the other switches.

Serial Bus Use Permission Signal BUSFREE Communication Processing

Figure 37A:
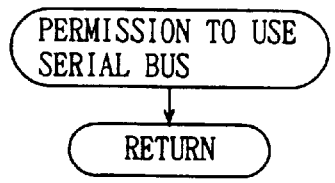
FIGS. 37A and 37B are flow charts illustrating a content of a permission to use a serial bus.
Figure 37B:
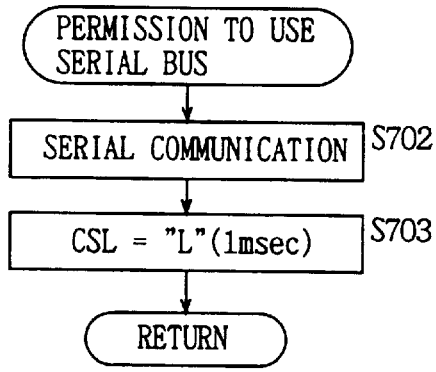

Referring now to FIG. 37, a serial bus use permission signal BUSFREE communication processing will now be described. FIG. 37A illustrates a content of a serial bus use permission signal BUSFREE communication, and FIG. 37B is a flow chart illustrating an operation associated therewith.

Referring to FIG. 37A, when using a serial bus is permitted, nothing is performed and the processing returns.

Referring to FIG. 37B, when using a serial bus is permitted and the body microcomputer 10 outputs a permission to perform serial communication, a serial bus is used to perform serial communication with E2PROM 21 (S702). When the communication is completed, chip select signal CSL is set at LOW for 1 mSEC and the processing returns to wait for a communication request from the body microcomputer 10 (S703).

Brightness Measuring Data Obtain Signal GETED Communication Processing

Figure 38:
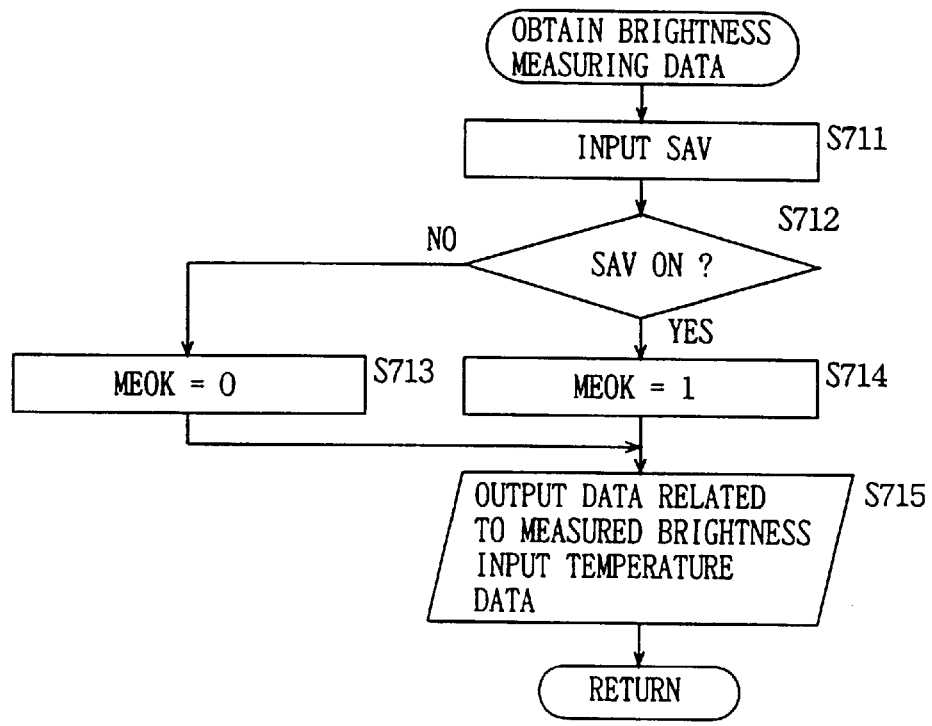
FIG. 38 is a flow chart illustrating a content of the brightness measuring data obtain processing.

FIG. 38 is a flow chart illustrating a content of a brightness measuring data obtain signal GETED communication.

Referring to FIG. 38, the state of aperture full open switch SAV is input (S711) and depending on an on/off state of the switch, full aperture metering enable/disable signal MEOK is set at 0 or 1 (S712–S714). Then, data with respect to brightness measuring as well as data on temperature are input (S715).

Current Aperture Value Obtain Signal GETAV Communication Processing

Figure 39:
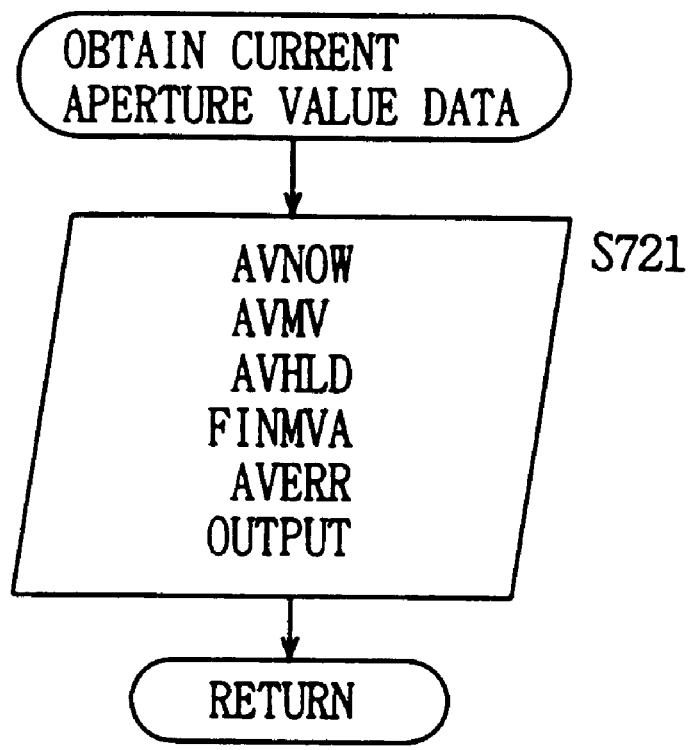
FIG. 39 is a flow chart illustrating a content of the current aperture value data obtain processing.

A current aperture value obtain signal GETAV communication will now be described. Referring to FIG. 39, various signals concerning aperture value are output (S721).

Aperture Driving Instruction MOVAV Communication Processing

Figure 40A:
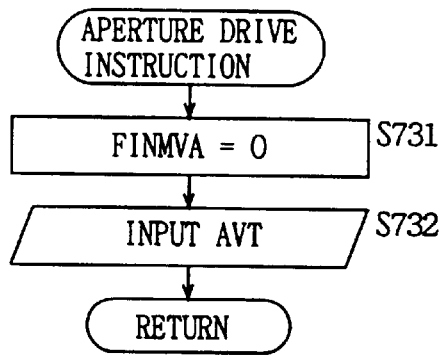
FIGS. 40A and 40B are flow charts illustrating a content of the aperture drive instruction processing.
Figure 40B:
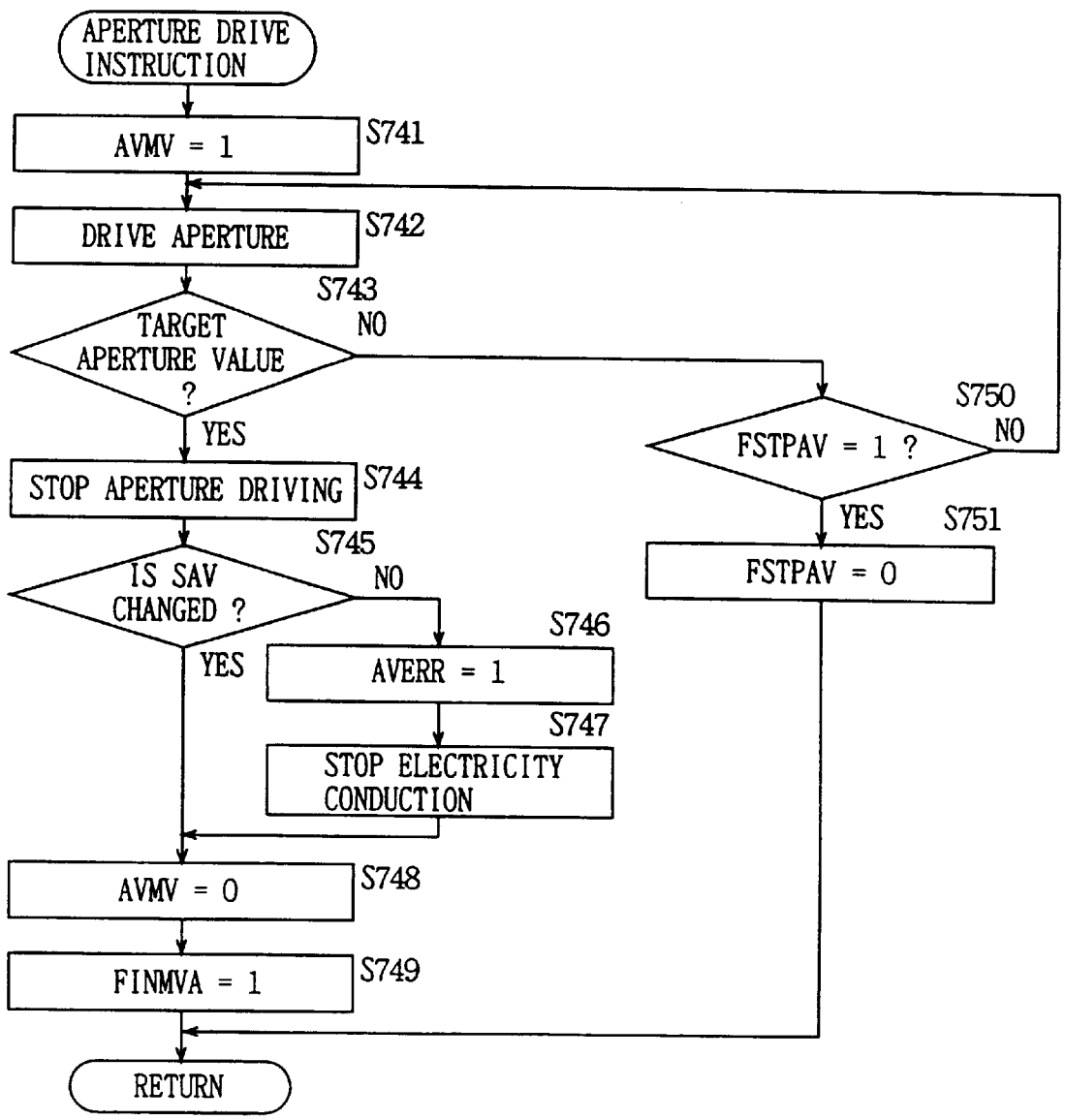

Referring now to FIG. 40, an aperture drive instruction MOVAV communication processing will be described. FIGS. 40A and 40B illustrate a content of the communication and an operation associated therewith, respectively.

Referring to FIG. 40A, an aperture drive instruction acknowledgement completion/incompletion signal FINMVA is set at 0 (S731), and a target aperture value signal AVT is input (S732).

The operation will now be described with reference to FIG. 40B. First, an aperture driving/stopping signal AVMV is set at 1 (S741). Aperture driving is started (S742). When a target aperture value is reached (YES in S743), whether the state of aperture full open switch SAV has been changed from an on state to an off state is determined (S745). If the state has not been changed, the aperture driving mechanism has some abnormality and thus aperture abnormality/normality signal AVERR is set at 1 (S746) and electricity conduction is stopped (747).

When the state of aperture full open switch SAV has been changed from an on state to an off state, a decision that the aperture normally moves is made, and aperture driving/stopping signal AVMV is set at 0 and aperture driving instruction acknowledgement completion/incompletion signal FINMVA is set at 1 to terminate aperture driving (S748, S749).

During aperture driving (NO in S743), if memory FSTPAV is set at 1 by an aperture stop instruction STOPAV input (YES in S750), it means that aperture driving is stopped, and thus memory FSTPAV is set at 0 and an aperture drive operation is terminated (S751). Detection by aperture full open switch SAV of normality/abnormality of the aperture is performed only when the aperture is stepped down from a mechanism full open position or when the aperture is driven from a stop-down position to a mechanism full open position.

Aperture Stop Instruction STOPAV Communication Processing

Figure 41A:
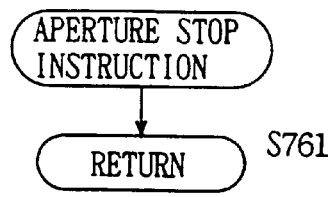
FIGS. 41A and 41B are flow charts illustrating a content of the aperture stop instruction processing.
Figure 41B:
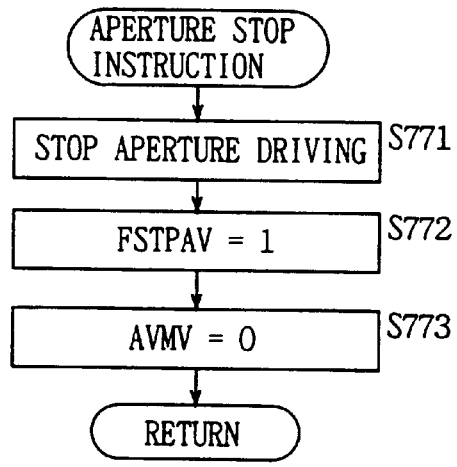

An aperture stop instruction STOPAV communication processing will now be described. FIG. 41A illustrates a content of an aperture stop instruction STOPVAV communication, and FIG. 41B illustrates an operation associated therewith.

The operation associated with the aperture stop instruction will now be described with reference to FIG. 41B. Aperture driving is stopped (the electricity conduction is also stopped), and memory FSTPAV is set at 1 so that aperture driving is not performed again after the processing returns (S771, S772). Furthermore, since aperture driving has been stopped, aperture driving/stopping signal AVMV is set at 0 and the processing returns (S773).

Distance Measuring Data Obtain Signal GETAD Communication Processing

A distance measuring data obtain signal GETAD communication processing will now be described. Here, only a communication is performed.

Figure 42:
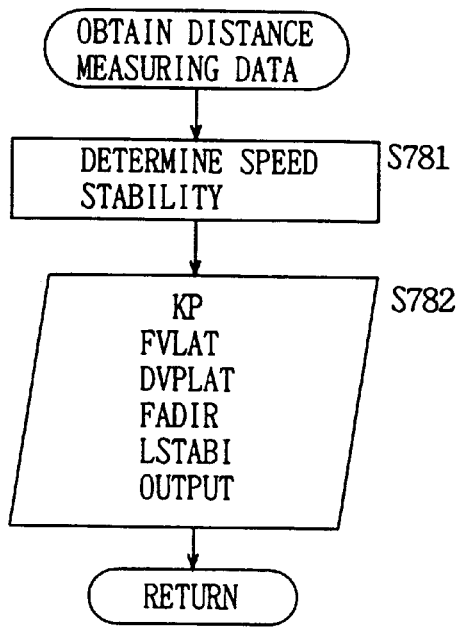
FIG. 42 is a flow chart illustrating a content of distance measuring data obtain processing.

Referring to FIG. 42, information from speed detect circuit 40 on whether the lens speed during a distance measuring is stable is input (S781) and transmitted to the body together with other various signals related to distance measuring (S782).

Distance Measuring Synchronization Signal LAT Communication Processing

A distance measuring synchronization signal LAT communication processing will now be described with reference to FIG. 43.

Figure 43A:
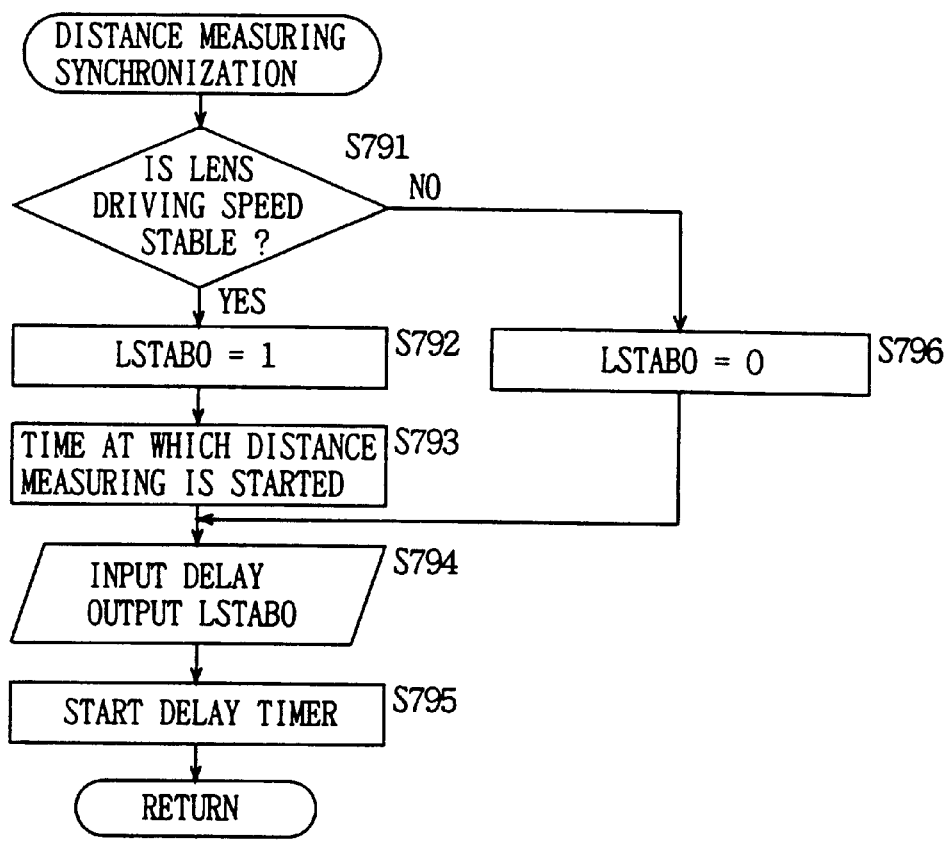
FIGS. 43A and 43B are flow charts illustrating a content of distance measuring synchronization processing.
Figure 43B:
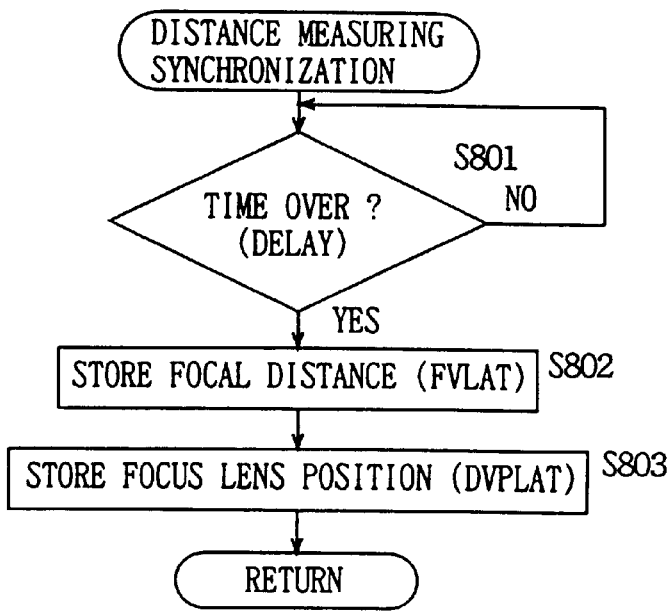

FIG. 43A illustrates a content of the communication and FIG. 43B illustrates an operation associated therewith.

Referring to FIG. 43A, a signal from speed detect circuit 40 is used to determine whether the current lens speed is stable (S791). If the speed is stable, speed detect circuit 40 is informed of the beginning of a measuring period (S793), and a distance measuring integration time lag DELAY is input and lens speed stability (the speed is stable/unstable) signal LSTABO is set at 1 and transmitted to the body (S792–794). Then, the time lag input is set in a timer and the processing returns (S795).

Referring to FIG. 43B, the operation for distance measuring synchronization signal LAT will now be described. When a time lag time period elapses (YES In S801), a focal distance represented by a signal FVLAT indicating a focal distance during distance measuring and a focus lens position represented by a signal DVPLAT indicating a focus lens position during distance measuring at the middle point of a distance measuring period are stored (S802, S803).

Focus Lens Drive State Obtain Signal GETLST Communication Processing

Figure 44:
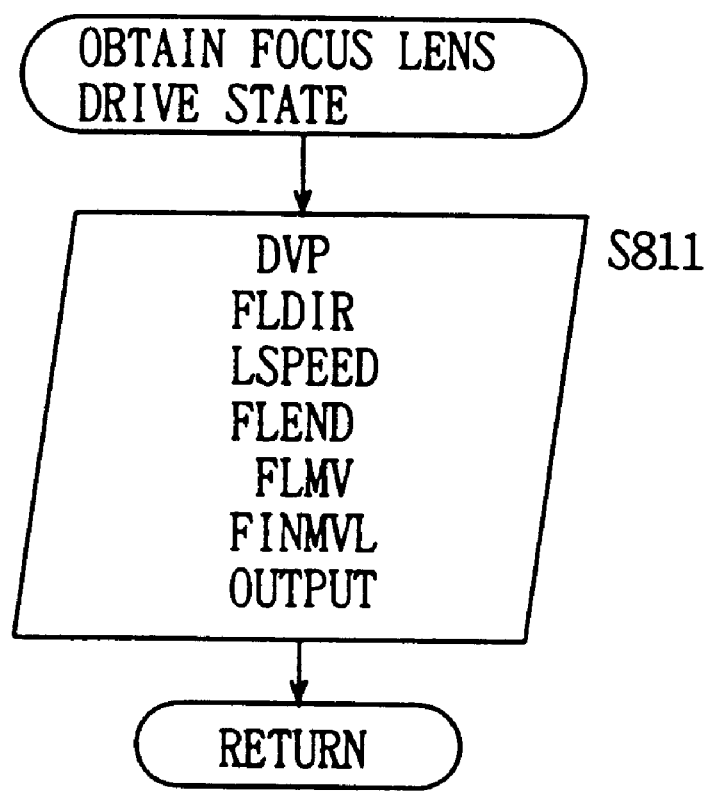
FIG. 44 is a flow chart illustrating a content of the focus lens drive state obtain processing.

A focus lens drive state obtain signal GETLST communication will now be described. Referring to FIG. 44, various signal related to focus lens drive state are output to the body (S811).

Focus Lens Drive Instruction MOVL Communication Processing

Figure 45A:
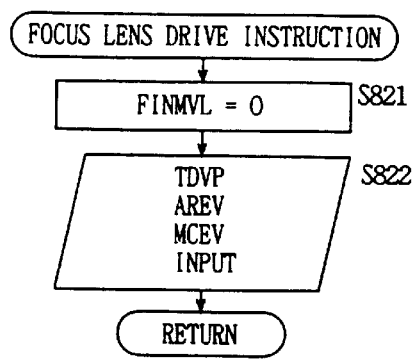
FIGS. 45A and 45B are flow charts illustrating a content of the focus lens drive instruction processing.

A focus lens drive instruction MOVL communication processing will now be described with reference to FIG. 45. FIG. 45A illustrates a content of the communication, and FIG. 45B illustrates an operation associated therewith.

Referring to FIG. 45A, a focus lens drive instruction acknowledgement completion/incompletion signal FINMVL is set at 0 (S821), and various signals related to lens driving are input (S822).

Figure 45B:
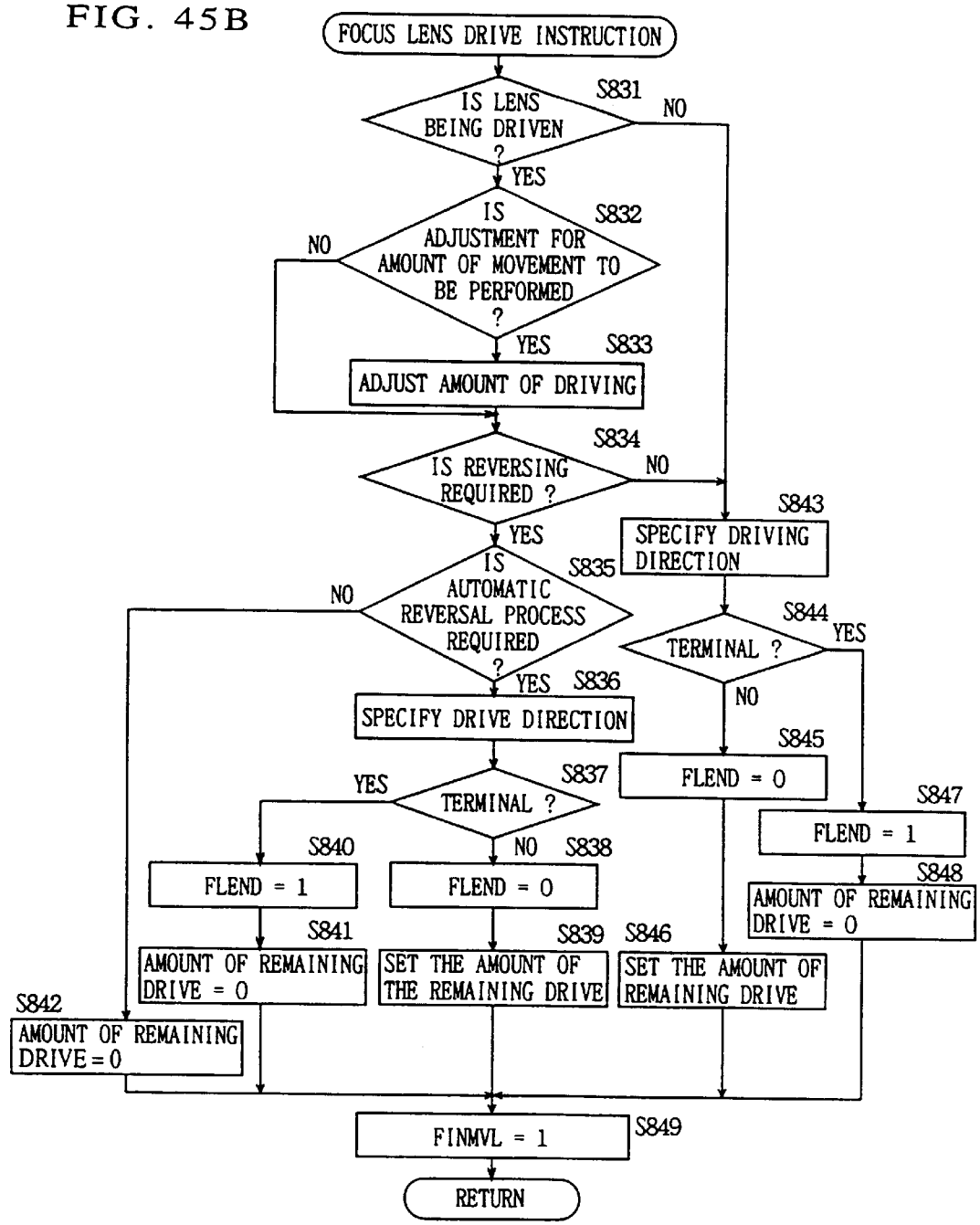

Referring to FIG. 45B, the operation for focus lens drive instruction MOVL. When the lens is not being driven (NO in S831), the drive direction is determined from an amount of driving input (S843) and if it is not at the terminal in the drive direction (NO in S844), focus lens terminal/non-terminal signal FLEND is set at 0 (S845) and the amount of driving input is set as a remaining amount of driving (S846). If it is at the terminal (YES in S844), focus lens terminal/non-terminal signal FLEND is set at 1 (S847) and the remaining amount of driving is set at 0 (S848).

When the lens is being driven and adjustment for the amount of movement is performed (YES in S831, YES in S832), the amount of driving is adjusted by the lens position at the middle point of the distance measuring period and the current lens position (S834). Then, whether or not a target position of the lens is in the direction opposite to the current lens drive direction, that is, whether the motor should be reversed is determined (S834). When the target position is not in the opposite direction (NO in S834), the processing of S843–S848 described above is carried out.

When the target position is in the direction opposite to the drive direction (YES in S834), whether or not an automatic reversal process is performed is determined based on automatic reversal process decision signal AREV (S835). When the process is not performed, the remaining amount of driving is set at 0 (S842). When the process is performed, the distance to the target position is set as a remaining amount of driving (S836–S841). After the above process is performed, focus lens drive instruction acknowledgement completion/incompletion signal FINMVL is set at 1 (S849).

Focus Lens Stop Instruction STOPL Communication Processing

A focus lens stop instruction STOPL communication processing will now be described. Only a communication is performed.

Figure 46:
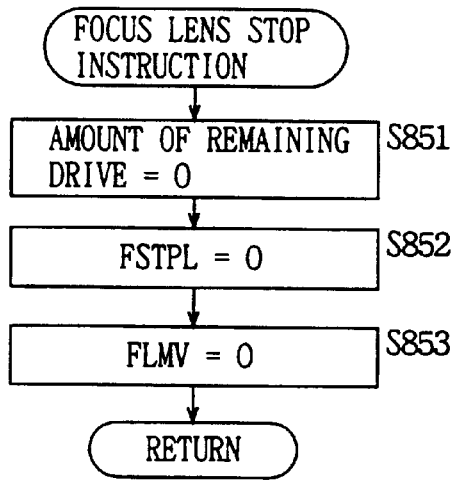
FIG. 46 is a flow chart illustrating a content of the focus lens stop instruction processing.

Referring to FIG. 46, a remaining amount of driving is set at 0 to stop lens driving (S851), memory FSTPL is set at 0 and focus lens driving/stopping signal FLMV is set at 0 (S852, S853).

AF/M Switch Instruction RETAFM Communication Processing

Figure 47:
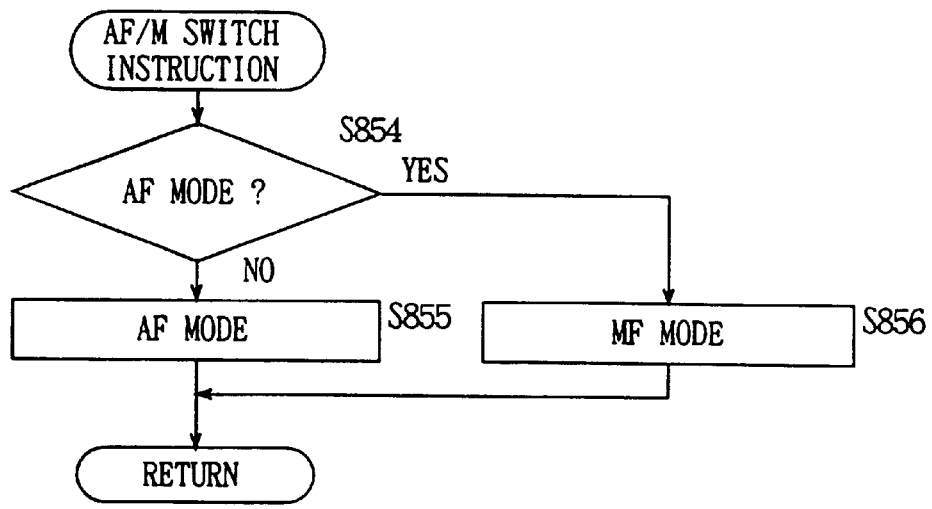
FIG. 47 is a flow chart illustrating a content of the AF/M switch instruction processing.

Referring now to FIG. 47, an AF/M switch instruction RETAFM communication processing will now be described. Referring to FIG. 47, the decision on whether the current mode is auto focus mode is made (S854), and the mode is switched according to the mode determined (S855, S856).

PF Drive Permission Signal MOVPF Communication Processing

Figure 48A:
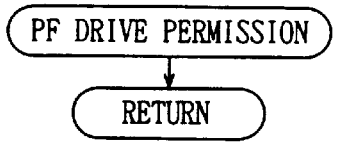
FIGS. 48A and 48B are flow charts illustrating a content of the PF drive permission processing.
Figure 48B:
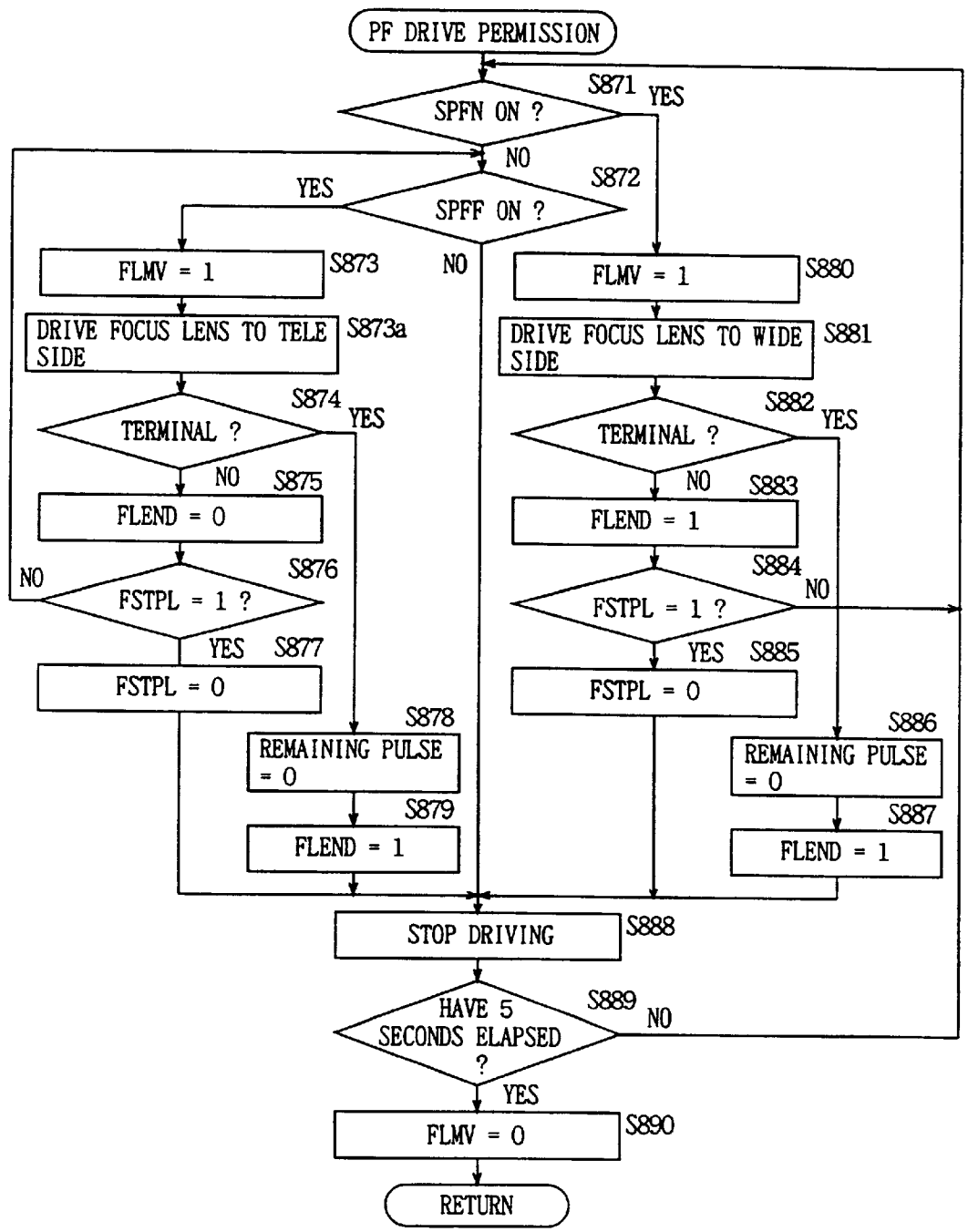

Referring to FIG. 48, a PF drive permission signal MOVPF communication processing will now be described. FIG. 48A illustrates a content of the communication and FIG. 48B illustrates a content of an operation associated therewith.

Referring to FIG. 48A, the processing merely returns in the communication.

The operation associated with the communication will now be described with reference to FIG. 48B. First, the states of power focus switches SPFN and SPFF are input (S871, S872) and focus lens 34 is driven to the tele side or the wide side depending on the states of power focus switches SPFN and SPFF (S873, S873a, S880, S881). When the lens reaches a terminal or when memory FSTPL is set at 1, the driving is stopped (S874–879, S882–S888). While the lens is being driven, focus lens driving/stopping signal FLMV is set at 1 (S873, S880). When the lens is stopped, focus lens driving/stopping signal FLMV is set at 0 (S890). When the lens is not positioned at a terminal, focus lens terminal/non-terminal signal FLEND is set at 0 (S875, S883). When the lens is positioned at a terminal, focus lens terminal/non-terminal signal FLEND is set at 1 (S879, S887). If a power focus operation is not performed for five seconds or more, the processing returns to prevent frequent power focus drive request communications for frequent and short power focus operations (S889, S890).

Infinity Set Instruction MOVINF Communication Processing

Figure 49A:
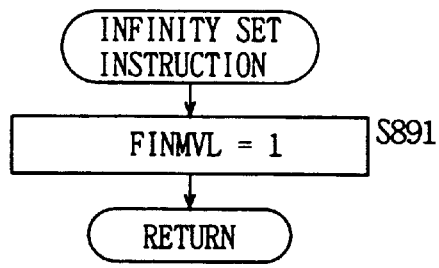
FIGS. 49A and 49B are flow charts illustrating a content of the infinite set instruction processing.
Figure 49B:
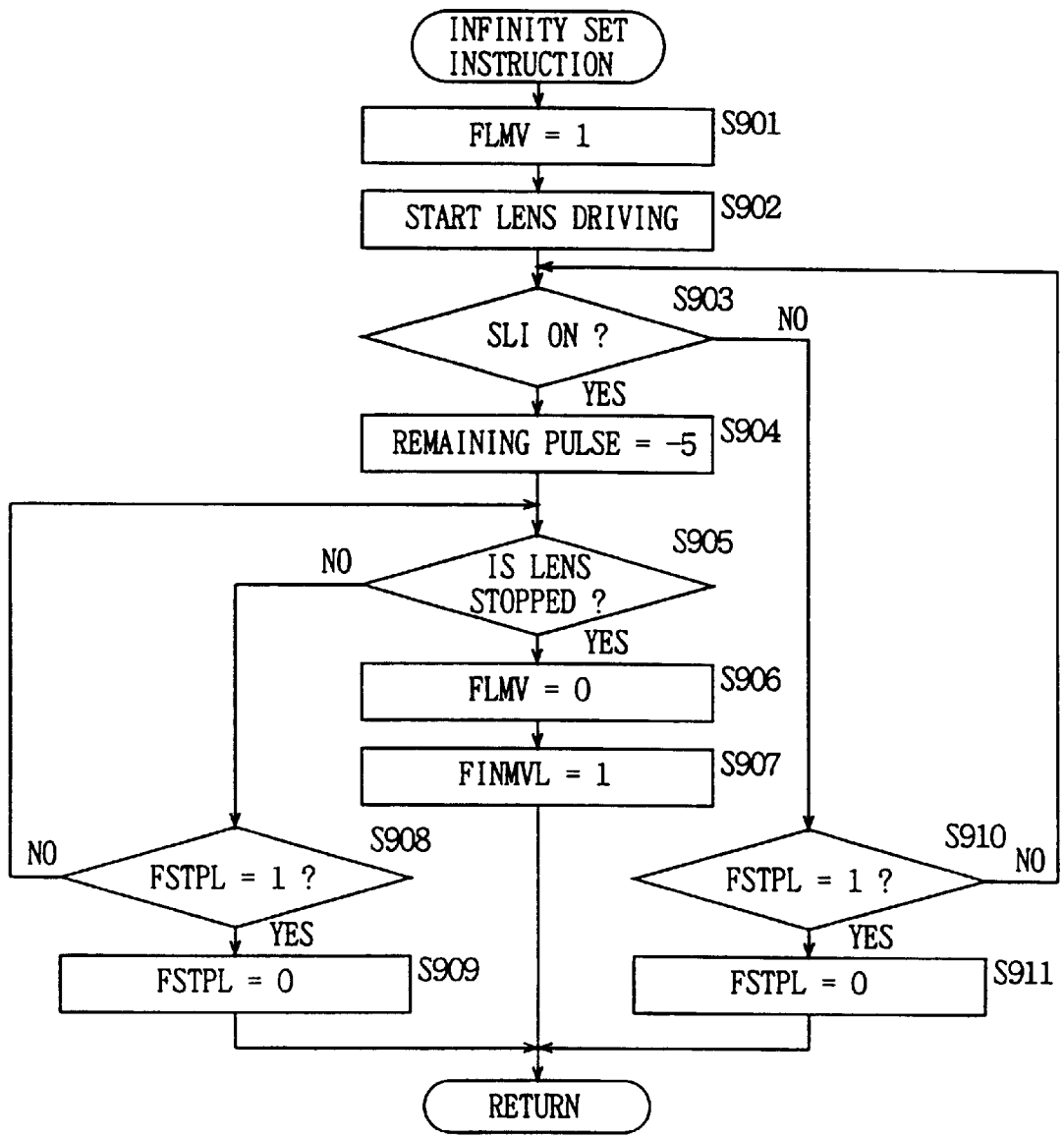

Referring now to FIG. 49, an infinity set instruction MOVINF communication processing will now be described. FIG. 49A illustrates a content of the communication and FIG. 49B illustrates an operation associated therewith.

Referring to FIG. 49A, focus lens drive instruction acknowledgement completion/incompletion signal FIN-MVL is at 0 (S891).

Referring now to FIG. 49B, the operation associated with infinity set instruction MOVINF will now be described. Focus lens driving/stopping signal FLMV is set at 1 (S901), and the lens is driven until switch SLI is turned on and the lens reaches the teleside terminal (S902-S903). When switch SLI is turned on, the lens is driven back by five pulses (S904). Then, when the lens is stopped (YES in S905), focus lens driving/stopping signal FLMV is set at 0 and focus lens drive instruction acknowledgement completion/incompletion signal FINMVL is set at 1 (S906, S907). When focus lens stop instruction STOPL is input and memory FSTPL is set up 1 during lens driving (YES in S908 or S910), infinity setting is interrupted (S909, S911).

No Operation Signal NOP Communication Processing

Figure 50:
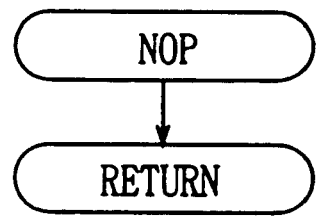
FIG. 50 is a flow chart illustrating the NOP processing.

Referring now to FIG. 50, nothing particular is performed in a no operation signal NOP communication.

Power Power Supply Applying Signal PWRSPL Communication Processing

Figure 51A:
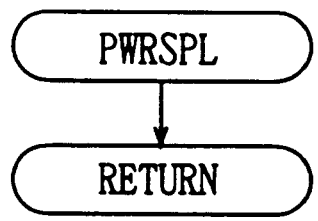
FIGS. 51A and 51B are flow charts illustrating a content of the power supply supplying processing.
Figure 51B:
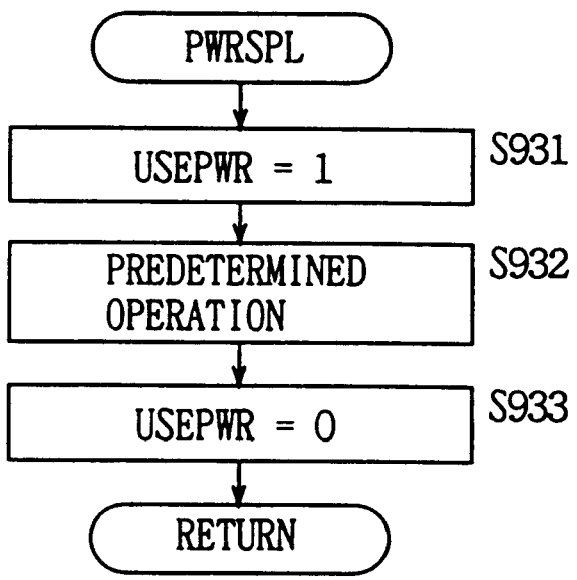

Referring now to FIG. 51, a power supply supplying signal PWRSPL communication processing will be described. FIG. 51A illustrates a content of the communication and FIG. 51B illustrates a content of an operation associated therewith.

Referring to FIG. 51A, nothing particular is performed and the flow returns in the communication.

Referring to FIG. 51B, in the operation, a power supply use signal USEPWR indicating that power supply VP is being used is set at 1 (S931) and a predetermined operation is performed (S932). Then, power supply use signal USEPWR is reset (S933).

Power Power Supply Use Prohibition Signal PWRSTP Communication Processing

Figure 52A:
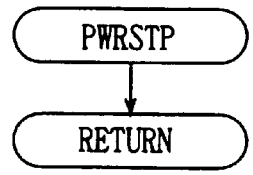
FIGS. 52A and 52B are flow charts illustrating a content of the processing to prohibit the use of the power supply.
Figure 52B:
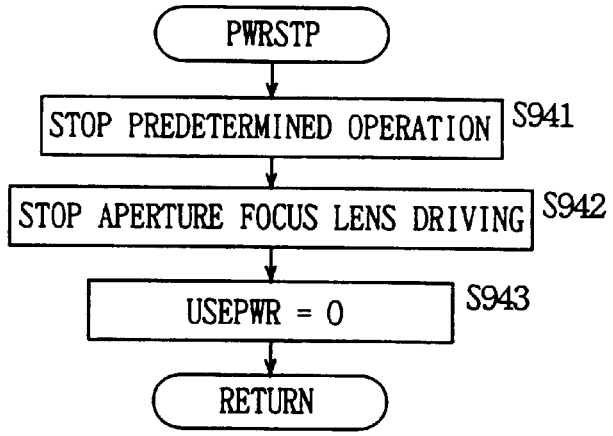

Referring now to FIG. 52, a power supply use prohibition signal PWRSTP communication processing will now be described. FIG. 52A illustrates a content of the communication and FIG. 52B illustrates an operation associated therewith.

Referring to FIG. 52A, nothing particular is performed and the flow returns in the communication.

Referring to FIG. 52B, in the operation, a predetermined operation is stopped (S941) and as is in the low power consumption mode, driving of the aperture and the focus lens is stopped (S942), and power supply use signal USEPWR indicating that power supply VP is being used is reset (943).

INTERMEDIATE ACCCESSARY

Figure 53:
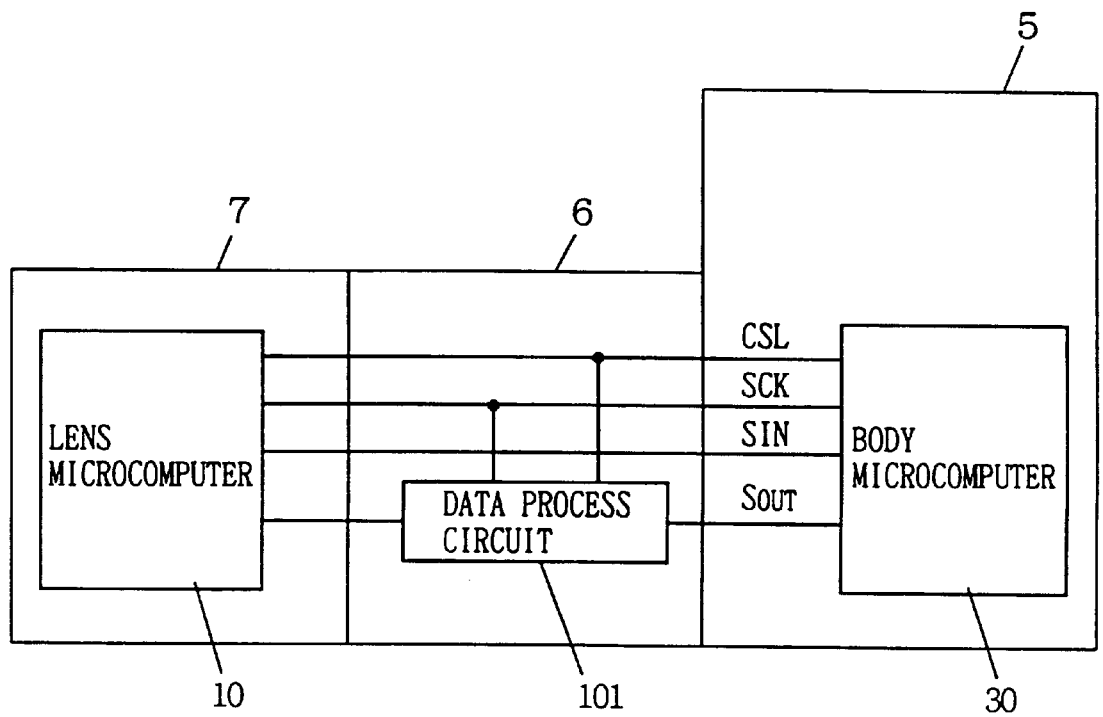
FIG. 53 shows a connection state of an intermediate accessory.

An intermediate accessory mountable between body 5 and lens 7 will now be described. FIG. 53 shows an intermediate accessory 6 provided between body 5 and lens 7. Intermediate accessory 6 includes a data process circuit 101 connected to serial signal line SOUT and operating in response to chip select signal CSL and a signal of serial signal line SCK.

Figure 54A:
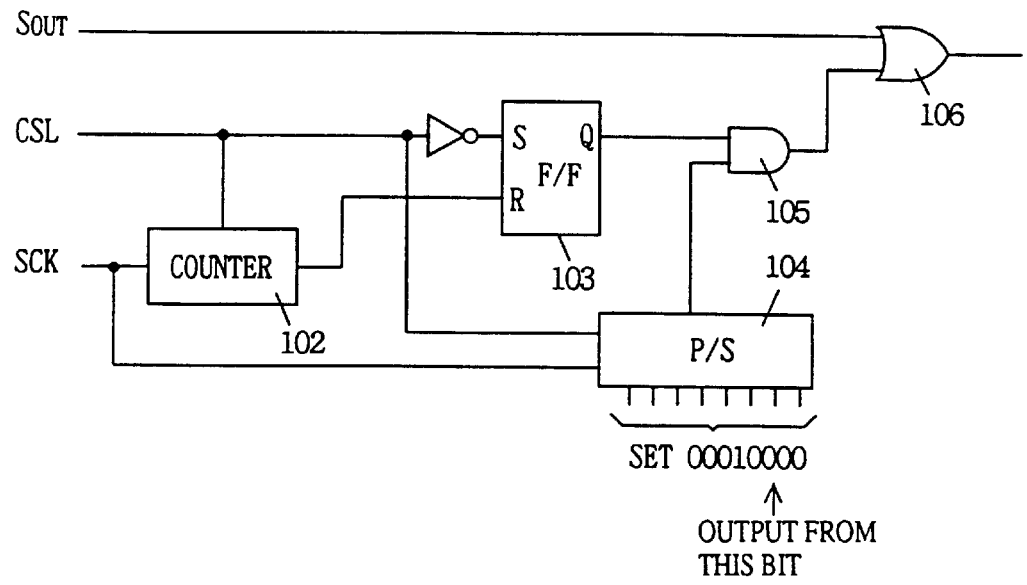
FIGS. 54A and 54B show an example of a data process circuit of a general-purpose intermediate accessory.
Figure 54B:
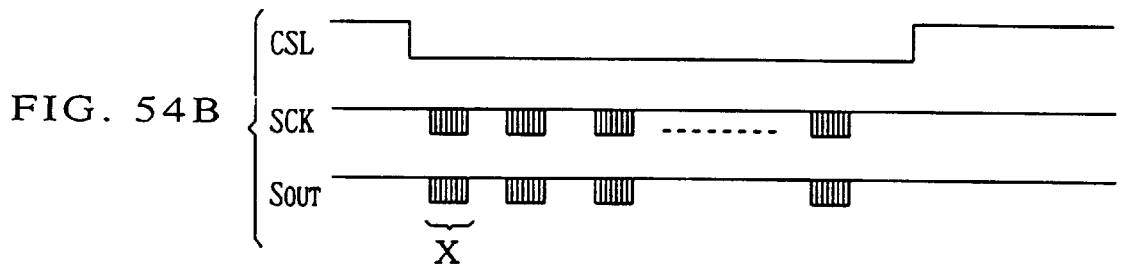

FIG. 54A shows a specific circuit example of data process circuit 101 provided in a general-purpose intermediate accessory, and FIG. 54B shows output signals of serial signal lines. Referring to FIG. 54A, data processor circuit 101 includes a counter 102 receiving chip select signal CSL and clock signal SCK, a flipflop circuit 103 receiving a signal from count 102 and chip select signal CSL, a P/S (parallel-serial conversion) circuit 104 receiving chip select signal CSL and clock signal SCK, an AND circuit 105 connected to flipflop 103 and P/S circuit 104, and an OR circuit 106 connected to AND circuit 105 and receiving serial out signal SOUT and outputting a signal.

Referring to FIG. 54B, data when serial out signal SOUT falls a plurality of times (designated with "x" in the figure) is ORed with an output of P/S circuit 103. P/S circuit 104 sets 00010000 in response to an input signal.

The operation will now be described. While clock signal SCK outputs eight pulses after chip select signal CSL attains LOW, count 102 outputs LOW, and thereafter count 102 outputs HIGH. Flipflop circuit 103 is set when chip select signal CSL attains LOW, and is reset when the output of count 102 attains HIGH. When terminals S and R both attain HIGH, the resetting is prioritized.

With chip select signal CSL attaining LOW, P/S circuit 103 serially outputs one byte of data which is set synchronously with clock signal SCK pulse in parallel. AND gate 105 receives an output of flipflop circut 103 and an output of P/S circuit 104. Thus, AND gate 105 serially outputs a signal from P/S circuit 103 synchronously with the eight pulses (one byte) of clock signal SCK after chip select signal CSL is changed from HIGH to LOW. The output is ORed by OR gate 106 and is output on serial out SOUT.

Figure 55:
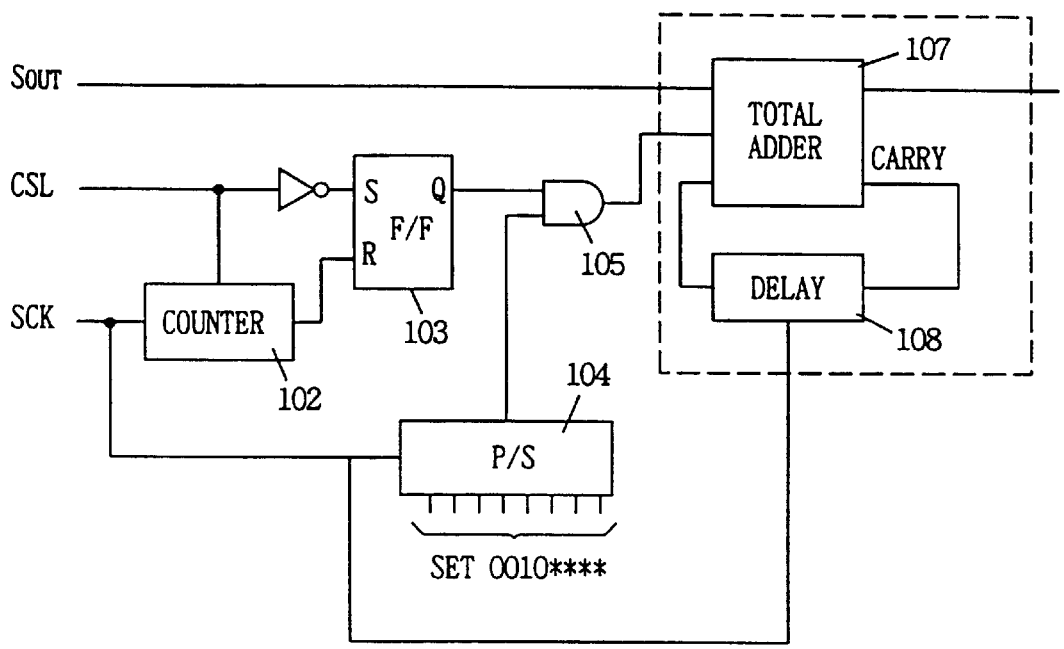
FIG. 55 shows an example of a data process circuit of a dedicated teleconverter.

FIG. 55 is an example of a data process circuit for a teleconverter as a dedicated intermediate accessory. This example is similar to data process circuit 101 of the general-purpose accessory shown in FIG. 54 except for the portion surrounded by the broken line in the figure. Referring to FIG. 55, data from P/S circuit 104 and data from serial out SOUT are added together at a total adder 107. Carry data is delayed at a delay circuit 108 by one pulse and added to data of the next bit.

Figures 56A, 56B:
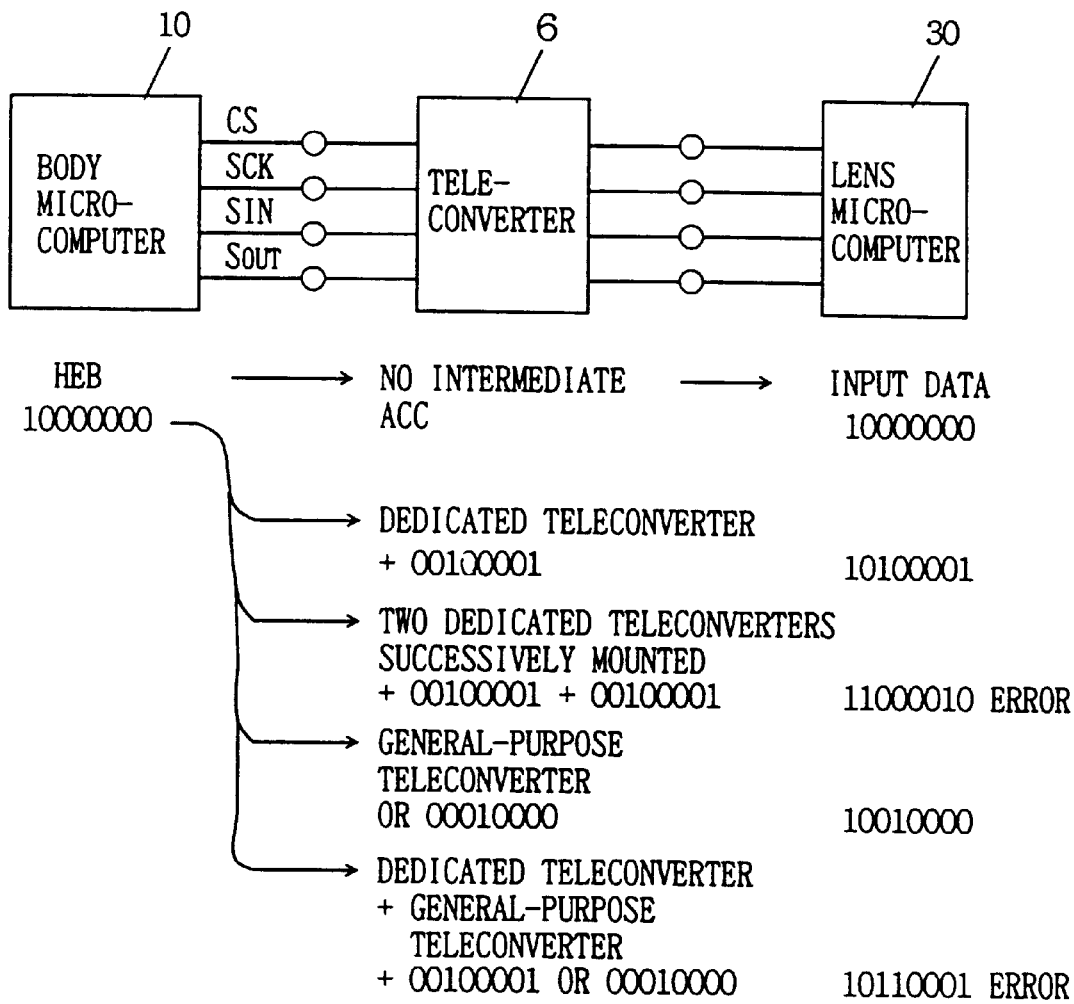
FIGS. 56A and 56B illustrate an intermediate accessory detection method by a communication header.

FIG. 56 specifically illustrates a content of intermediate accessory detection by a communication header. FIG. 56A schematically shows how data is transmitted from body microcomputer 10 to lens microcomputer 30 through the data process mentioned above, and FIG. 56B specifically shows a content of the data.

Referring to FIG. 56A body microcomputer 10 sends data of 10000000 not as a communication header HEB. When intermediate accessory 6 is not provided, the data is transparently input to lens microcomputer 30 without being processed. When a dedicated teleconverter is provided as an intermediate accessory, data of 00100001 is added and as a result, lens microcomputer 30 receives 1010001 as input data.

When two dedicated teleconverters are successively mounted, the 00100001 are added twice. Thus, data of 11000010 is input to lens microcomputer 30.

As shown in FIG. 56B, the lens microcomputer 30 determines that the state of the lens is normal when the seventh and sixth bits have a value of 10 and that the state of the lens is abnormal when the seventh and sixth bits do not have a value of 10. Thus, when two dedicated teleconverters are successively mounted, a decision that the state of the lens is abnormal is made, since the seventh and sixth bits are represented by 11. This is because when two dedicated teleconverters are successively mounted, optical degradation is caused.

When a general-purpose teleconverter (an intermediate ring, for example) or the like is provided as intermediate accessory 6, data 00010000 is ORed. Thus, data 10010000 is input to lens microcomputer 30. Similarly, when a dedicated teleconverter and a general-purpose teleconverter are added, data 00100001 is added and data 00010000 is ORed. Thus, data 10110001 is input to lens microcomputer 30. In this state, while a decision that the state of the lens is normal is made according to decision signal ICPB, lens microcomputer 30 determines that the state of the lens is abnormal due to a general-purpose intermediate accessory and a dedicated teleconverter mixed and successively mounted. For these abnormalities, the lens instructs the body to prohibit releasing by a release enable/disable signal REN.

ELECTRIC ADJUSTMENT OF APERTURE DIAMETER

Electric adjustment of aperture diameter associated with zooming in BL communication will now be described. Most zoom lenses need change their aperture diameters in response to zooming due to cutting of flare (aberration), adjustment of F number and the like. Changing an aperture diameter in response to zooming is referred to as "aperture diameter adjustment." Conventionally, aperture diameter adjustment is performed mechanically.

Figure 57:
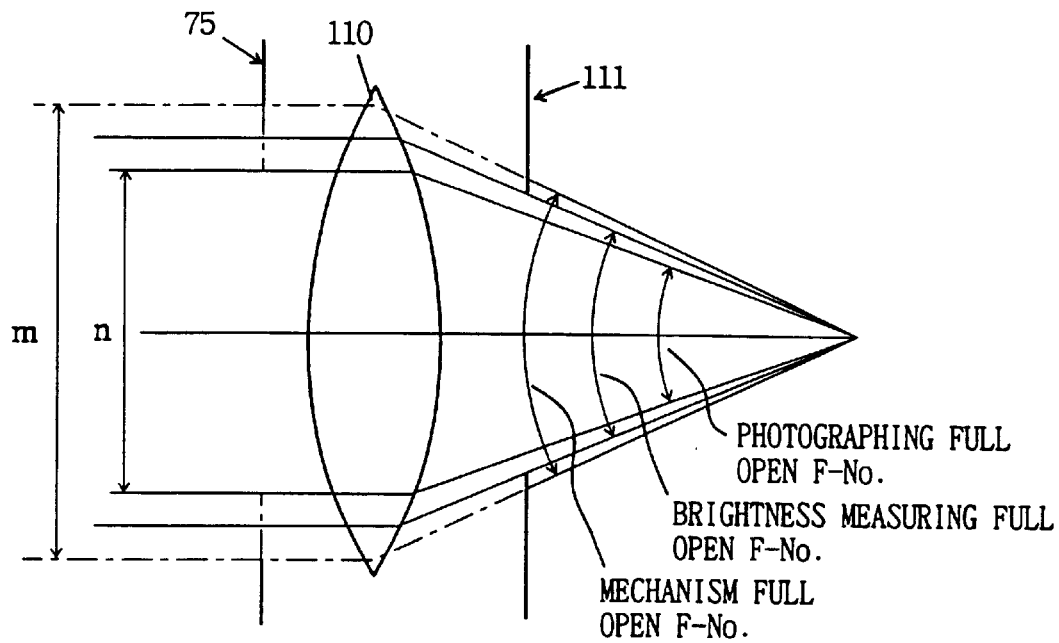
FIG. 57 illustrates electric adjustment of an aperture diameter associated with zooming.

Normally (for example, in full aperture metering excluding releasing and previewing) an aperture is kept at a maximum aperture diameter position and the mechanical adjustment is not performed. Thus, an F number can be brighter than an original, optically designed F number depending on the zooming state. This condition will be described with reference to FIG. 57. FIG. 57 schematically shows a structure of the aperture portion of a lens. Referring to FIG. 57, a lens 110 is provided with a diaphragm 75 and a light shielding plate 111 on the front and rear sides of lens 110, respectively. A relation of a mechanism full open F number, a full aperture metering F number and a photographing full open F number in this condition is shown in the figure. A mechanism full open position corresponding to the mechanism full open F number is designated by "m" in the figure. In photographing, however, the aperture is required to stop clown to the position designated by "n" in the figure corresponding to the photographing full open F number. Conventionally, these three F numbers are coincide with one another and the aperture is mechanically adjusted.

In a camera to which the present invention is applied, the aperture is electrically stopped down only in photographing and is otherwise maintained at a value of the mechanism full open F number. A camera to which the present invention is applied is structurally provided with an aperture actuator directly on an aperture block and hence does not have a part for providing an aperture adjustment cam mechanism as conventionally provided. Thus, in order to perform mechanical aperture diameter adjustment, additional cost is required for providing an adjustment mechanism, as is different from conventional examples. On the other hand, application of the electric adjustment system can prevent increased cost.

ADJUSTMENT FOR THE AMOUNT OF MOVEMENT IN AUTO FOCUSING

Figure 58:
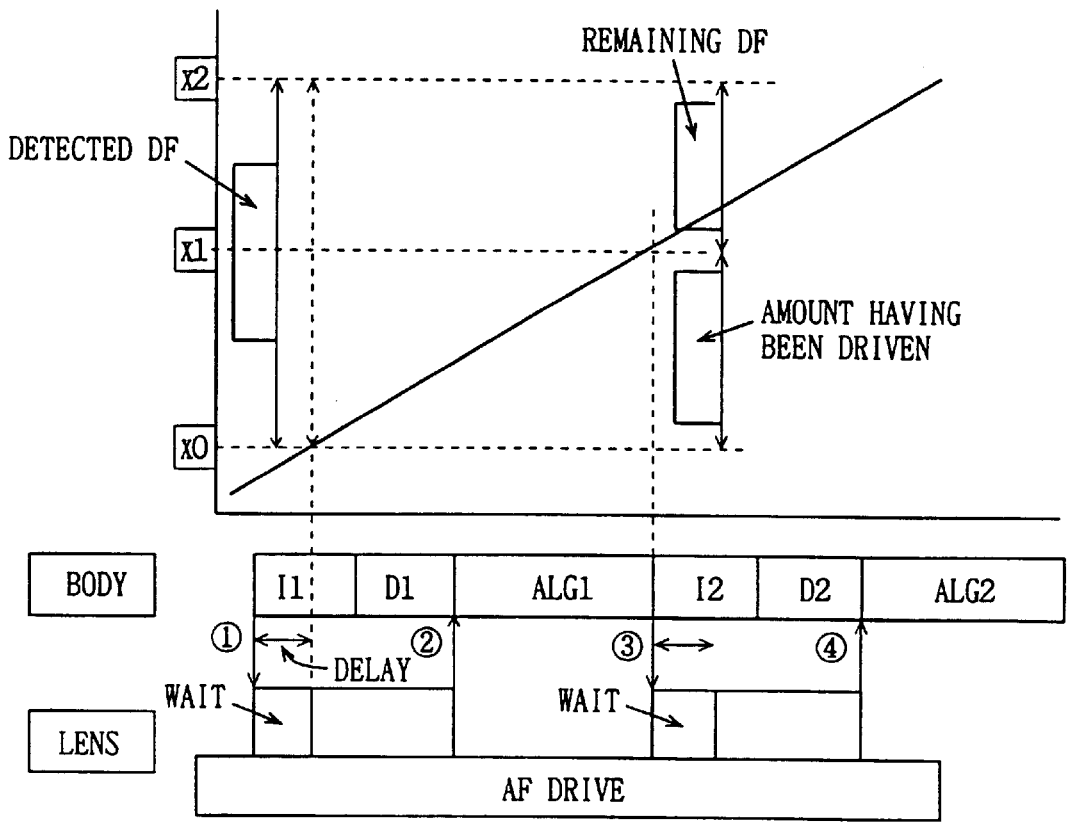
FIG. 58 illustrates adjustment for an amount of movement in auto focusing.

Adjustment for the amount of movement in auto focusing will now be described with reference to FIG. 58. FIG. 58 shows image plane position when the X axis represents time and the Y axis represents image plane position formed by a lens. Illustrated below the X axis are operations of the body side and the lens side. In the figure, I represents integration, D represents data dump and ALG represents an algorithm performing an operation.

First, a procedure of distance measuring will be described. Prior to distance measuring, the body performs distance measuring synchronization. The lens is informed that a distance measuring is started in communication ①. When a specified distance measuring integration time lag DELAY elapses, the lens stores the lens position and starts calculation of distance measuring data (such as ΔSB, K value). ΔSB represents a sensor back, indicating the difference between AFDF and the actual DF.

When distance measuring integration on the body side is completed, distance measuring data is taken through a distance measuring data obtain signal GETAD communication ②. When an ALG is completed, body 5 sends an amount of driving (≈ a detected DF) to focus lens 34 through a drive instruction MOVL communication ③. When an adjustment for an amount of movement is instructed, the lens uses the lens position stored (①) corresponding to I1 and a targeted amount of driving TDVP of the focus lens to calculate an actual amount of driving (≈ a remaining DF) to drive the lens. The amount of lens driving during the time required for I, D, ALG is adjusted by the lens. On the other hand, when adjustment for an amount of movement is not instructed, the lens is driven relative to the lens position at time point ③.

MODIFICATION

Figure 59:
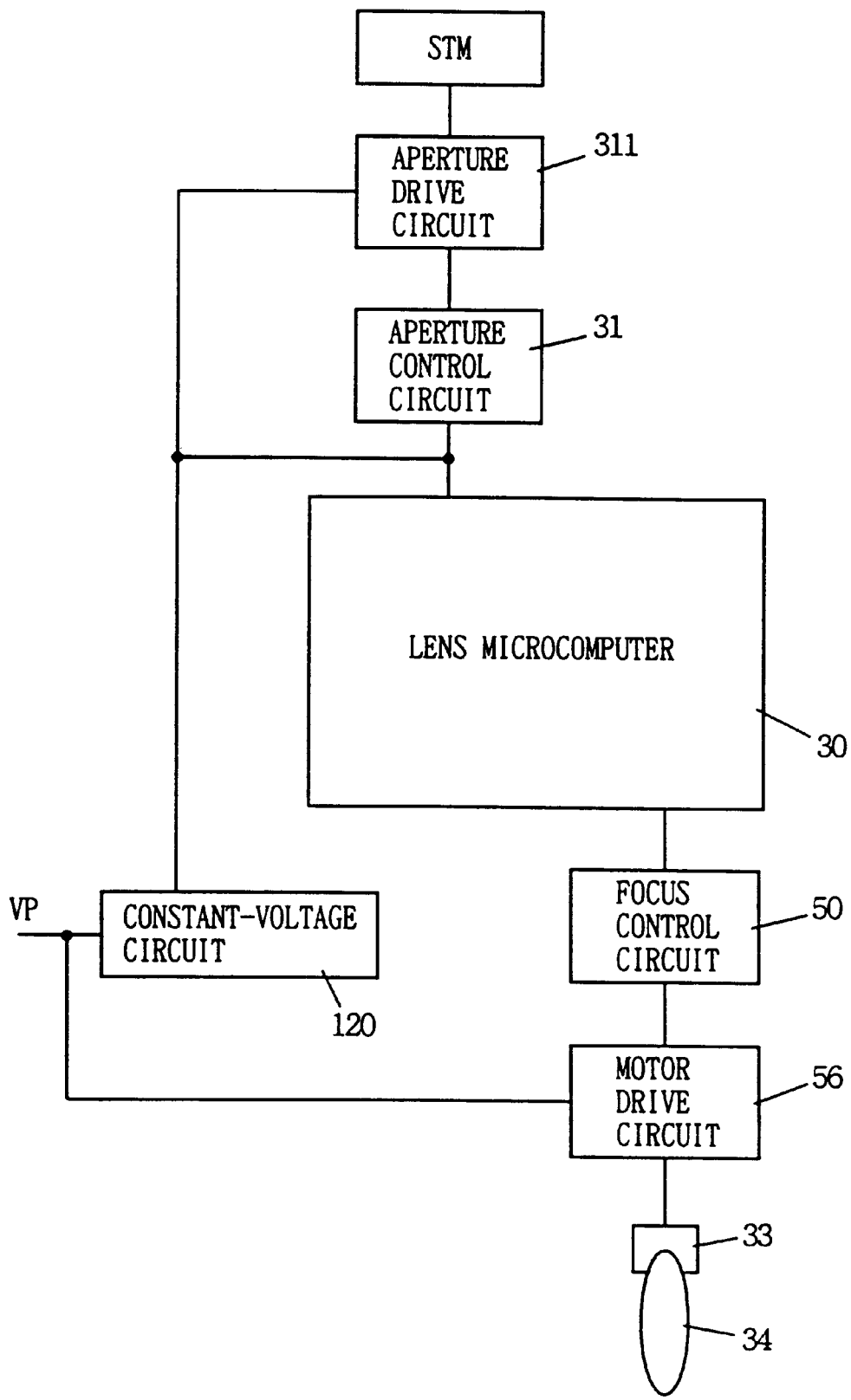
FIG. 59 shows another embodiment around the microcomputer of the lens side.

FIG. 59 shows another embodiment around lens microcomputer 30 shown in FIG. 6. Referring to FIG. 59, in the present embodiment, a voltage VP applied from the body side via a power transistor PTR is sent via a constant-voltage circuit 120 to lens microcomputer 30 and aperture drive circuit 31. A motor drive circuit 56 receives voltage VP transparently.

Thus, a constant-voltage circuit can be used to limit the fluctuation of a voltage supplied for aperture driving to a value within a predetermined range, so that loss of synchronization of stepping motor STM can be prevented. Furthermore, emitting of heat by the actuator can be prevented and the miniaturization can be achieved.

Such a regulator is not limited to a constant-voltage circuit, and a constant-current circuit may be provided to achieve a similar effect.

In the present embodiment, the focus drive control circuit is directly applied with voltage VP, since it is a closed loop. It may be an open loop similar to the aperture so that a predetermined voltage is applied via a constant-voltage circuit.

Figure 60:
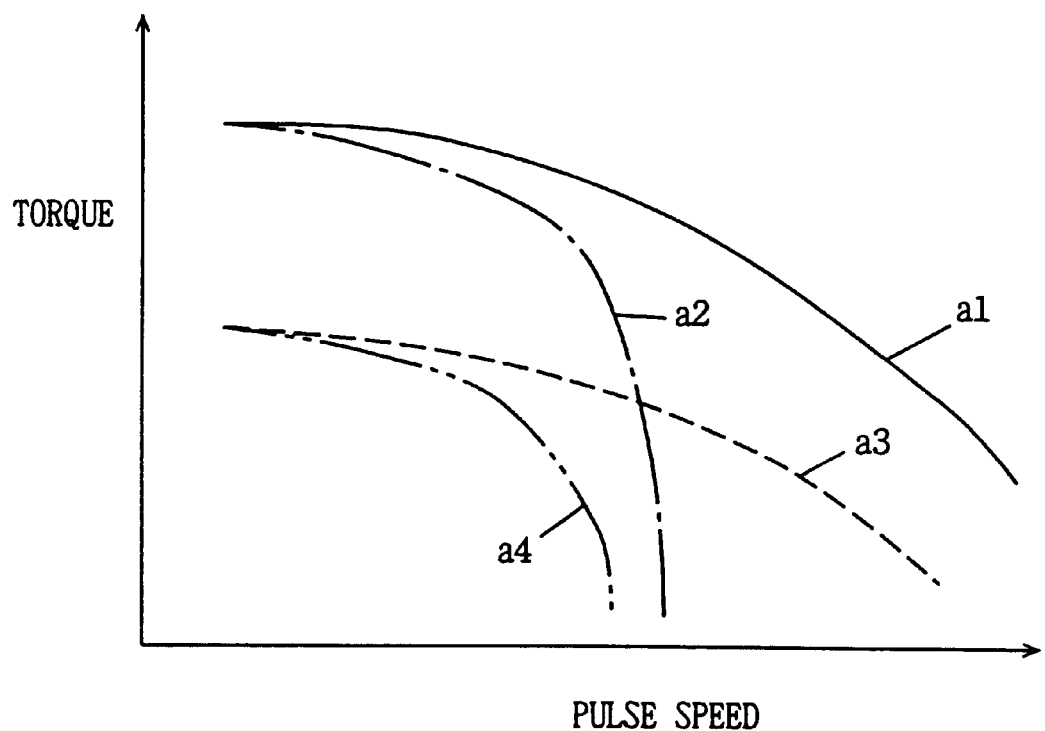
FIG. 60 illustrate a cause of loss of synchronization in a stepping motor.

A cause of loss of synchronization in stepping motor STM for aperture driving will now be described. FIG. 60 shows a relation between pulse speed and torque. A curve a1 is that when the motor is driven with a large voltage (6 V·5 gcm, for example), and a curve a2 is that in a state that the motor starts to be driven from a stop state. A curve a3 corresponds to a curve a1 with a smaller voltage (2 V·3 gcm, for example), and a curve a4 corresponds to a curve a2 under the conditions of a3. Refers to FIG. 60, while the aperture is being driven by the voltage for a1 when the curve drops to a3 due to voltage fluctuation, for example, torque can be reduced, as shown in the figure, and thus the aperture can be stopped. Meanwhile, the controlling, lens microcomputer 30 assumes that the aperture is being driven. Thus, the control value of microcomputer 30 do not match with the aperture position and thus open loop control cannot be performed. This condition is referred to as loss of synchronization.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A camera system including a body and a lens, said system comprising:
    a first control circuit provided within said body for controlling an operation of said camera;
    a second control circuit provided within said lens for controlling an operation of said lens; and
    a communication circuit providing communication between said first control circuit and second control circuit and for allowing said second control circuit to communicate with another circuit provided in said lens; wherein
        said first control circuit prohibits use of said communication circuit when said second control circuit communicates with said another circuit.

2. The camera system according to claim 1, wherein said first control circuit uses said communication circuit to communicate with another circuit provided in said body and said first control circuit prohibits communication with said another circuit provided in said body when said second control circuit communicates with said another circuit provided in said lens.

3. The camera system according to claim 1, wherein said another circuit is a memory circuit.

4. The camera system according to claim 1, wherein said communication circuit comprises a serial data bus.

5. A lens-exchangeable camera body comprising:
    a control circuit for controlling an operation of said camera; and
    a communication circuit for allowing said control circuit to communicate with a lens and with another circuit provided in said camera body; wherein
        said control circuit prohibits communication with said another circuit in response to a signal indicative of a request from said lens to use said communication circuit.

6. The lens-exchangeable camera body according to claim 5, wherein said communication circuit comprises a serial data bus.

7. A lens mountable to a camera body, said lens comprising:
    a control circuit for controlling an operation of said lens; and
    a communication circuit for allowing said control circuit to communicate with said body and with another circuit provided in said lens; wherein
        said control circuit communicates with said another circuit in response to a signal indicative of a permission from said body for using said communication circuit.

8. The lens-exchangeable camera body according to claim 5, wherein said another circuit is a memory circuit.

9. The lens mountable to a camera body according to claim 7, wherein said communication circuit comprises a serial data bus.

* * * * *